(12) United States Patent
Konno et al.

(10) Patent No.: US 7,130,083 B1
(45) Date of Patent: Oct. 31, 2006

(54) IMAGE RECORDING APPARATUS, IMAGE RECORDING METHOD, METHOD FOR CONTROLLING THE IMAGE RECORDING APPARATUS, STORAGE MEDIUM STORING A PROGRAM CAPABLE OF BEING READ BY A COMPUTER, AND IMAGE PROCESSING METHOD

(75) Inventors: Yuji Konno, Kawasaki (JP); Hisashi Ishikawa, Urayasu (JP); Hiroshi Tajika, Yokohama (JP); Miyuki Fujita, Tokyo (JP); Norihiro Kawatoko, Kawasaki (JP); Tetsuya Edamura, Kawasaki (JP); Tetsuhiro Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 634 days.

(21) Appl. No.: 09/586,884

(22) Filed: Jun. 5, 2000

(30) Foreign Application Priority Data

| Jun. 7, 1999 | (JP) | ................................. 11-159848 |
| Jun. 9, 1999 | (JP) | ................................. 11-162341 |
| Oct. 6, 1999 | (JP) | ................................. 11-285812 |
| Apr. 11, 2000 | (JP) | ............................. 2000-109247 |
| Apr. 11, 2000 | (JP) | ............................. 2000-109322 |

(51) Int. Cl.
*H04N 1/40* (2006.01)
*H04N 1/405* (2006.01)
*G06K 15/00* (2006.01)

(52) U.S. Cl. ............ 358/3.06; 358/3.01; 358/3.1; 358/3.26

(58) Field of Classification Search ............ 358/1.9, 358/3.01–3.03, 3.09, 3.26, 2.1, 3.1, 3.06

See application file for complete search history.

(56) References Cited

U.S. PATENT DOCUMENTS

| 4,313,124 | A | | 1/1982 | Hara ......................... 346/140 |
| 4,345,262 | A | | 8/1982 | Shirato et al. .............. 346/140 |
| 4,459,600 | A | | 7/1984 | Sato et al. .................. 346/140 |
| 4,463,359 | A | | 7/1984 | Ayata et al. ................. 346/1.1 |
| 4,558,333 | A | | 12/1985 | Sugitani et al. ............. 346/140 |
| 4,608,577 | A | | 8/1986 | Hori ........................... 346/140 |
| 4,723,129 | A | | 2/1988 | Endo et al. .................. 346/1.1 |
| 4,740,796 | A | | 4/1988 | Endo et al. .................. 346/1.1 |
| 4,860,026 | A | | 8/1989 | Matsumoto et al. ......... 346/1.1 |
| 4,930,023 | A | * | 5/1990 | Yakame ..................... 358/3.26 |
| 5,099,259 | A | * | 3/1992 | Hirahara et al. ............ 347/183 |

(Continued)

FOREIGN PATENT DOCUMENTS

EP     0 865 195     9/1998

(Continued)

*Primary Examiner*—Thomas D. Lee
*Assistant Examiner*—James A Thompson
(74) *Attorney, Agent, or Firm*—Fitzpatrick, Cella, Harper & Scinto

(57) ABSTRACT

When recording a gradation pixel by performing pseudo-halftone processing, the occurrence of unevenness in the density in the recorded image is suppressed. For that purpose, when recording a pseudo-halftone image using dot patterns, a dot-pattern table storing a plurality of different dot patterns is provided for each gradation value. One dot-pattern table is selected from N dot-pattern tables based on gradation-value information for each pixel. One dot pattern is selected from the selected dot-pattern table, based on position information indicated by the pixel, and recording is performed using the selected dot pattern. It is thereby possible to prevent the concentrated use of a particular nozzle of a recording head, and suppress the occurrence of unevenness in the density due to characteristics of the specific nozzle.

9 Claims, 46 Drawing Sheets

U.S. PATENT DOCUMENTS

| | | | | |
|---|---|---|---|---|
| 5,130,819 A | * | 7/1992 | Ohta | 358/445 |
| 5,341,228 A | * | 8/1994 | Parker et al. | 358/534 |
| 5,528,387 A | * | 6/1996 | Kelly et al. | 358/488 |
| 5,537,496 A | * | 7/1996 | Katayama | 382/272 |
| 5,696,604 A | * | 12/1997 | Curry | 358/3.02 |
| 5,799,137 A | * | 8/1998 | Broddin et al. | 358/1.9 |
| 5,801,845 A | * | 9/1998 | Hayashi et al. | 358/3.01 |
| 5,828,815 A | | 10/1998 | Herregods et al. | 395/109 |
| 5,832,184 A | | 11/1998 | Konno et al. | 395/102 |
| 5,875,287 A | * | 2/1999 | Li et al. | 358/1.2 |
| 5,982,993 A | * | 11/1999 | Slade | 358/1.9 |
| 6,203,133 B1 | * | 3/2001 | Tanaka et al. | 347/15 |
| 6,633,412 B1 | * | 10/2003 | Lin et al. | 358/3.13 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 9-83794 | 3/1997 |
| JP | 9-233337 | 9/1997 |

* cited by examiner

FIG.4
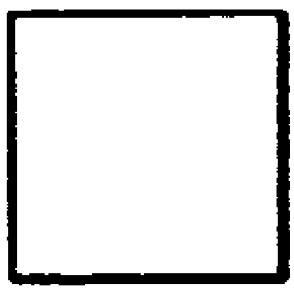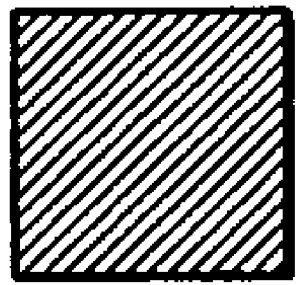

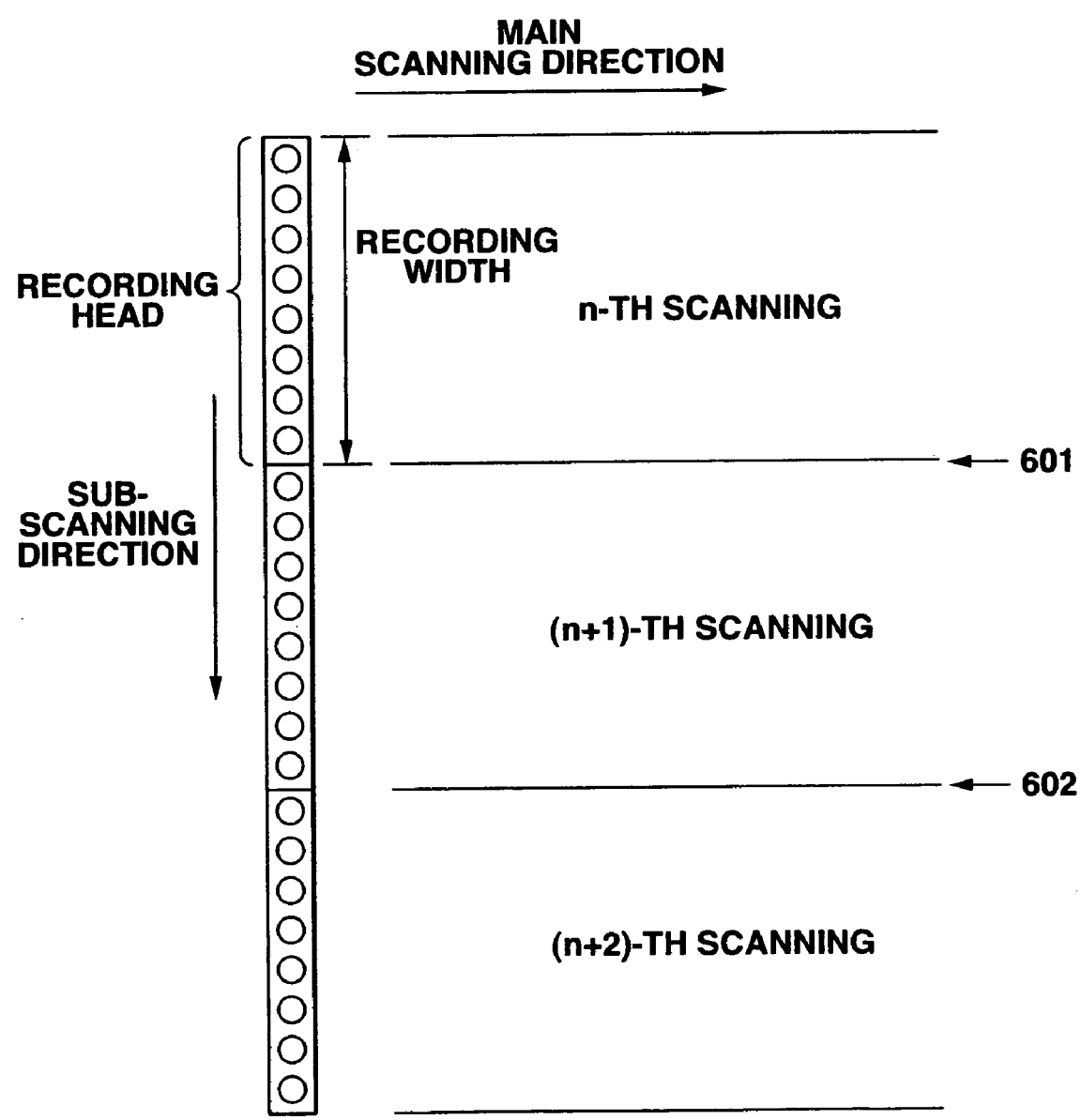

FIG.12

| GRADATION VALVE | DUTY (%) |
|---|---|
| 0 | 0 |
| 1 | 6.25 |
| 2 | 12.5 |
| 3 | 18.75 |
| 4 | 25 |
| 5 | 31.25 |
| 6 | 37.5 |
| 7 | 43.75 |
| 8 | 50 |
| 9 | 56.25 |
| 10 | 62.5 |
| 11 | 68.75 |
| 12 | 75 |
| 13 | 81.25 |
| 14 | 87.5 |
| 15 | 93.75 |
| 16 | 100 |

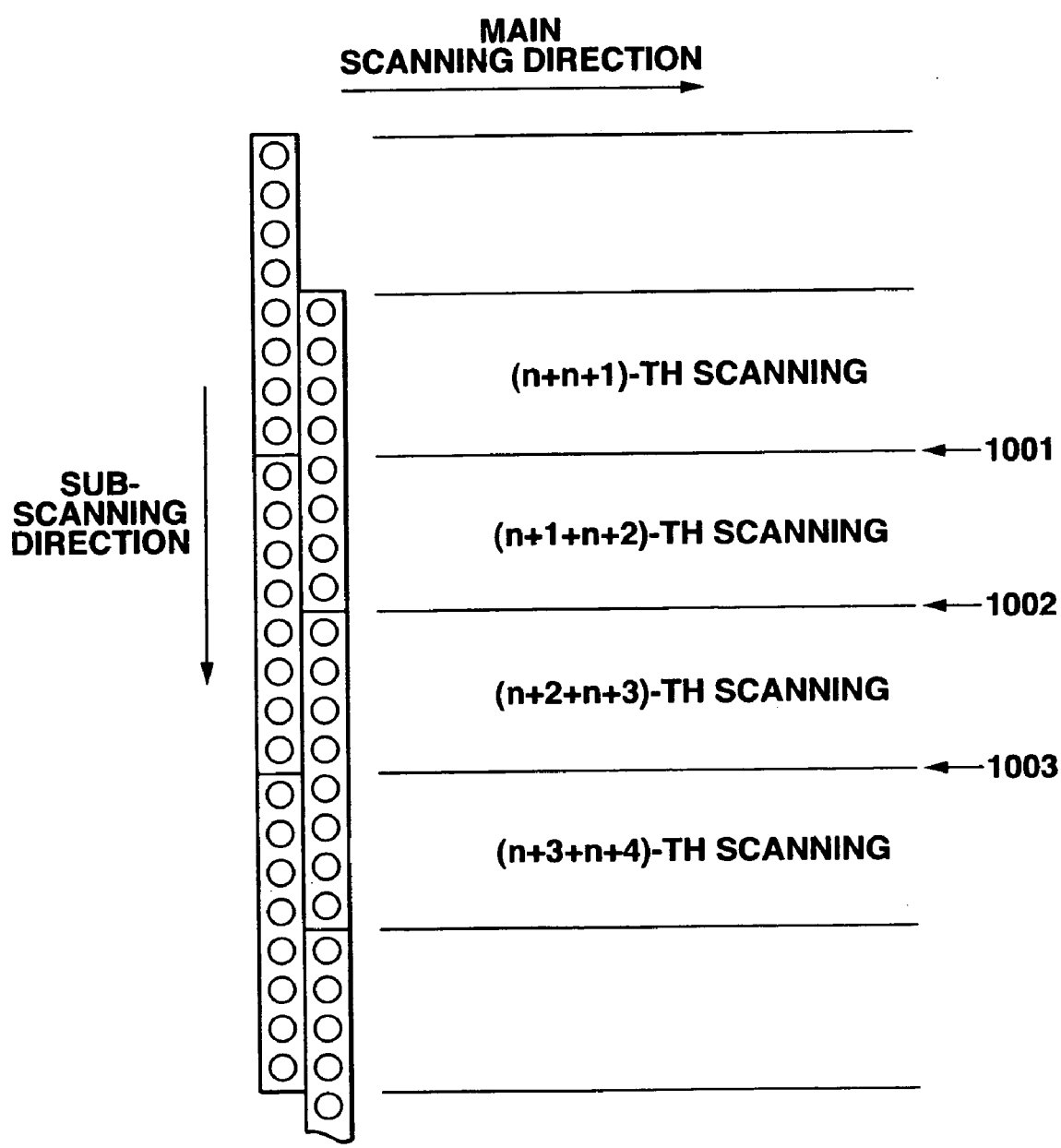

n−1=2 n=3
(DOES NOT EXIST)

n+1=4

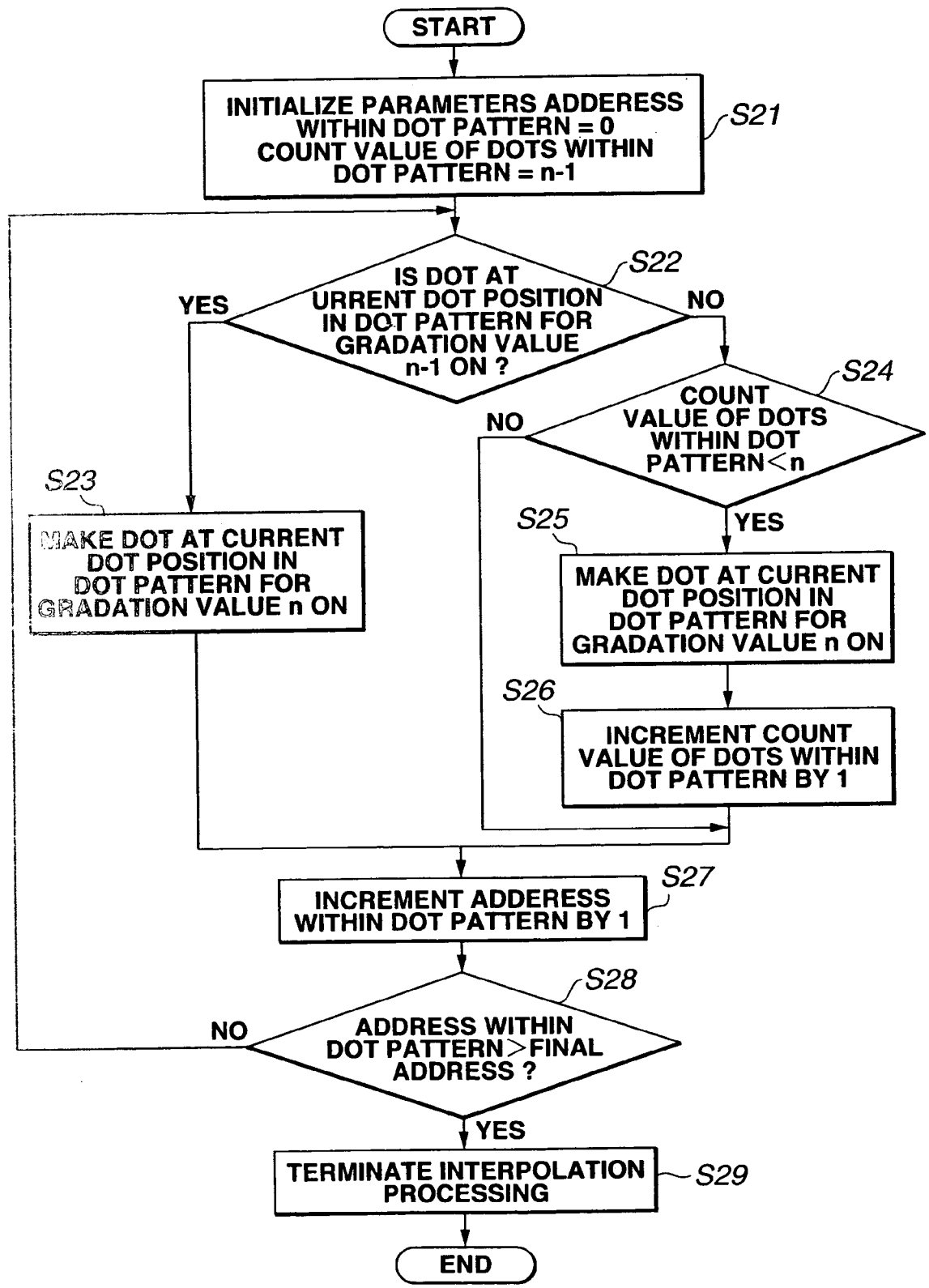

IMAGE RECORDING APPARATUS, IMAGE RECORDING METHOD, METHOD FOR CONTROLLING THE IMAGE RECORDING APPARATUS, STORAGE MEDIUM STORING A PROGRAM CAPABLE OF BEING READ BY A COMPUTER, AND IMAGE PROCESSING METHOD

BACKGROUND OF THE INVENTION

1. Field of the Invention

The present invention relates to an image recording method and an image recording apparatus for performing recording using a dot pattern where dot information is stored, a method for controlling the image recording apparatus, a storage medium storing a program capable of being read by a computer, and an image processing method.

2. Description of the Related Art

There has been a method called a density pattern method, as a method of pseudo-halftone processing for representing gradation by converting a multiple-valued image into a binary image. In this method, in order to represent continuous gradation in an image recording apparatus which can represent each pixel of an image only by binary values, a plurality of binary pixels are collected to form a block, and gradation is represented by a group of such pixel blocks. More specifically, dots are arranged within a dot-matrix cell comprising, for example, 2×2 or 4×4 pixels, and one pixel is represented by obtaining pseudo-gradation with an area ratio. The density pattern method has problems in that the resolution is degraded when the block size is increased, and the number of gradation levels is small when the block size is reduced, resulting in degradation in the degree of gradation because smooth gradation representation is difficult to obtain.

In a method for solving the problems of the density pattern method, pseudo-continuous gradation is represented by preserving an error between a gradation value represented by a pixel block and a gradation value of an input pixel and adding the error to an un-input pixel value. This method is called an error diffusion method. According to this method, it is possible to perform image recording in which resolution and gradation are compatible.

In the above-described conventional approaches, however, a dot pattern having a fixed arrangement of dots is used for each gradation value. For example, in the case of gradation value "1", as shown in FIG. 41, a dot pattern having a dot at an upper right corner thereof in a 2×2 dot matrix is repeated. By repeating such a regular dot pattern, unevenness in the density having predetermined periodicity is generated in the recorded image.

Such unevenness in the density is due to deviations in the characteristics of respective discharging ports, because the shapes of respective discharging ports slightly differ, the performance of the source for generating an ink discharging force differs depending on the nozzle, and the amount of ink discharge differs at each discharging port due, for example, to a difference in the temperature of each nozzle. Accordingly, the characteristics of each nozzle differ.

If recording is performed using a dot pattern having a fixed arrangement of dots for each gradation level as in the above-described case, the recorded image tends to be influenced by variations in the characteristics of each nozzle, and unevenness in the density and unevenness due to stripes occur in the image, thereby greatly degrading the quality of the image.

In order to prevent the occurrence of unevenness in the density and unevenness due to stripes, (i) in conventional ink-jet printers, multi-path recording control is adopted, in which a recording head scans (passes) the same region on a recording medium a plurality of times using different nozzles of the recording head at respective paths. However, if the pattern of dots to be output is a fixed dot pattern as described above, it is impossible, in some cases, to sufficiently prevent degradation of the quality of the image even by the multi-path recording control.

(ii) In another approach, in order to solve the problems in the above-described approach (i), dot-pattern tables, each storing a plurality of dot patterns, whose number is the same as the number of gradation levels are provided. In this approach, however, the number of necessary dot-pattern tables increases as the number of gradation levels increases, thereby increasing the amount of data of the dot-pattern tables. An increase in the amount of data requires a large-capacity memory, thereby increasing the cost of the recording apparatus.

(iii) In still another approach for solving the problems in the above-described approach (i), the size of the dot-pattern table is increased. This approach, however, requires a large-capacity memory. If the size of the dot-pattern table is simply reduced in order to solve this problem, stripes and unevenness are pronounced in the recorded image, thereby degrading the quality of the image.

SUMMARY OF THE INVENTION (1) The present invention has been made in consideration of the above-described problems in approach (i). It is an object of the present invention to provide an image recording method which can record a high-quality image while reducing unevenness in the density, unevenness due to stripes, and the like, in the recorded image when recording the image by performing pseudo-halftone processing, an image recording apparatus for recording such an image, a method for controlling the image recording apparatus, a storage medium capable of being read by a computer, and an image processing method.

(2) The present invention has also been made in consideration of the above-described problems in approach (ii). It is another object of the present invention to provide an image recording method and an image recording apparatus which can reduce the capacity of data of a dot-pattern table while preventing the occurrence of unevenness in the density and unevenness due to stripes in the recorded image, a method for controlling the image recording apparatus, and a storage medium capable of being read by a computer. It is still another object of the present invention to provide a low-cost image recording apparatus by reducing the capacity of data of a dot-pattern table.

(3) The present invention has also been made in consideration of the above-described problems in approach (iii). It is yet another object of the present invention to provide an image recording apparatus, an image recording method, and an image processing method which can reduce the size of a dot-pattern table while maintaining the quality of recording.

In order to achieve the above-described object in item (1), an image recording method according to the present invention has the following configuration.

That is, an image recording method for performing recording using a dot pattern corresponding to each gradation value based on image data representing each pixel with one of N gradation values includes an input step for inputting image data including gradation-value information and position information relating to each pixel, a first selection step for selecting one dot-pattern table based on gradation-value information indicated by each pixel of the image data input in the input step, from among N dot-pattern tables, each having a plurality of different dot patterns, corresponding to respective ones of the N gradation values, a second selection step for selecting one dot pattern based on position information indicated by the pixel from the dot-pattern table selected in the first selection step, and a recording step for recording the dot pattern selected in the second selection step on a recording medium using a recording head.

It is desirable that each of the N dot-pattern tables is a two-dimensional table expanding in a first direction corresponding to a direction of arrangement of nozzles of the recording head and in a second direction corresponding to a moving direction of the recording head, and that the dot pattern is a two-dimensional pattern expanding in the first direction and in the second direction.

In this case, it is desirable that, when sizes of the dot-pattern table in the first direction and the second direction of the dot-pattern table are represented by L and K, and sizes of the dot-pattern table in the first direction and the second direction are represented by l and k, respectively, the size of the dot-pattern table and the size of the dot pattern have relationships of $L=\alpha \times l$ ($\alpha$ is a natural number), and $K=\beta \times k$ ($\beta$ is a natural number), and that $\alpha$ dot patterns and $\beta$ dot patterns having the same gradation value are stored in the first direction and the second direction, respectively, in the dot-pattern table.

The dot-pattern table is repeatedly used at every L pixels in the first direction, and at every K pixels in the second direction.

It is desirable that a number of cells L of the dot-pattern table in the first direction and a number of nozzles A of the recording head have a relationship of $L=\gamma \times A$ ($\gamma$ is a natural number).

When the position information indicated by the pixel is represented by two-dimensional coordinates (x, y), and the x coordinate and the y coordinate correspond to the second direction and the first direction, respectively, the dot pattern selected in the second selection step is a dot pattern at a position specified based on the x coordinate value, the y coordinate value, the value $\alpha$, and the value $\beta$ within the dot-pattern table.

It is desirable that the dot-pattern table is determined in consideration of characteristics of each of a plurality of nozzles of the recording head.

In this case, it is desirable that a number of dot-pattern tables determined in consideration of the characteristics of each of the nozzles, from among the N dot-pattern tables provided for corresponding ones of the N gradation values, is H (N>H, H is a natural number).

It is desirable that the dot-pattern table determined in consideration of the characteristics of each of the nozzles is a dot-pattern table corresponding to a gradation value such that a ratio of dots D (%) provided within a pixel is within a range of $25 \leq D \leq 50$.

It is desirable that cells in the second direction from among cells positioned at end portions of the dot-pattern table do not include dot information.

It is desirable that the gradation value of a dot pattern positioned at an end portion of the dot-pattern table in the second direction is smaller than the gradation value indicated by the dot-pattern table where the dot pattern is stored.

It is desirable that the dot-pattern table has a blue-noise characteristic.

The blue-noise characteristic is a characteristic in which a power spectrum in a low-frequency region of an image recorded based on the image data is smaller than a power spectrum of a high-frequency region.

In the recording step, the recording head may perform recording by scanning the same region on the recording medium a plurality of times.

It is desirable that the recording head is an ink-jet recording head for performing recording by discharging ink, and particularly, an head discharging ink by utilizing thermal energy and including a thermal-energy generation member for generating the thermal energy provided to the ink.

In order to achieve the above-described object in item (1), an image recording apparatus according to the present invention has the following configuration.

That is, an image recording apparatus for performing recording using a dot pattern corresponding to each gradation value based, on image data representing each pixel with one of N gradation values includes an input unit for inputting image data including gradation-value information and position information relating to each pixel, a dot-pattern storage unit for storing N dot-pattern tables, each having a plurality of different dot patterns, corresponding to respective ones of the N gradation values, first selection means for selecting one dot-pattern table from the dot-pattern storage unit, based on gradation-value information indicated by each pixel of the image data input by the input unit, second selection means for selecting one dot pattern from the dot-pattern table selected by the first selection means, based on position information indicated by the pixel, and recording control means for controlling a recording head so as to record the dot pattern selected by the second selection means on a recording medium.

In order to achieve the above-described object in item (1), a method for controlling an image recording apparatus according to the present invention has the following configuration.

That is, a method for controlling an image recording apparatus for performing recording using a dot pattern corresponding to each gradation value, based on image data representing each pixel with one of N gradation values includes a first control step for performing control so as to input image data including gradation-value information and position information relating to each pixel, a second control step for performing control so as to select one dot-pattern table based on gradation-value information indicated by each pixel of the image data input in the first control step, from among N dot-pattern tables, each having a plurality of different dot patterns, corresponding to respective ones of the N gradation values, a third control step for performing control so as to select one dot pattern based on position information indicated by the pixel, from the dot-pattern table selected in the second control step, and a fourth control step for performing control so as to record the dot pattern selected in the third control step on a recording medium using a recording head.

In order to achieve the above-described object in item (1), a storage medium, capable of being read by a computer, according to the present invention has the following configuration.

That is, in a storage medium, capable of being read by a computer, storing program codes for executing recording control processing for an image recording apparatus for performing recording using a dot pattern corresponding to each gradation value, based on image data for representing each pixel with one of N gradation values, the program codes include (a) a code of an input step for inputting image data including gradation-value information and position information relating to each pixel, (b) a code of a first selection step for selecting one dot-pattern table based on gradation-value information indicated by each pixel of the image data input in the input step from among N dot-pattern tables, each having a plurality of different dot patterns, corresponding to respective ones of the N gradation values, (c) a code of a second selection step for selecting one dot pattern based on position information indicated by the pixel, from the dot-pattern table selected in the first selection step, and (d) a code of a recording step for recording the dot pattern selected in the second selection step on a recording medium using a recording head.

In order to achieve the above-described object in item (1), an image processing method according to the present invention has the following configuration.

That is, an image processing method for outputting a dot pattern corresponding to each gradation value, based on image data representing each pixel with one of N gradation values includes an input step for inputting image data including gradation-value information and position information relating to each pixel, first selection step for selecting one dot-pattern table based on gradation-value information indicated by each pixel of the image data input in the input step, from among N dot-pattern tables, each having a plurality of different dot patterns, corresponding to respective ones of the N gradation values, a second selection step for selecting one dot pattern based on position information indicated by the pixel, from the dot-pattern table selected in the first selection step, and an output step for outputting the dot pattern selected in the second selection step.

According to the present invention having the above-described configurations, when recording a pseudo-halftone image using dot patterns, a dot-pattern table storing a plurality of different dot patterns is provided for each of gradation values. One dot-pattern table is selected from among N dot-pattern tables based on gradation-value information indicated by each pixel. Then, one dot pattern is selected from the selected dot-pattern table based on position information indicated by the pixel, and recording is performed using the selected dot pattern. It is thereby possible to prevent the concentrated use of a specific nozzle, and to suppress the occurrence of unevenness in the density due to the characteristics of the specific nozzle.

In order to achieve the above-described objects of item (2), an image recording apparatus according to the present invention has the following configuration.

That is, an image recording apparatus for performing recording using a dot pattern corresponding to each gradation value, based on image data representing each pixel by one of N gradation values includes an input unit for inputting image data including gradation-value information and position information relating each pixel, selection means for selecting one dot pattern based on gradation-value information and position information indicated by each pixel of the image data input by the input unit, from a dot-pattern-table storage unit for storing X (N>X, X is a natural number) dot patterns, each having a plurality of different dot patterns, corresponding to respective ones of X gradation values, and dot-pattern generation means for generating dot patterns corresponding to (N−X) predetermined gradation values. When a dot-pattern table corresponding to the gradation-value information is stored in the dot-pattern-table storage unit, the dot pattern selected by the selection means is recorded by a recording head. When a dot-pattern table corresponding to the gradation-value information is not stored in the dot-pattern-table storage unit, the dot patterns corresponding to the predetermined gradation values generated by the dot-pattern generation means are recorded by the recording head.

In order to achieve the above-described objects of item (2), an image recording apparatus according to the present invention has the following configuration.

That is, an image recording apparatus for performing recording using a dot pattern corresponding to each gradation value, based on image data for representing each pixel by one of N gradation values includes an input unit for inputting image data including gradation-value information and position information relating to each pixel, a dot-pattern-table storage unit for storing X (N>X, X is a natural number) dot patterns, each having a plurality of different dot patterns, corresponding to respective ones of X gradation values, first selection means for selecting one dot pattern from the dot-pattern-table storage unit, based on gradation-value information indicated by each pixel of the image data input by the input unit, a second selection means for selecting one do pattern from the dot-pattern table selected by the first selection means, based on position information indicated by the pixel, and dot-pattern generation means for generating dot patterns corresponding to (N−X) predetermined gradation values. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of $L = \alpha \times A$ ($\alpha$ is a natural number). When a dot-pattern table corresponding to the gradation-value information is stored in the dot-pattern-table storage unit, the dot pattern selected by the second selection means is recorded by a recording head. When a dot-pattern table corresponding to the gradation-value information is not stored in the dot-pattern-table storage unit, the dot patterns corresponding to the predetermined gradation values generated by the dot-pattern generation means are recorded by the recording head.

In order to achieve the above-described objects of item (2), an image recording apparatus according to the present invention has the following configuration.

That is, an image recording apparatus for performing recording using a dot pattern corresponding to each gradation value, based on image data representing each pixel with one of N (N is an integer equal to or larger than 3) gradation values includes an input unit for inputting image data including gradation-value information and position information relating to each pixel, a dot-pattern-table storage unit for storing X (N>X, X is a natural number) dot-pattern tables, each having a plurality of different dot patterns, corresponding to X gradation values provided at intervals of every other gradation level, first selection means for selecting one dot-pattern table from the dot-pattern-table storage unit, based on gradation-value information indicated by each pixel of the image data input by the input unit, second selection means for selecting one dot pattern based on position information indicated by the pixel from the dot-pattern table selected by the first selection means, and dot-pattern interpolation means for generating dot patterns corresponding to (N−X) predetermined gradation values, based on a dot pattern within the dot-pattern table corresponding to a gradation value larger than a corresponding one of the predetermined gradation values by one, and a dot pattern within the dot-pattern table corresponding to a gradation value smaller than the corresponding one of the predetermined gradation values by one. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of L=α×A (α is a natural number). When a dot-pattern table corresponding to the gradation-value information is stored in the dot-pattern-table storage unit, the dot pattern selected by the second selection means is recorded by a recording head. When a dot-pattern table corresponding to the gradation-value information is not stored in the dot-pattern-table storage unit, the dot patterns corresponding to the predetermined gradation values generated by the dot-pattern generation means are recorded by the recording head.

In order to achieve the above-described objects in item (2), an image recording method according to the present invention has the following configuration.

That is, an image recording method for performing recording using a dot pattern corresponding to each gradation value, based on image data representing each pixel by one of N gradation values includes an input step for inputting image data including gradation-value information and position information relating to each pixel, a selection step for selecting one dot pattern based on gradation-value information and position information indicated by each pixel of the image data input in the input step, from a dot-pattern-table storage unit for storing X (N>X, X is a natural number) dot patterns, each having a plurality of different dot patterns, corresponding to respective ones of X gradation values, and a dot-pattern generation step for generating dot patterns corresponding to (N−X) predetermined gradation values. When a dot-pattern table corresponding to the gradation-value information is stored in the dot-pattern-table storage unit, the dot pattern selected in the selection step is recorded by a recording head. When a dot-pattern table corresponding to the gradation-value information is not stored in the dot-pattern-table storage unit, the dot patterns corresponding to the predetermined gradation values generated in the dot-pattern generation step are recorded by the recording head.

In order to achieve the above-described objects of item (2), an image recording method according to the present invention has the following configuration.

That is, an image recording method for performing recording using a dot pattern corresponding to each gradation value, based on image data representing each pixel by one of N gradation values includes an input step for inputting image data including gradation-value information and position information relating to each pixel, a first selection step for selecting one dot pattern based on gradation-value information indicated by each pixel of the image data input in the input step, from a dot-pattern-table storage unit for storing X (N>X, X is a natural number) dot patterns, each having a plurality of different dot patterns, corresponding to respective ones of X gradation values unit, a second selection step for selecting one do pattern from the dot-pattern table selected in the first selection step, based on position information indicated by the pixel, and a dot-pattern generation step for generating dot patterns corresponding to (N−X) predetermined gradation values. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of L=α×A (α is a natural number). When a dot-pattern table corresponding to the gradation-value information is stored in the dot-pattern-table storage unit, the dot pattern selected in the second selection step is recorded by a recording head. When a dot-pattern table corresponding to the gradation-value information is not stored in the dot-pattern-table storage unit, the dot patterns corresponding to the predetermined gradation values generated in the dot-pattern generation step are recorded by the recording head.

In order to achieve the above-described objects of item (2), an image recording apparatus according to the present invention has the following configuration.

That is, an image recording method for performing recording using a dot pattern corresponding to each gradation value, based on image data representing each pixel with one of N (N is an integer equal to or larger than 3) gradation values includes an input step for inputting image data including gradation-value information and position information relating to each pixel, a first selection step for selecting one dot-pattern table based on gradation-value information indicated by each pixel of the image data input in the input step, from a dot-pattern-table storage unit for storing X (N>X, X is a natural number) dot-pattern tables, each having a plurality of different dot patterns, corresponding to X gradation values provided at intervals of every other gradation level, a second selection step for selecting one dot pattern based on position information indicated by the pixel, from the dot-pattern table selected in the first selection step, and a dot-pattern interpolation step for generating dot patterns corresponding to (N−X) predetermined gradation values, based on a dot pattern within a dot-pattern table corresponding to a gradation value larger than a corresponding one of the predetermined gradation values by one, and a dot pattern within a dot-pattern table corresponding to a gradation value smaller than the corresponding one of the predetermined gradation values by one. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of L=α×A (α is a natural number). When a dot-pattern table corresponding to the gradation-value information is stored in the dot-pattern-table storage unit, the dot pattern selected in the second selection step is recorded by a recording head. When a dot-pattern table corresponding to the gradation-value information is not stored in the dot-pattern-table storage unit, the dot patterns corresponding to the predetermined gradation values generated in the dot-pattern interpolation step are recorded by the recording head.

In order to achieve the above-described objects in item (2), a method for controlling an image recording apparatus according to the present invention has the following configuration.

That is, a method for controlling an image apparatus for performing recording using a dot pattern corresponding to each gradation value, based on image data representing each pixel by one of N gradation values includes a first control step for performing control so as to input image data including gradation-value information and position information relating to each pixel, a second control step for performing control so as to select one dot pattern based on gradation-value information and position information indicated by each pixel of the image data input in the first control step, from a dot-pattern-table storage unit for storing X (N>X, X is a natural number) dot patterns, each having a plurality of different dot patterns, corresponding to respective ones of X gradation values, and a third control step for performing control so as to generate dot patterns corresponding to (N–X) predetermined gradation values. When a dot-pattern table corresponding to the gradation-value information is stored in the dot-pattern-table storage unit, the dot pattern selected in the second control step is recorded by a recording head. When a dot-pattern table corresponding to the gradation-value information is not stored in the dot-pattern-table storage unit, the dot patterns corresponding to the predetermined gradation values generated in the third control step are recorded by the recording head.

In order to achieve the above-described objects of item (2), a method for controlling an image recording apparatus according to the present invention has the following configuration.

That is, a method for controlling an image recording apparatus for performing recording using a dot pattern corresponding to each gradation value, based on image data representing each pixel by one of N gradation values includes a first control step for performing control so as to input image data including gradation-value information and position information relating to each pixel, a second control step for performing control so as to select one dot pattern based on gradation-value information and position information indicated by each pixel of the image data input in the first control step, from a dot-pattern-table storage unit for storing X (N>X, X is a natural number) dot patterns, each having a plurality of different dot patterns, corresponding to respective ones of X gradation values unit, a third control step for performing control so as to select one dot pattern from the dot-pattern table selected in the second selection step, based on position information indicated by the pixel, and a fourth control step for performing control so as to generate dot patterns corresponding to (N–X) predetermined gradation values. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of $L=\alpha \times A$ ($\alpha$ is a natural number). When a dot-pattern table corresponding to the gradation-value information is stored in the dot-pattern-table storage unit, control is performed so as to record the dot pattern selected in the third control step by a recording head. When a dot-pattern table corresponding to the gradation-value information is not stored in the dot-pattern-table storage unit, control is performed so as to record the dot patterns corresponding to the predetermined gradation values generated in the fourth control step by the recording head.

In order to achieve the above-described objects of item (2), a method for controlling an image recording apparatus according to the present invention has the following configuration.

That is, a method for controlling an image recording apparatus for performing recording using a dot pattern corresponding to each gradation value, based on image data representing each pixel with one of N (N is an integer equal to or larger than 3) gradation values includes a first control step for performing control so as to input image data including gradation-value information and position information relating to each pixel, a second control step for performing control so as to select one dot-pattern table based on gradation-value information indicated by each pixel of the image data input in the first control step, from a dot-pattern-table storage unit for storing X (N>X, X is a natural number) dot-pattern tables, each having a plurality of different dot patterns, corresponding to X gradation values provided at intervals of every other gradation level, a third control step for performing control so as to select one dot pattern based on position information indicated by the pixel, from the dot-pattern table selected in the second control step, and a fourth control step for performing control so as to generate dot patterns corresponding to (N–X) predetermined gradation values, based on a dot pattern within a dot-pattern table corresponding to a gradation value larger than a corresponding one of the predetermined gradation values by one, and a dot pattern within a dot-pattern table corresponding to a gradation value smaller than the corresponding one of the predetermined gradation values by one. The dot-pattern table is a two-dimensional table expanding in a first direction corresponding to a direction of arrangement of nozzles of the recording head and in a second direction different from the first direction. A number of cells L within the dot-pattern table in the first direction and a number of nozzles A of the recording head have a relationship of $L=\alpha \times A$ ($\alpha$ is a natural number). When a dot-pattern table corresponding to the gradation-value information is stored in the dot-pattern-table storage unit, control is performed so as to record the dot pattern selected in the third control step by a recording head. When a dot-pattern table corresponding to the gradation-value information is not stored in the dot-pattern-table storage unit, control is performed so as to record the dot patterns corresponding to the predetermined gradation values generated in the fourth control step by the recording head.

In order to achieve the above-described objects in item (2), a storage medium, capable of being read by a computer, according to the present invention has the following configuration.

That is, in a storage medium, capable of being read by a computer, storing program codes for executing recording control processing for an image recording apparatus for performing recording using a dot pattern corresponding to each gradation value, based on image data representing each pixel by one of N (N is an integer equal to or larger than 2) gradation values. The program codes includes (a) a code for an input step for inputting image data including gradation-value information and position information relating to each pixel, (b) a code for a selection step for selecting one dot pattern based on gradation-value information and position information indicated by each pixel of the image data input in the input step, from a dot-pattern-table storage unit for storing X (N>X, X is a natural number) dot-pattern tables, each having a plurality of different dot patterns, corresponding to respective ones of X gradation values, (c) a code for a dot-pattern generation step for generating dot patterns corresponding to (N–X) predetermined gradation values, (d) a code for a first control step for performing control so as to record, when a dot-pattern table corresponding to the gradation-value information is stored in the dot-pattern-table storage unit, the dot pattern selected in the selection step by a recording head, and (e) a code for a second control step for performing control so as to record, when a dot-pattern table corresponding to the gradation-value information is not stored in the dot-pattern-table storage unit, the dot patterns corresponding to the predetermined gradation values generated in the dot-pattern generation step by the recording head.

In order to achieve the objects in item (2), a storage medium, capable of being read by a computer, according to the present invention has the following configuration.

That is, in a storage medium, capable of being read by a computer, storing program codes for executing recording control processing for an image recording apparatus for performing recording using a dot pattern corresponding to each gradation value, based on image data representing each pixel by one of N gradation values, the program codes includes (a) a code for an input step for inputting image data including gradation-value information and position information relating to each pixel, (b) a code for a first selection step for selecting one dot pattern based on gradation-value information indicated by each pixel of the image data input in the input step, from a dot-pattern-table storage unit for storing X (N>X, X is a natural number) dot-pattern tables, each having a plurality of different dot patterns, corresponding to respective ones of X gradation values, (c) a code for a second selection step for selecting one dot pattern from the dot-pattern table selected in the first selection step, based on position information indicated by the pixel, (d) a code for a dot-pattern generation step for generating dot patterns corresponding to (N−X) predetermined gradation values, (e) a code for a first control step for performing control so as to record, when a dot-pattern table corresponding to the gradation-value information is stored in the dot-pattern-table storage unit, the dot pattern selected in the second selection step by a recording head, and (f) a code for a second control step for performing control so as to record, when a dot-pattern table corresponding to the gradation-value information is not stored in the dot-pattern-table storage unit, the dot patterns corresponding to the predetermined gradation values generated in the dot-pattern generation step by the recording head.

In order to achieve the above-described objects in item (2), a storage medium, capable of being read by a computer, according to the present invention, has the following configuration.

That is, in a storage medium, capable of being read by a computer, storing program codes for executing recording control processing for an image recording apparatus for performing recording using a dot pattern corresponding to each gradation value, based on image data representing each pixel with one of N (N is an integer equal to or larger than 3) gradation values, the program codes include (a) a code for an input step for inputting image data including gradation-value information and position information relating to each pixel, (b) a code for a first selection step for selecting one dot-pattern table based on gradation-value information indicated by each pixel of the image data input in the input step, from a dot-pattern-table storage unit for storing X (N>X, X is a natural number) dot-pattern tables, each having a plurality of different dot patterns, corresponding to respective ones of X gradation values provided at intervals of every other gradation level, (c) a code for a second selection step for selecting one dot pattern based on position information indicated by the pixel, from the dot-pattern table selected in the first selection step, (d) a code for a dot-pattern interpolation step for generating dot patterns corresponding to (N−X) predetermined gradation values, based on a dot pattern within the dot-pattern table corresponding to a gradation value larger than a corresponding one of the predetermined gradation values by one, and a dot pattern within the dot-pattern table corresponding to a gradation value smaller than the corresponding one of the predetermined gradation values by one, (e) a code for a first control step for performing control so as to record, when a dot-pattern table corresponding to the gradation-value information is stored in the dot-pattern-table storage unit, the dot pattern selected in the second selection step by a recording head, and (f) a code for a second control step for performing control so as to record, when a dot-pattern table corresponding to the gradation-value information is not stored in the dot-pattern-table storage unit, the dot patterns corresponding to the predetermined gradation values generated in the dot-pattern interpolation step by the recording head.

In order to achieve the above-described object in item (3), a recording apparatus according to the present invention has the following configuration.

That is, an image recording apparatus for outputting dot patterns corresponding to respective gradation values and recording the output dot patterns using recording materials having a plurality of colors by a recording unit, based on image data representing each pixel with one of N gradation values, includes an input unit for inputting image data including position information, gradation-value information and color information relating to each pixel, a dot-pattern-table storage unit for storing N dot patterns, each having a plurality of different dot patterns, corresponding to respective ones of the N gradation values, for each color of the recording materials, and an output unit for outputting one dot pattern from the dot-pattern-table storage unit, based on position information, gradation-value information and color information indicated by each pixel of the image data input by the input unit. A size of a dot-pattern table corresponding to at least one specific color from among the dot-pattern tables stored for each of the plurality of colors is smaller than sizes of dot-pattern tables corresponding to colors other than the specific color.

In order to achieve the above-described object in item (3), an image recording method according to the present invention has the following configuration.

That is, an image recording method for outputting dot patterns corresponding to respective gradation values and recording the output dot patterns using recording materials having a plurality of colors by a recording unit, based on image data representing each pixel with one of N (N is an integer equal to or larger than 2) gradation values, includes an input step for inputting image data including position information, gradation-value information and color information relating to each pixel, and an output step for outputting one dot pattern based on position information, gradation-value information and color information indicated by each pixel of the image data input in the input step, from a dot-pattern-table storage unit for storing N dot patterns, each having a plurality of different dot patterns, corresponding to respective ones of the N gradation values, for each color of the recording materials, and a recording step for recording the dot pattern output in the output step by the recording unit. A size of a dot-pattern table corresponding to at least one specific color from among the dot-pattern tables stored for each of the plurality of colors is smaller than sizes of dot-pattern tables corresponding to colors other than the specific color.

More specifically, when performing color recording using recording materials having a plurality of colors, by utilizing the fact that there are colors in which stripes and unevenness in the recorded image are easily observed and colors in which stripes and unevenness in the recorded image are not easily observed, due to the human visual characteristics, the size of each dot pattern is increased for the colors of the former type, and the size of each dot pattern is reduced for the colors of the latter type. It is thereby possible to reduce the capacity of dot-pattern tables and the cost of the apparatus while maintaining the same recording quality as in the case of using large-size dot patterns for all colors.

The foregoing and other objects, advantages and features of the present invention will become more apparent from the following description of the preferred embodiments taken in conjunction with the accompanying drawings.

BRIEF DESCRIPTION OF THE DRAWINGS

FIG. 4 is a diagram illustrating error distribution ratios;

FIG. 6 is a diagram illustrating the relationship between a recording width and recording scanning of a recording head;

FIG. 12 is a diagram illustrating correspondence between the ratio of the number of dots subjected to ink discharge in a 4×4 dot matrix and the gradation value;

FIG. 13 is a schematic diagram illustrating 2-path recording;

FIG. 36 is a flowchart illustrating interpolation processing in a dot-pattern interpolation unit 1100 shown in FIG. 33;

DESCRIPTION OF THE PREFERRED EMBODIMENTS

Preferred embodiments of the present invention will now be described in detail with reference to the drawings.

First Embodiment

Figure 1:
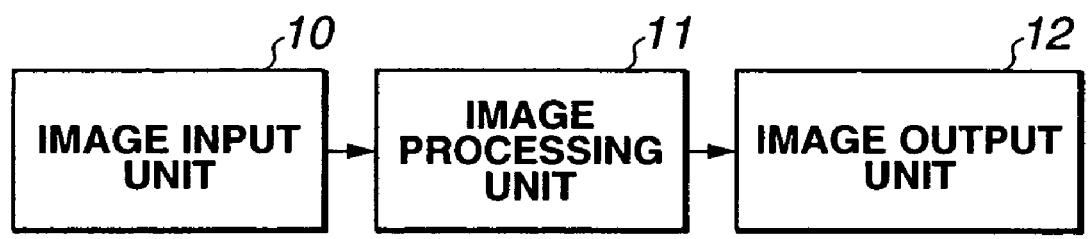
FIG. 1 is a schematic block diagram illustrating the configuration of an image processing system according to a first embodiment of the present invention.

FIG. 1 is a schematic block diagram illustrating the configuration of an image processing system according to a first embodiment of the present invention.

In FIG. 1, an image input unit 10 inputs multi-valued image data from an image input apparatus, such as a scanner, a digital camera or the like, or multi-valued image data stored in each type of storage medium, such as a hard disk or the like. An image processing unit 11 performs image processing (to be described later) for the multi-valued image data input by the image input unit 10, to convert the multi-valued image data into a binary image data. An image output unit 12 receives the binary image data from the image processing unit 11, and performs actual image formation. Although not illustrated in FIG. 1, each of the units constituting the system includes a CPU (central processing unit) for controlling operations of the unit itself and linked operations with other units, a ROM (read-only memory) storing control programs to be executed by the CPU, a RAM (random access memory) used as working areas for executing the control programs, and the like.

Figure 2:
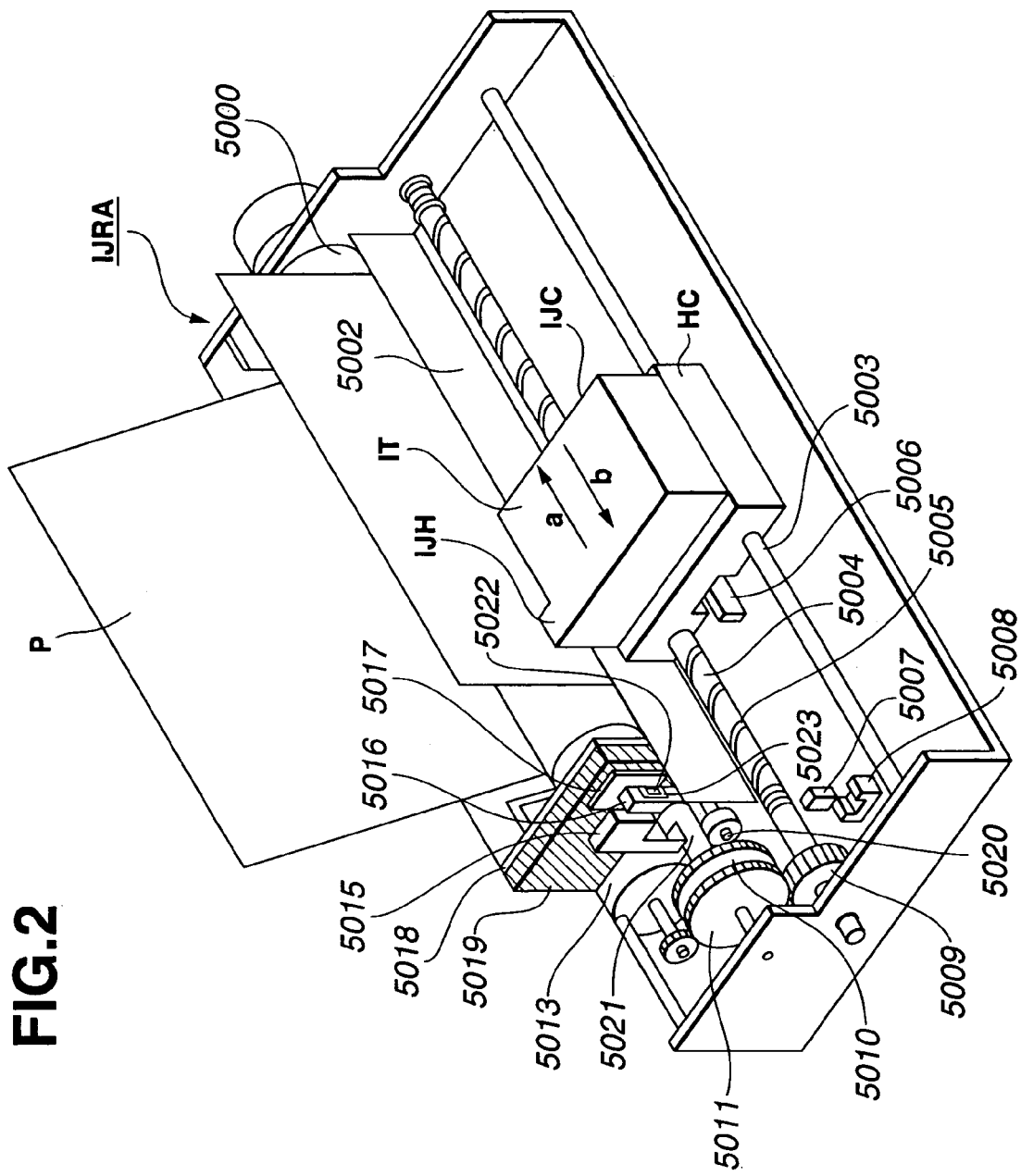
FIG. 2 is a schematic perspective view illustrating an external appearance of an ink-jet printer IJRA, which is a typical example of an image output unit 12 shown in FIG. 1.

FIG. 2 is a schematic perspective view illustrating an external appearance of the configuration of an ink-jet printer IJRA, serving as a typical example of the image output unit 12 shown in FIG. 1.

In FIG. 2, a carriage HC engaged with a screw groove 5004 of a lead screw 5005 rotating via driving-force transmission gears 5009–5011 in a state of being linked with the forward/reverse revolution of a driving motor 5013 has pins (not shown), and reciprocates in the directions of arrows a and b by being supported on a guide rail 5003. An integrated ink-jet cartridge IJC incorporating a recording head IJH and an ink tank IT is mounted on the carriage HC. A sheet pressing plate 5002 presses a recording sheet P against a platen 5000 over the moving direction of the carriage HC. A photocoupler 5007, 5008 is a home-position detector for performing, for example, switching of the direction of revolution of the driving motor 5013 by confirming the presence of a carriage lever 5006 in the region of the photocoupler 5007, 5008. Reference numeral 5016 represents a member for supporting a capping member 5022 for capping the front surface of the recording head IJH. Reference numeral 5015 represents a suction unit for performing a suction operation of a portion within the capping member 5022. The suction unit 5015 performs suction recovery of the recording head IJH via an opening 5023 of the portion within the capping member 5022. Reference numeral 5017 represents a cleaning blade. A member 5019 causes the cleaning blade 5017 to move in forward and backward directions. The cleaning blade 5017 and the member 5019 are supported on a supporting plate 5018 of the main body of the printer. A well-known cleaning blade may, of course, be used as the above-described cleaning blade. A lever 5021 is used for starting suction of suction recovery. The lever 5021 moves in accordance with the movement of a cam 5020 engaged with the carriage HC. In order to move the lever 5021, the driving force from the driving motor 5013 is transmitted through a known transmission mechanism, such as a clutch or the like.

Desired processing from among the above-described capping processing, cleaning processing, and suction recovery processing is performed at a corresponding position according to the operation of the lead screw 5005 when the carriage HC reaches a home-position region. The desired processing can be realized at a well-known timing.

Figure 21:
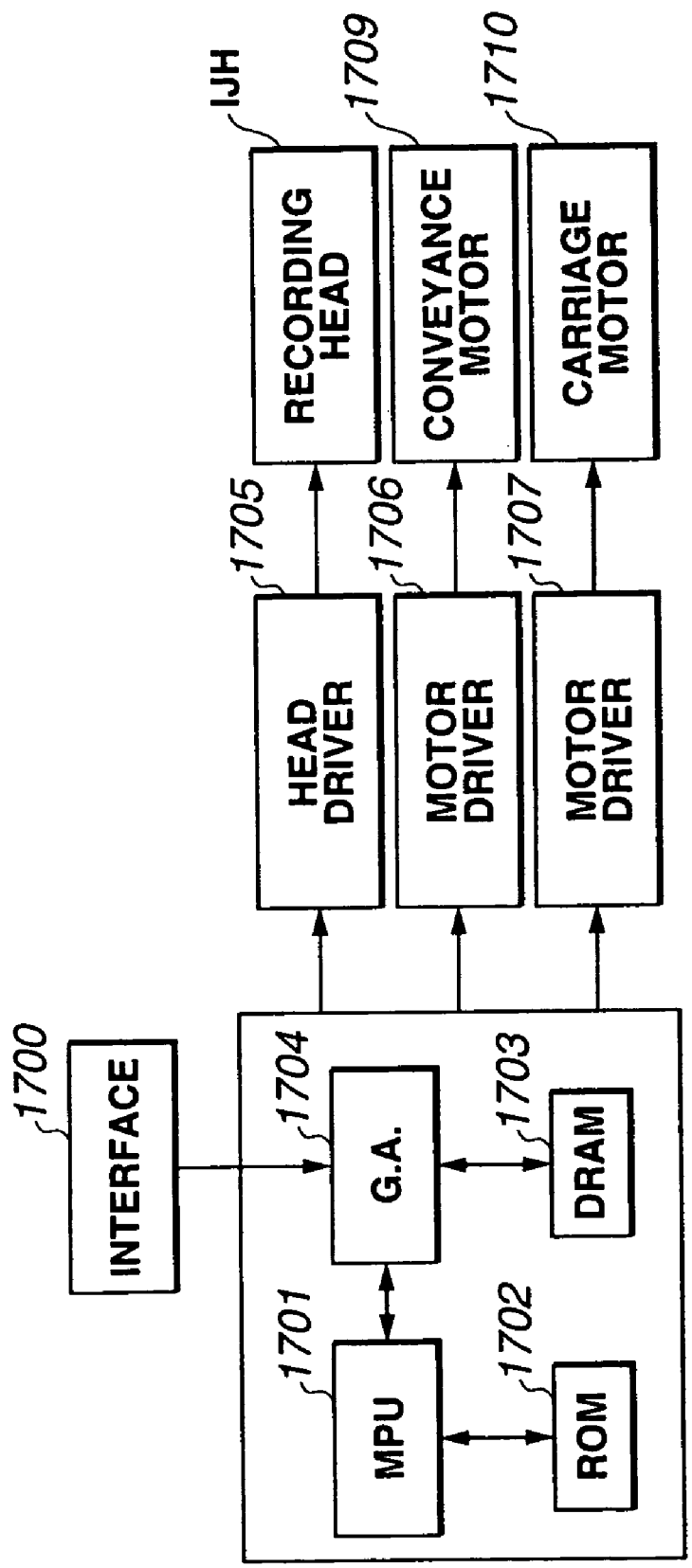
FIG. 21 is a block diagram illustrating the configuration of the ink-jet printer shown in FIG. 2.

FIG. 21 is a block diagram illustrating the configuration of a control circuit of the ink-jet printer IJRA shown in FIG. 2.

In FIG. 21, there are shown an interface 1700 for inputting a recording signal, an MPU (microprocessor unit) 1701, a ROM 1702 storing control programs to be executed by the MPU 1701, and a DRAM (dynamic RAM) 1703 for storing various data (the recording signal, recording data to be supplied to the recording head IJH, and the like). A gate array (G.A.) 1704 controls supply of recording data to the recording head IJH, as well as data transfer with the interface 1700, the MPU 1701 and the DRAM 1703.

A carriage motor 1710 conveys the recording head IJH. A conveyance motor 1709 conveys a recording sheet. A head driver 1705 drives the recording head IJH. Motor drivers 1706 and 1707 drive the conveyance motor 1709 and the carriage motor 1710, respectively.

When a recording signal is input to the interface 1700, the recording signal is converted into recording data for printing by the gate array 1704 and the MPU 1701. Recording is performed by driving the conveyance motor 1709 and the carriage motor 1710 by the motor drivers 1706 and 1707, respectively, and driving the recording head IJH in accordance with the recording data transmitted to the head driver 1705.

Although in the foregoing description, it is assumed that control programs to be executed by the MPU 1701 are stored in the ROM 1702, an erasable/writable storage medium, such as an EEPROM (electrically erasable and programmable ROM), or the like, may be added, and a control program may be changed from a host computer connected to the recording apparatus.

Although the exchangeable ink cartridge IJC obtained by integrally forming the ink tank IT and the recording head IJH may be used as described above, the ink tank IT and the recording head IJH may be separately provided, and only the ink tank IT may be exchanged when ink is used up.

Figure 22:
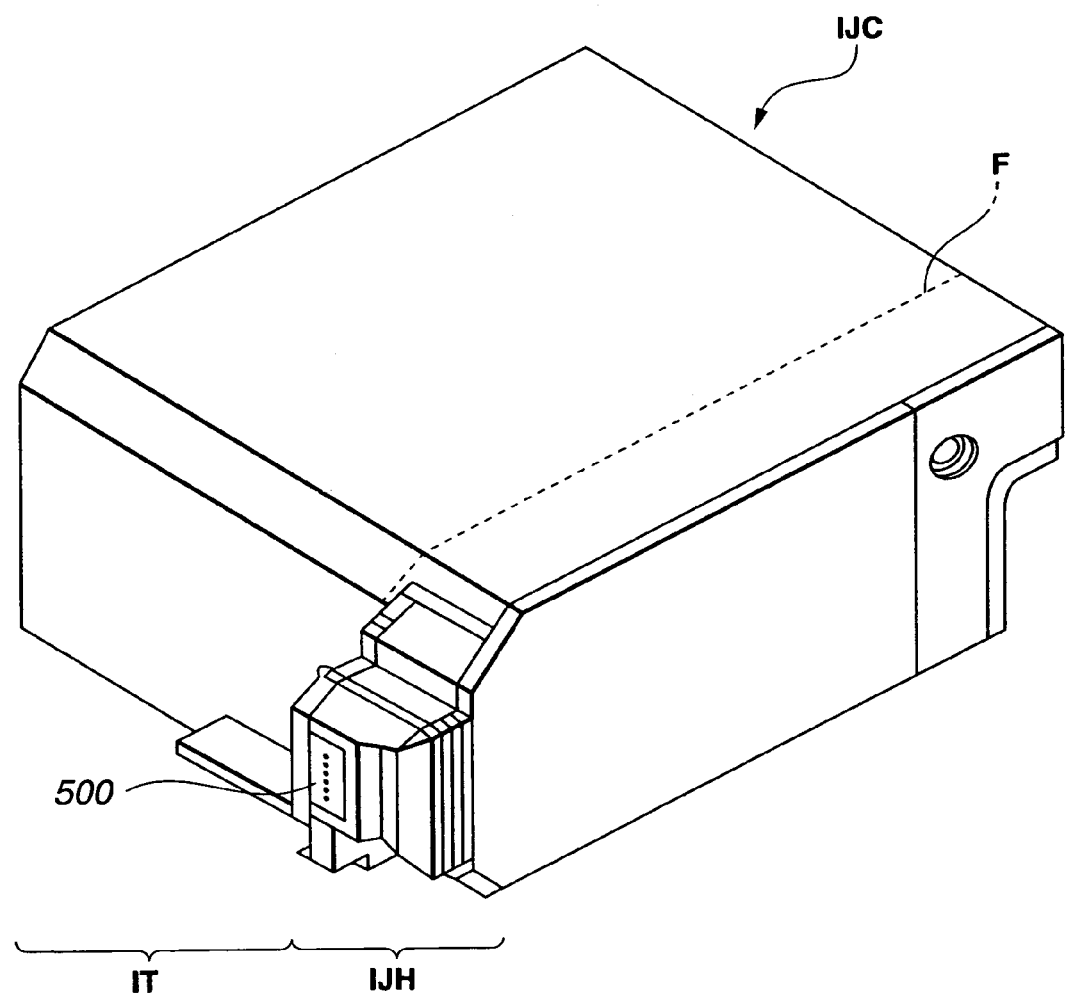
FIG. 22 is a perspective view illustrating an ink cartridge.

FIG. 22 is a perspective view illustrating an external appearance of an ink cartridge IJC in which the ink tank IT and the recording head IJH can be separated. As shown in FIG. 22, in the ink cartridge IJC, the ink tank IT can be separated from the recording head IJH at the position of a border line F. The ink cartridge IJC has electrodes (not shown) for receiving an electrical signal supplied from the carriage HC when the ink cartridge IJC is mounted on the carriage HC. The recording head IJH is driven in the above-described manner by the electrical signal in order to discharge ink.

In FIG. 22, reference numeral 500 represents an ink-discharging-port string. A fibrous or porous ink absorbing member for holding ink is provided in the ink tank IT. Ink is held by the ink absorbing member.

Although in the foregoing description, it is assumed that ink droplets are discharged from the recording head IJH and the liquid accommodated in the ink tank IT is ink, the liquid is not limited to ink. For example, a processing liquid to be discharged against a recording medium in order to improve the fixability and the water resisting property of the recorded image and to improve the quality of the image may be accommodated within the ink tank IT.

Figure 3:
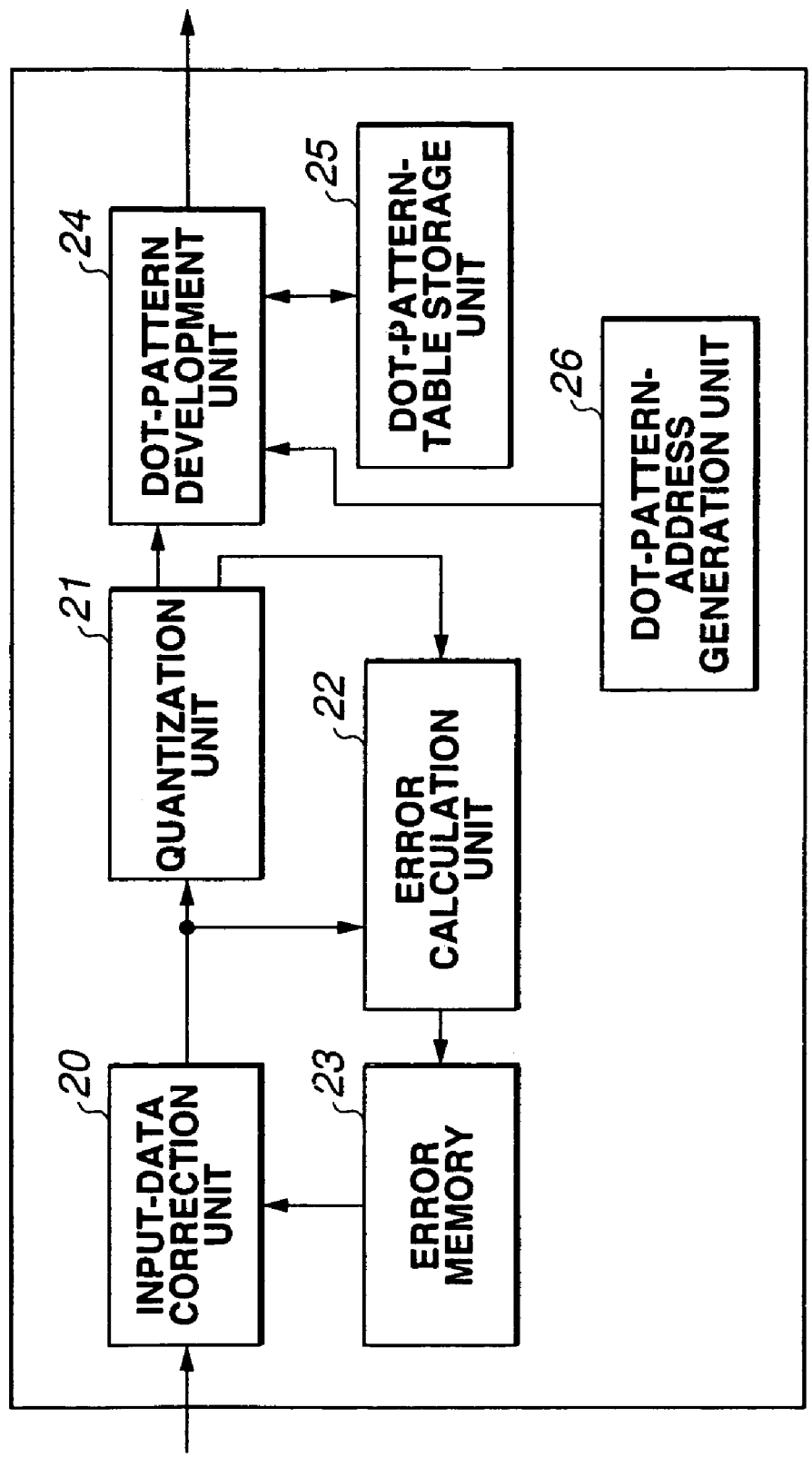
FIG. 3 is a block diagram illustrating the detailed configuration of an image processing unit 11 shown in FIG. 1.

FIG. 3 is a block diagram illustrating the detailed configuration of the image processing unit 11.

In FIG. 3, an input-data correction unit 20 corrects input image data by inputting multi-valued image data, represented, for example, by 8 bits per pixel (256 gradation levels) from the image input unit 10, and adding error data generated at a quantized pixel to image data of the current pixel. At that time, since error data represented by 9 bits (−255–255) is added to a value within a range of 0–255 represented by input image data for one pixel (8 bits), image data obtained by adding error for one pixel is represented by 10 bits, i.e., a value within a range of −255–510. In the first embodiment, however, the input-data correction unit 20 limits the image data within a range of 0–255, and outputs image data comprising 8 bits per pixel.

A quantization unit 21 quantizes the multi-valued image data corrected by the input-data correction unit 20 into an "N" value, which is a gradation value. The "N" value is determined by the relationship between input resolution and output resolution. That is, when the resolution of input image data is represented by A, and the resolution of output image data is represented by B (for the purpose of simplification, it is assumed that the same resolution is provided for the vertical and horizontal directions of the image), since a dot used for representing gradation is formed by $(B/A)^2$ dots for one pixel of the input image data, the number of gradation values which can be represented in one block is $(B/A)^2+1$, when one block comprises $(B/A)^2$ dots.

For example, when the input resolution is 300 dpi (dots per inch) and the output resolution is 600 dpi, the dot of output data is a block comprising 2×2=4 dots for input image data comprising 8 bits per pixel, so that the number of gradation values which can be represented by the block is 5. Accordingly, quantized values of "0", "64", "128", "192" and "255" are output from the quantization unit 21.

In this specification, values indicating gradation levels are represented by gradation values. That is, when the number of gradation levels is 5, gradation value "N" is represented by one of "0", "1", "2", "3" and "4". The respective quantized values correspond to gradation values. For example, the quantized values "0", "64", "128", "192" and "255" correspond to the gradation values "0", "1", "2", "3" and "4", respectively.

A quantized value is output from a quantization unit 21 to a dot-pattern development unit 24 shown in FIG. 25 (to be described later). A gradation value (information relating to the gradation value) corresponding to that quantized value may be output. In the following description, in order to facilitate understanding, it is assumed that gradation-value information is output from the quantization unit 21 to the dot-pattern-table development unit 24.

An error calculation unit 21 calculates an error between the quantized value obtained from the quantization unit 21 and multi-valued image data corrected by the input-data correction unit 20. In the above-described example, since the quantization unit 21 quantizes image data comprising 8 bits per pixel into five values, 8-bit data representing the values "0", "64", "128", "192" and "255" is input to the error calculation unit 22. Since image data comprising 8 bits per pixel (0–255) is input from the input-data correction unit 20, the value of error data obtained as a result of the calculation is a value within a range of −255–255, i.e., data represented by 9 bits.

An error memory 23 stores data obtained by distributing the error generated by the error calculation unit 22 to unprocessed surrounding pixels with predetermined distribution ratios. In an actual apparatus, the error memory 23 comprises a DRAM or the like.

FIG. 4 is a diagram illustrating such distribution ratios. In FIG. 4, a hatched pixel represents a target pixel (the current pixel position), a pixel surrounded by a frame represents a pixel where the error is distributed, and a numerical value indicated in the frame is the distribution ratio to the pixel. Accordingly, when distributing the error with distribution ratios shown in FIG. 4, the error memory 23 must have a capacity for at least two lines.

Gradation-value information after being quantized ("0", "1", "2", "3" and "4" in the case of five values) is output from the quantization unit 21 to a dot-pattern development unit 24.

The dot-pattern development unit 24 selects a dot-pattern table to be used for output from among a plurality of dot-pattern tables (each having a size of K×L dots) corresponding to respective gradation values, based on the gradation value obtained by quantization by the quantization unit 21, and acquires the desired dot-pattern table from a dot-pattern-table storage unit 25. At the same time, dot-pattern-address information corresponding to the current pixel position is provided from a dot-pattern-address generation unit 26. A dot pattern corresponding to the current pixel is developed and output in accordance with an address indicated by the information.

Figure 20:
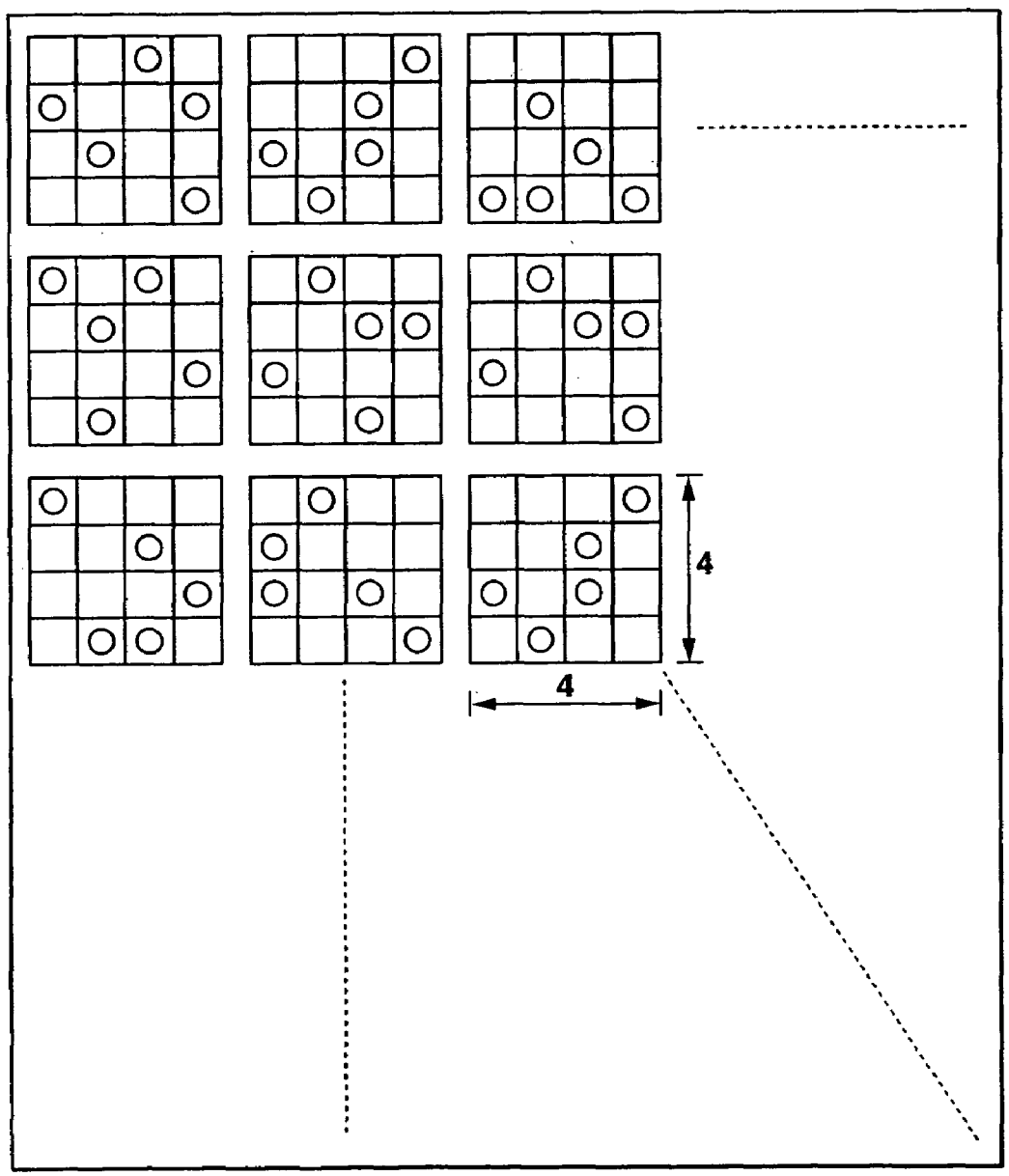
FIG. 20 is a diagram illustrating a dot-pattern table corresponding to gradation value "5"

The dot-pattern-table storage unit 25 stores a plurality of dot-pattern tables corresponding to respective gradation values. The dot-pattern-table storage unit 25 selects a desired dot-pattern table from among the plurality of dot-pattern tables, based on dot-pattern-table selection information supplied from the dot-pattern development unit 24, and outputs the selected dot-pattern table to the dot-pattern development unit 24. One dot-pattern table includes a plurality of different dot patterns corresponding to the gradation value. For example, from among dot-pattern tables, each including a plurality of 4×4 dot patterns (including 16 cells), a dot-pattern table for gradation value "5" includes a plurality of different dot patterns, each having 5 dots in 16 cells, as shown in FIG. 20. The dot-pattern-table storage unit 25 is provided in a semiconductor memory, such as an EEPROM or the like. In the image recording apparatus of the present invention, in consideration of performing processing at a high speed, a high-speed memory such as an SRAM (static RAM) or the like, may be used.

Figure 19:
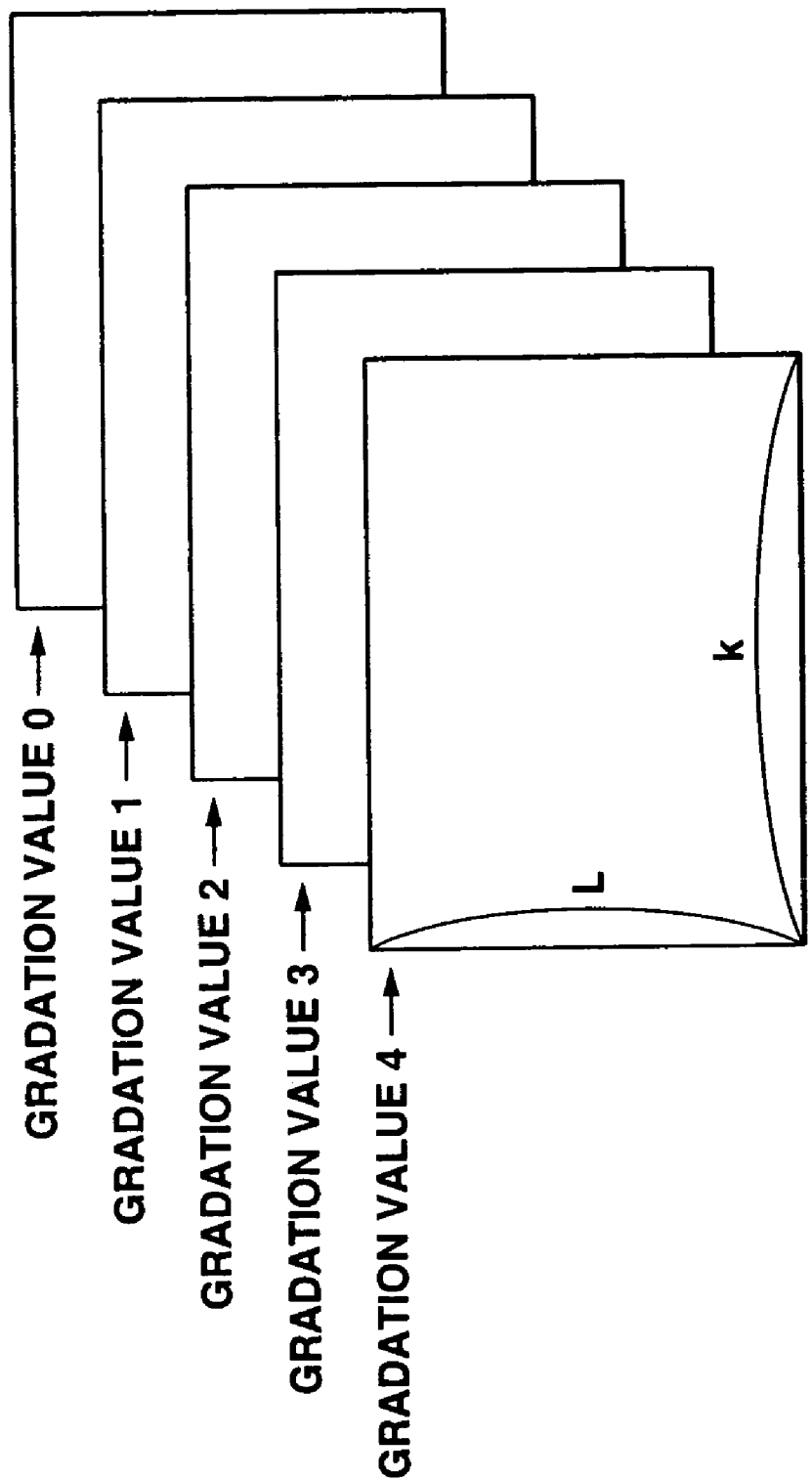
FIG. 19 is a diagram illustrating dot-pattern tables stored in a dot-pattern-table storage unit.

Each of dot-pattern tables stored in the dot-pattern-table storage unit 25 has a size of K×L dots for each gradation value. FIG. 19 illustrates the images of such dot-pattern tables. A dot-pattern table having a size of K×L dots is provided for a corresponding one of the gradation values "0", "1", "2", "3" and "4".

The dot-pattern-address generation unit 26 generates address information indicating the position of the dot pattern (k×l dots) for the current pixel in a corresponding dot-pattern table having the size of K×L dots, and outputs the address information to the dot-pattern development unit 24.

The address information is determined by pixel-position information indicated by input image data, the size of the entire dot-pattern table (K×L dots), and the size of a dot pattern to be output (k×l dots). When the pixel-position information of the input image data indicates a two-dimensional coordinate value (x, y), the value of a remainder obtained when the value x is divided by K/k (=Dx) and the value of a remainder obtained when the value y is divided by L/l (=Dy) constitute the address information for the current pixel within the dot-pattern table.

Figure 5A:
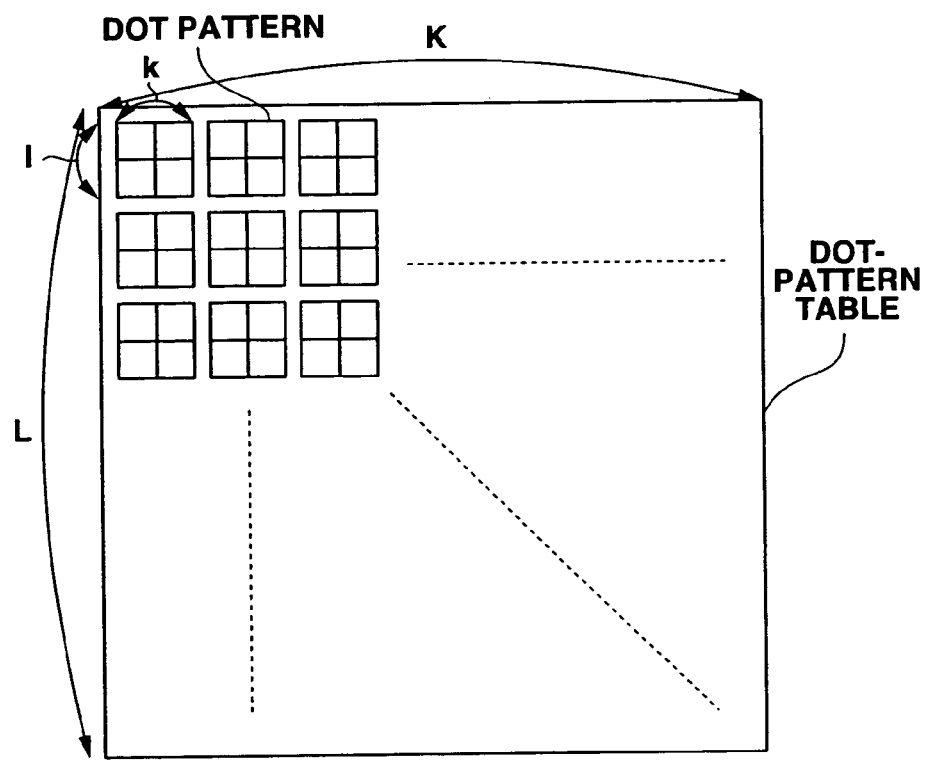
FIGS. 5A and 5B are diagrams illustrating the relationship between a dot-pattern table and dot patterns.
Figure 5B:
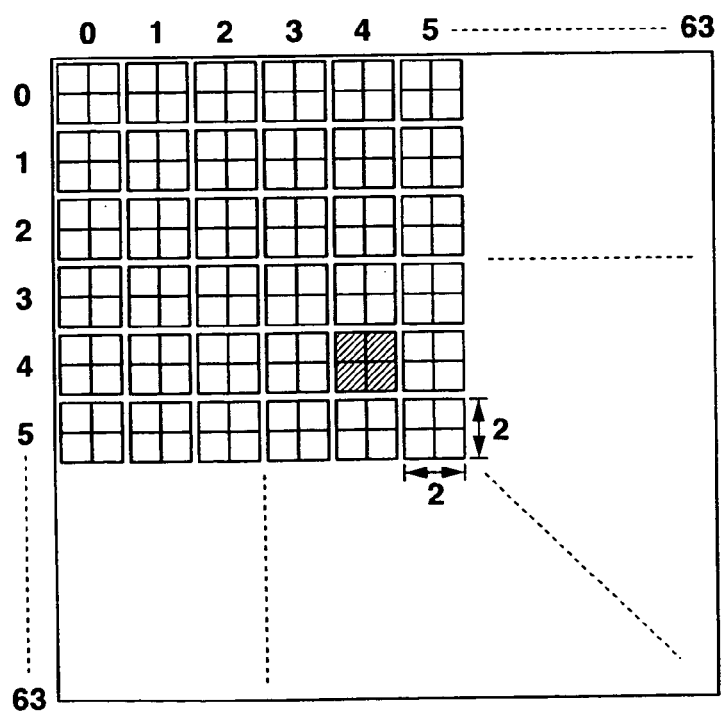

FIGS. 5A and 5B are diagrams illustrating the relationship between a dot-pattern table and dot patterns. FIG. 5A illustrates the relationship between the dot-pattern table (having a size of K×L dots) and a dot pattern (having a size of k×l dots). In FIG. 5A, α dot patterns are stored in a first direction (L direction), and β dot patterns are stored in a second direction (K direction). That is, the relationship between the size of the dot-pattern table and the size of the dot pattern is indicated by K=β×k (β is a natural number), and L=α×l (α is a natural number). A k×l dot pattern includes k×l cells.

FIG. 5B illustrates the relationship between the dot-pattern table and the dot pattern when the dot-pattern table has a size of 64×64 dots, and the dot pattern corresponding to one pixel of input image data includes 2×2 dots. In the case of FIG. 5B, the dot-pattern table has dot patterns corresponding to 32 pixels×32 pixels of the input image data. In other words, in this case, an address indicating the same dot pattern is provided for input image data at every 32 pixels in each of the vertical and horizontal directions. For example, when the pixel-position information (x, y) of input image data is (100, 100), the value of remainder "4" obtained by dividing each of the x coordinate value and the y coordinate value by "32" becomes the address information of the dot pattern. Accordingly, as shown in FIG. 5B, the dot pattern for the current pixel position is the dot pattern at the hatched position in the dot-pattern table.

The dot-pattern table is repeatedly used for a recording medium to be output. At that time, however, the period of the dot-pattern table becomes, in some cases, pronounced depending on the size of the dot-pattern table and the resolution of the output image, to be recognized as a texture. It is possible to make the repetition of the dot-pattern table less pronounced by shifting the address within the dot pattern when developing the dot pattern from the dot-pattern table.

This operation will be described with reference to FIG. 18.

Figure 18:
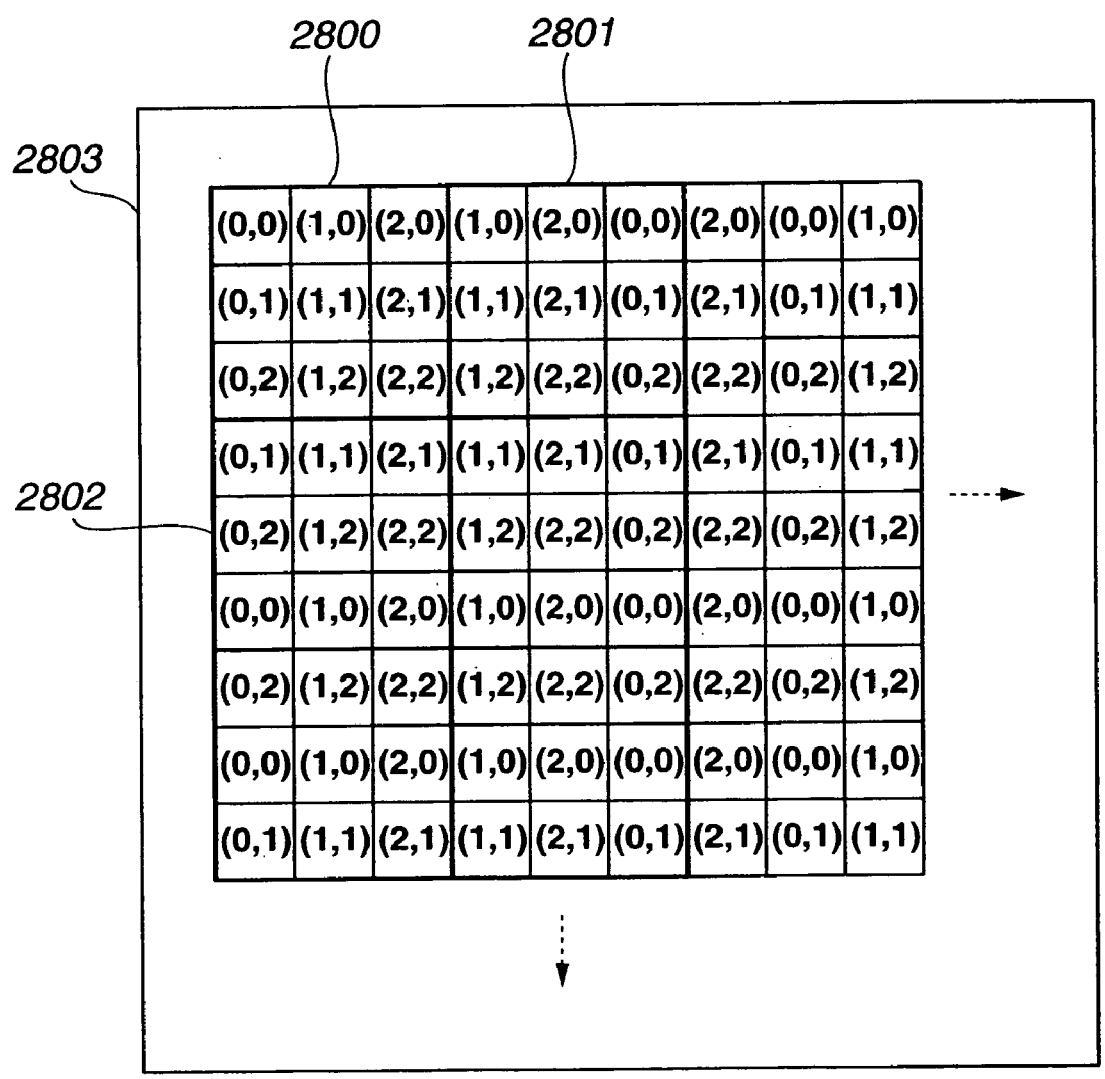
FIG. 18 is a diagram illustrating address shift within a dot-pattern table.

In FIG. 18, each of reference numerals 2800–2802 represents a dot-pattern table, and reference numeral 2803 represents the entire image to be recorded on a recording medium. The dot-pattern table includes 3×3 dot patterns. Numerals {*, *} within each dot pattern represent an address within the dot-pattern table. In FIG. 18, dot-pattern table 2801 has a dot-pattern arrangement in which the address within the dot-pattern table is shifted by one in the main scanning direction from the dot-pattern arrangement in dot-pattern table 2800. Similarly, in dot-pattern table 2802, the address within the dot-pattern table is shifted by one in the sub-scanning direction.

Thus, in contrast to the dot-pattern arrangement having a period in units of 3×3 when the address is not shifted, a period in units of 9×9 is provided when the address is shifted in each of the main scanning direction and the sub-scanning direction.

Such address shift is performed by the dot-pattern-address generation unit 26. The address shifting can be performed periodically or randomly.

The recording operation of the ink-jet printer used as the image output unit 12 shown in FIG. 2 will now be briefly described. The ink-jet printer has the recording head IJH where a plurality of ink discharging nozzles (hereinafter abbreviated as "nozzles") are arranged with a predetermined pitch. By discharging ink while reciprocating the recording head IJH, the ink-jet printer performs recording on a recording sheet, such as recording paper or the like, by the width of arrangement of nozzles (the recording width) at every scanning.

Figure 8:
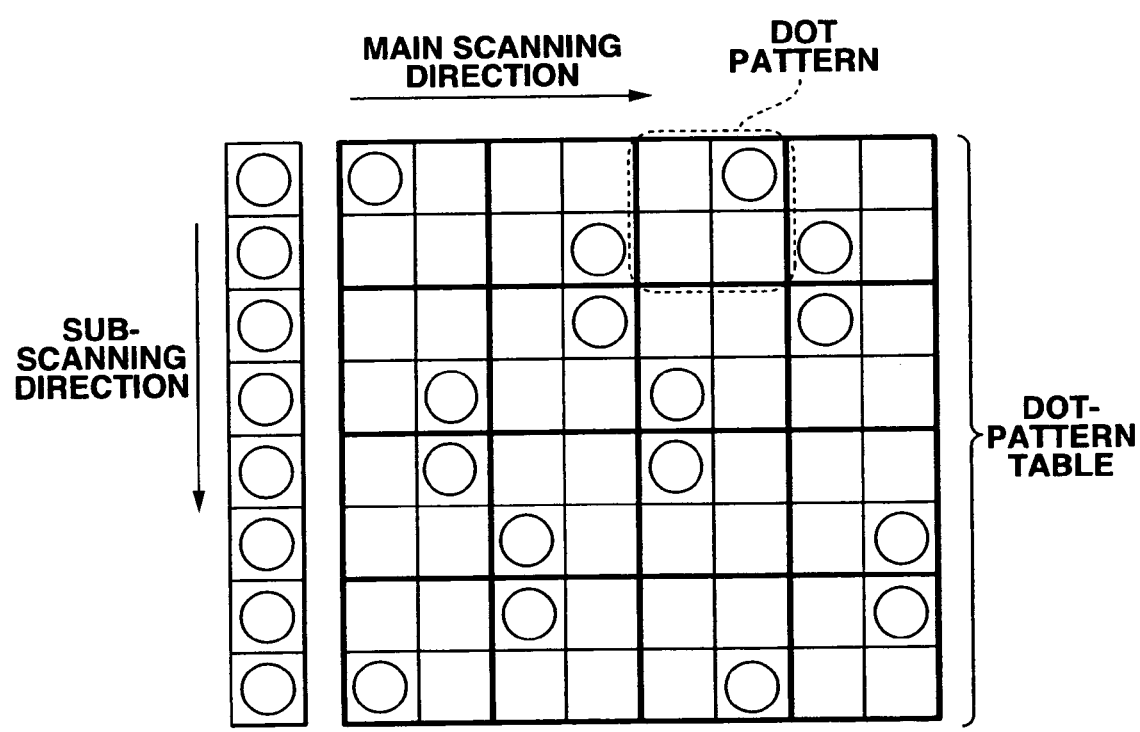
FIG. 8 is a diagram illustrating a dot-pattern table in which ink is equally discharged from each nozzle.

FIG. 6 is a diagram illustrating the relationship between the recording width and recording scanning of the recording head. In FIG. 8, in order to simplify description, it is assumed that the recording head has 8 nozzles.

As shown in FIG. 6, the recording head IJH having a plurality of (8) nozzles is mounted on the carriage, and an image is recorded by discharging ink while performing scanning by the recording head in the moving direction of the carriage (the main scanning direction). Upon completion of one scanning (n-th scanning in the case of FIG. 6), the recording head is returned to the home position, and the recording medium is conveyed in the direction of arrangement of the nozzles (the sub-scanning direction). Recording is continued by performing the next scanning operation (n+1-th scanning, and then, n+2-th scanning in the case of FIG. 6) using the next image data.

Figure 7:
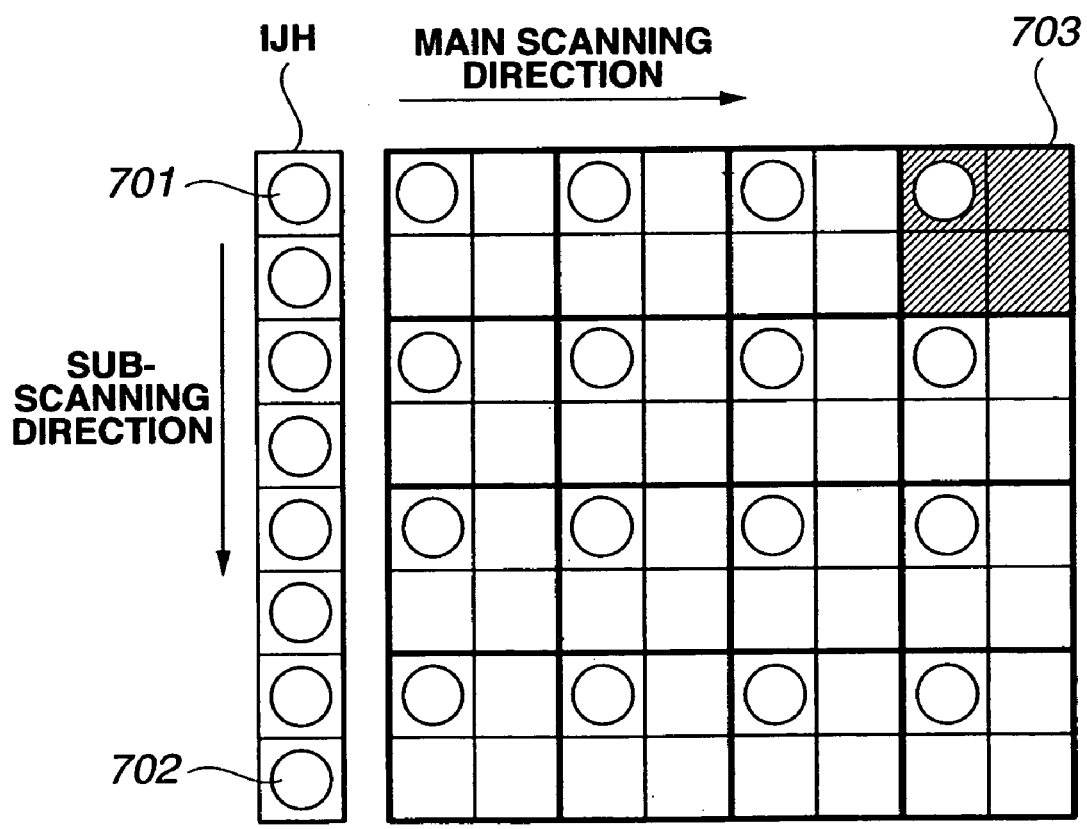
FIG. 7 is a diagram illustrating the relationship between nozzles of a recording head and the arrangement of dots recorded by discharging ink from the nozzles.

FIG. 7 is a diagram illustrating the relationship between the nozzles of the recording head and the arrangement of actually recorded dots by discharging ink from the nozzles. In FIG. 7, in order to simplify description, the size of each dot pattern is made to be 2×2 dots. However, the size of the dot pattern which can be used in the present invention is not limited to such a size. Any other appropriate dot-pattern size may, of course, be used.

If a dot pattern in which a dot is arranged at the same position for each pixel is always used as a dot pattern having only one dot in a dot pattern having 2×2 dots, i.e., a dot pattern indicating gradation value "1" in the case of quantization having 5 values, as shown in FIG. 7, the frequency of ink discharge from a specific nozzle of the recording head IJH becomes high. Accordingly, the characteristics of the specific nozzle (such as variations in the ink discharging direction, variations in the amount of ink discharge, and the like) are strongly reflected on the recorded image. As a result, if the nozzle has large variations in the characteristics, unevenness due to stripes tends to occur in the recorded image.

Accordingly, in the first embodiment, as shown in FIG. 8, even when recording a dot pattern for gradation value "1", the arrangement of dots is made to differ depending on the position of the pixel, in order to equally discharge ink from each nozzle. That is, the frequency of use of each nozzle is made equal.

As described above, in the first embodiment, in order to realize the arrangement of dots shown in FIG. 8, a dot-pattern table is used.

Figure 9:
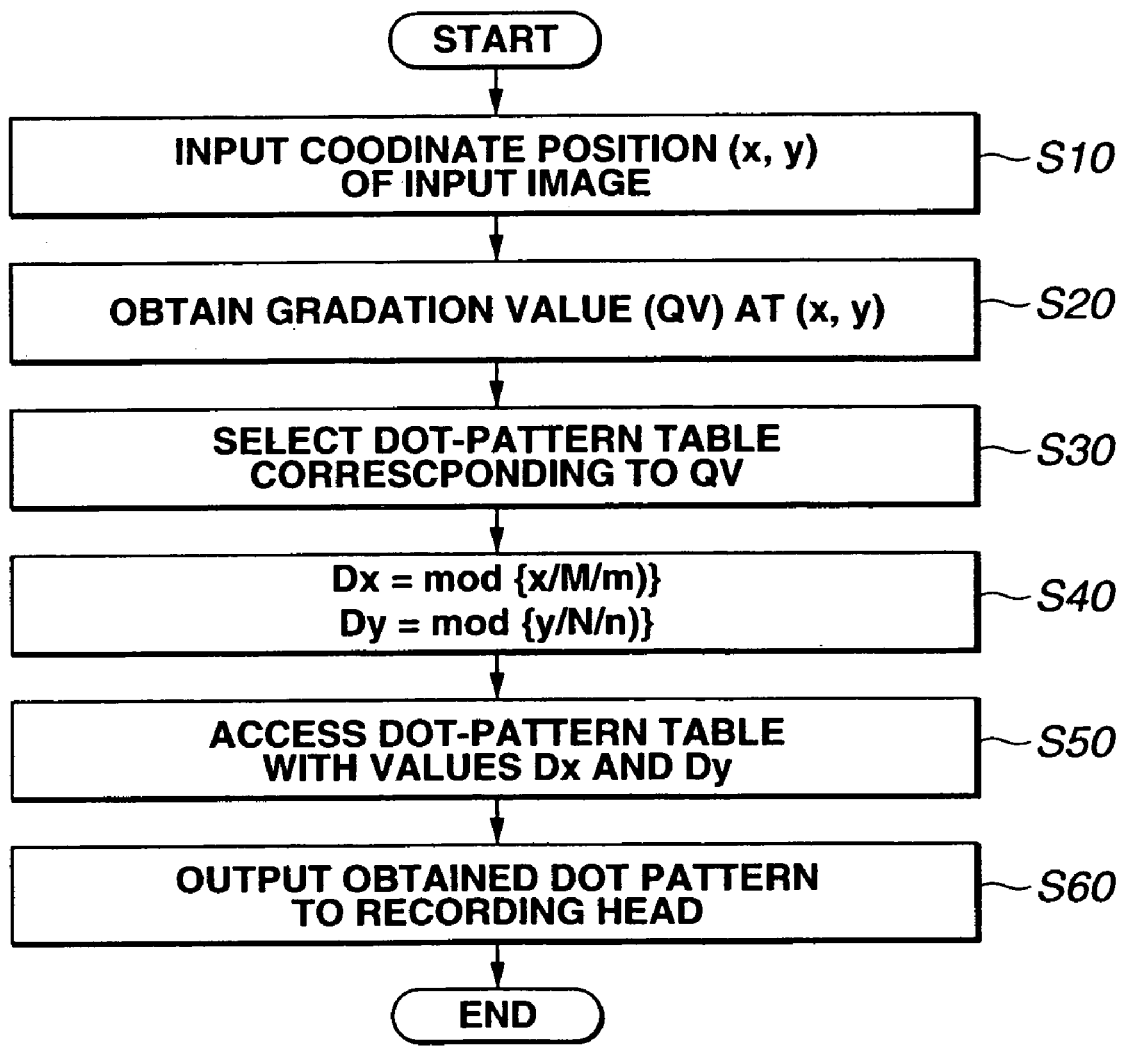
FIG. 9 is a flowchart illustrating dot-pattern selection processing.

Next, a description will be provided of the characteristics of the dot-pattern table and processing for selecting a dot pattern from the dot-pattern table, with reference to the flowchart shown in FIG. 9.

The dot-pattern table has the characteristics that the number of cells in the vertical direction (the sub-scanning direction) is the same as the number of the nozzles of the recording head IJH, and the number of cells in the horizontal direction (the main scanning direction) equals the number of cells large enough to absorb the influence of variations in the nozzle. In the case shown in FIG. 8, since the number of nozzles of the recording head is "8", the dot-pattern table has a size "8" in the vertical direction, and the same size in the horizontal direction in order to suppress the influence of variations in the nozzle.

The size in the horizontal direction varies depending on to what degree the influence of variations in the nozzle is to be suppressed.

The selection of a dot pattern from this dot-pattern table is executed by performing the following processing.

First, in step S10, the position coordinates (x, y) of the input image are input. In step S20, a quantized gradation value (QV) at the coordinates is obtained. In step S30, a dot-pattern table corresponding to the obtained gradation value is selected.

In step S40, an access address (Dx, Dy) to the dot-pattern table is calculated from the input coordinate value, and the ratio of the size of the dot-pattern table to the size of the dot pattern. In step S50, a dot pattern is obtained by accessing the dot-pattern table with that address.

Then, in step S60, the dot pattern is developed in the memory.

The above-described processing is performed by the dot-pattern development unit 24, the dot-pattern-table storage unit 25 and the dot-pattern-address generation unit 26 shown in FIG. 3. However, this processing may be realized by dedicated logic circuits, or by execution of a processing program by the CPU.

The dot pattern developed in the above-described manner is transferred to the ink-jet printer, and the recording head IJH performs recording by discharging ink based on the pattern.

According to the above-described first embodiment, when performing recording by discharging ink from the recording head based on the dot pattern corresponding to the quantized gradation value, a plurality of dot patterns are prepared even for the same gradation value in order to prevent concentration of ink discharge on the same nozzle even for the same gradation value, and different dot patterns are selected in accordance with the positions of the pixel to be recorded. As a result, it is possible to disperse ink discharge to a plurality of nozzles.

It is thereby possible to prevent strong reflection of the characteristics of a specific nozzle on the recorded image at a specific gradation value, and to reduce the occurrence of the phenomenon of degradation of the picture quality, such as unevenness due to stripes, in the recorded image.

Figure 10:
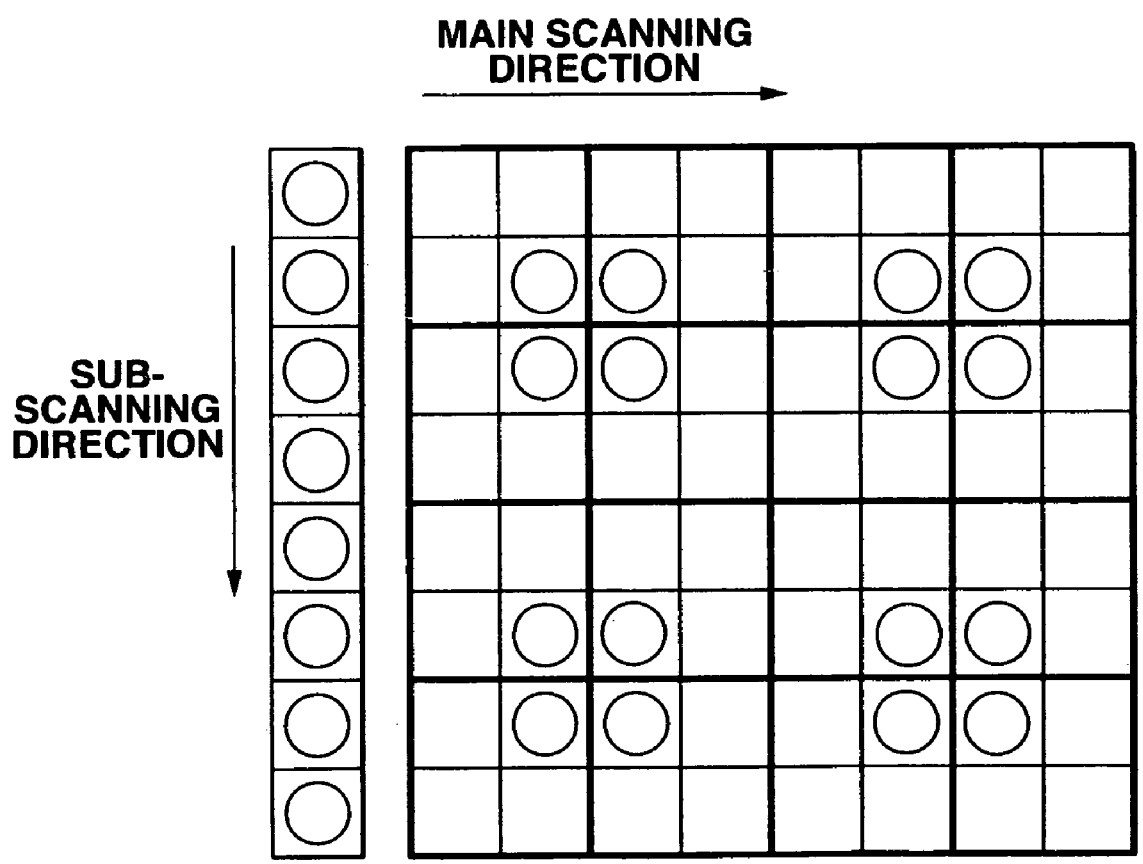
FIG. 10 is a diagram illustrating another dot-pattern table.

Dot patterns constituting a dot-pattern table are not limited to the above-described ones. For example, in the configuration of the nozzles of the recording head as shown in FIG. 7, if dots are not stably recorded because the diameter of the dot formed by ink discharge tends to vary between an upper-end nozzle 701 and a lower-end nozzle 702, or variations in the ink discharging direction from these nozzles tend to be larger than in the case of ink discharge from other nozzles, by arranging dot patterns in the dot-pattern table as shown in FIG. 10, it is possible to prevent the use of nozzles at end portions of the recording head as much as possible even with the same duty ratio (25% in the case of FIG. 10).

Thus, even when discharging characteristics from nozzles at end portions of the recording head greatly differ from the discharging characteristics from other nozzles, it is possible to suppress degradation of the recorded image due to the characteristics, and for example, to further improve unevenness due to stripes.

When recording an image by performing scanning by the recording head, even if the discharging characteristics from nozzles at end portions of the recording head do not differ from the discharging characteristics from other nozzles, for example, as shown in FIG. 6, overlap of dots recorded by different scanning operations may occur at border portions 601 and 602 between respective scanning operations, thereby causing higher density than in the case of overlap of dots occurred within the same scanning operation, and producing, in some cases, stripes in the recorded image.

Figure 11:
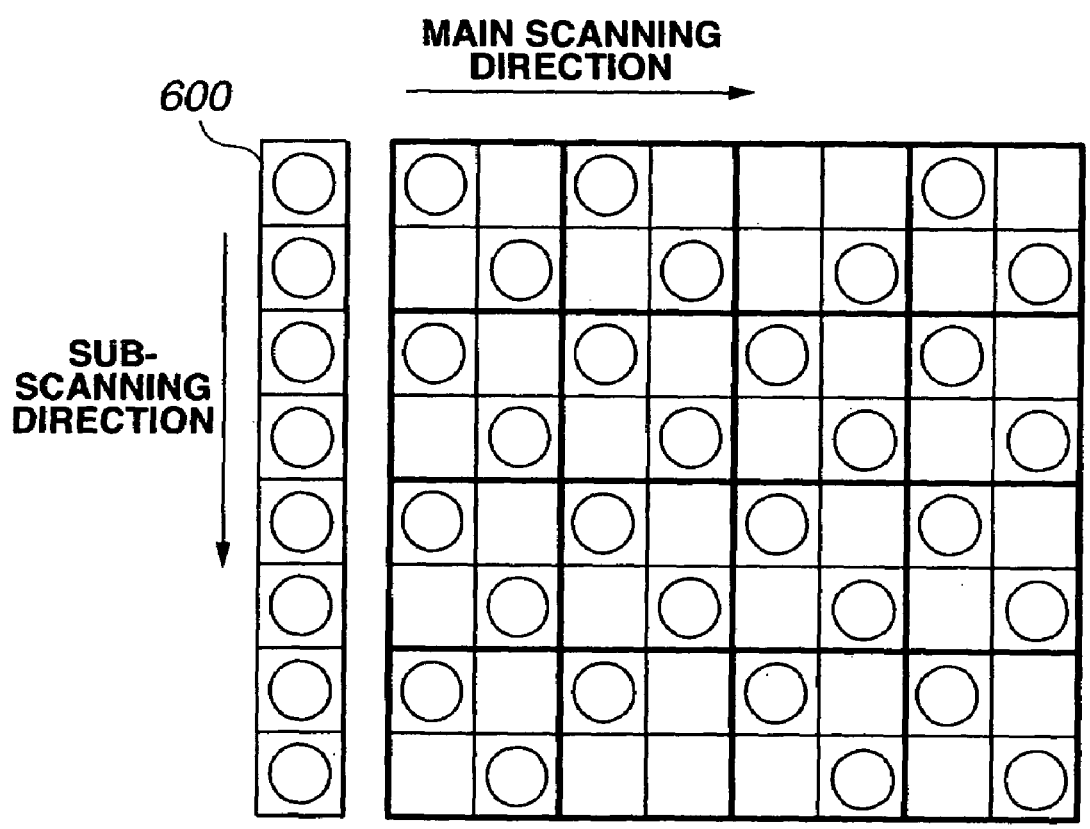
FIG. 11 is a diagram illustrating a dot-pattern table storing dot patterns whose recording duty ratio is reduced by 25% compared with an ordinary case.

In order to suppress the occurrence of such stripes, for example, if the rate of increase of the density at the border portions is about 25% in average, dot patterns whose recording duty ratio is reduced by 25% than in the ordinary case may be defined for the border portions, as shown in FIG. 11, and this dot-pattern table may be used.

For example, if each dot pattern has a size of 4×4 dots, the number of gradation values which can be represented is 4×4+1=17. The correspondence between this 17 gradation values and the ratio of the number of dots formed by ink discharge (=the duty ratio) in the matrix of 4×4 dots is as shown in FIG. 12. It is empirically known that the influence of variations in the characteristics of the nozzle for performing recording by discharging ink on unevenness due to stripes is most pronounced within a range of the duty ratio of 25%–50%. Hence, in order to suppress the occurrence of unevenness due to stripes, only the dot-pattern table corresponding to each of the gradation values having such duty ratios (4–8 in the case of FIG. 12) may have patterns where the positions of dots to be recorded are dispersed, as shown in FIG. 8. That is, the characteristics of the nozzle may be considered only for dot-pattern tables corresponding to gradation values having the ratio of dots D (%) provided within each pixel is within a range of $25 \leq D(\%) \leq 50$.

As described above, by utilizing the fact that dot-pattern tables whose number equals the number of gradation values of the density pattern are provided, it is possible to use an optimum dot pattern in accordance with a gradation value.

Although in the above-described first embodiment, the size of the dot-pattern table in the sub-scanning direction is made to be equal to the recording width of the recording head, the present invention is not limited to such an approach. For example, in the case of a recording head having a very small number of nozzles as shown in FIG. 7, if the size of the dot-pattern table in the direction of the arrangement of nozzles (the sub-scanning direction) covers only the recoding width of the recording head, the same dot pattern is, in some cases, considerably frequently arranged in the sub-scanning direction. As a result, the recorded image tends to be influenced, for example, by variations in the speed of the carriage motor used when performing scanning by the recording head.

In order to minimize such influence, the size of the dot-pattern table in the sub-scanning direction may be set to an integer multiple of the number of the nozzles of the recording head, for example, in the case of FIG. 7, "32" which is 4 times the number of nozzles "8", in order to reduce the frequency of use of the same dot pattern in the sub-scanning direction. When using a recording head having a large number of nozzles, for example, 256 nozzles, since unevenness can be sufficiently improved by using a dot-pattern table whose size equals the number of nozzles, the size of the dot pattern need not be further increased.

As can be understood from the foregoing description, when the number of cells (the size) of the dot-pattern table in the sub-scanning direction is represented by L (L is a natural number), and the number of nozzles of the recording head is represented by A (A is a natural number), by making the relationship between L and A to be L=γ×A (γ is a natural number), the occurrence of unevenness in the density and unevenness due to stripes in the recorded image can be effectively prevented. When the relationship between the size of the dot-pattern table and the number of nozzles of the recording head satisfies L=γ×A, since the size of the dot-pattern table in the sub-scanning direction equals at least the recording width of the recording head, it is possible to determine the dot-pattern table in consideration of the characteristics of (the amount of ink discharge, twist, and the like) of each of a plurality of nozzles. That is, the dot-pattern table can be determined in consideration of the characteristics of all nozzles to be used. Thus, it is possible to form a dot-pattern table which can reduce the frequency of use of nozzles having an inferior ink-discharging property, such as a nozzle having a very small amount of ink discharge, a nozzle having large twist, and the like, and to obtain a high-quality recorded image by performing recording based on the dot-pattern table.

Although in the foregoing description, the dot-pattern table is formed in consideration of the characteristics of nozzles of the recording head, the present invention is not limited to such an approach. For example, the arrangement of dots within the dot-pattern table may have a pattern having a blue-noise characteristic. Such a blue-noise pattern has characteristics favorable from the viewpoint of the human visual sense. Hence, by utilizing a blue-noise pattern, it is possible to obtain a high-quality image in which noise is less sensed.

The blue noise will now be briefly described. Methods for generating a blue-noise pattern (a blue-noise mask) and features of blue noise are disclosed in a large number of literatures, such as "Digital Halftoning" Robert Ulichneey (the Mit Press Cambridge, Mass. London, England). The blue noise is generated in order to reduce the sense of presence of noise in the output image by suppressing the power spectrum of a low-frequency component. The reason why the power spectrum of a low-frequency component is suppressed is as follows. That is, the sensitivity of human eyes is much higher in a low-frequency region than in a high-frequency region. Hence, if at least a constant amount of a power spectrum is present in a low-frequency region, the sense of presence of noise (the sense of roughness) appears due to the human visual characteristics. Since the sense of roughness appears if the power spectrum is present in the low-frequency region, a blue noise mask is used in which the power spectrum of the image is concentrated in a high-frequency region by suppressing the power spectrum of the low-frequency region. By performing halftone processing using blue noise in which the spectrum of the low-frequency region is suppressed in the above-described manner, the above-described "sense of roughness" can be removed.

Second Embodiment

In a second embodiment of the present invention, a multi-path recording method, in which recording on the same region of a recording medium is completed by performing scanning of the region by a recording head a plurality of times, is executed. In order to simplify the description, a case in which the same region is scanned twice will be described. Since the second embodiment is the same as the above-described first embodiment except that the multi-path recording method is executed, the above-described FIGS. 1–5, and FIGS. 8–12 can also be applied to the second embodiment. Hence, further description thereof will be omitted.

FIG. 13 is a schematic diagram illustrating how two-path recording is performed.

As shown in FIG. 13, every time the recording head performs one scanning operation, the recording medium is conveyed by ½ of the recording width of the recording head, so that recording is completed by two scanning operations on the same region of the recording medium. The first scanning operation from among the two scanning operations (when the recording head passes through the current recording region) is called a first path, and the second scanning operation is called a second path. At that time, as can be understood from FIG. 13, the lower half portion of the recording head is always used for recording at the first path, and the upper half portion of the recording head is used for recording at the second path.

As described in the first embodiment, since the size of the dot-pattern table in the sub-scanning direction corresponds to the recording width of the recording head, the lower half portion of each of the dot-pattern tables shown in FIGS. 7 and 8 is always used for recording at the first path, and the upper half portion of the recording head is always used for recording at the second path.

Even when adopting the multi-path recording method, unevenness due to stripes tends to occur at positions 1001–1003 shown in FIG. 13, i.e., at border portions between paths, due to variations in the direction of ink discharge from the nozzle, an error in the conveyance of the recording medium, variations in the image density due to time difference between scanning operations, and the like.

Figure 14A:
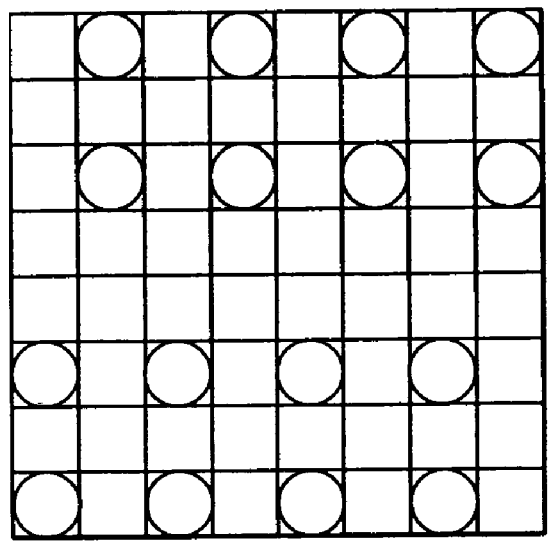
FIGS. 14A and 14B are diagrams illustrating an example of arrangement of dots when performing recording with a duty ratio of 50%, and a dot-pattern table used for the recording, respectively.
Figure 14B:
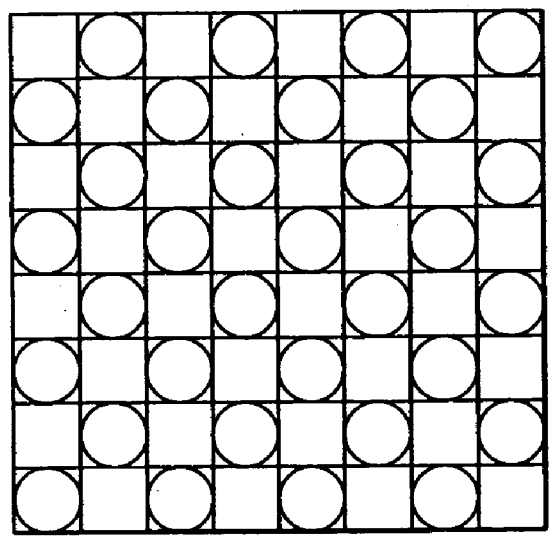
Figure 15:
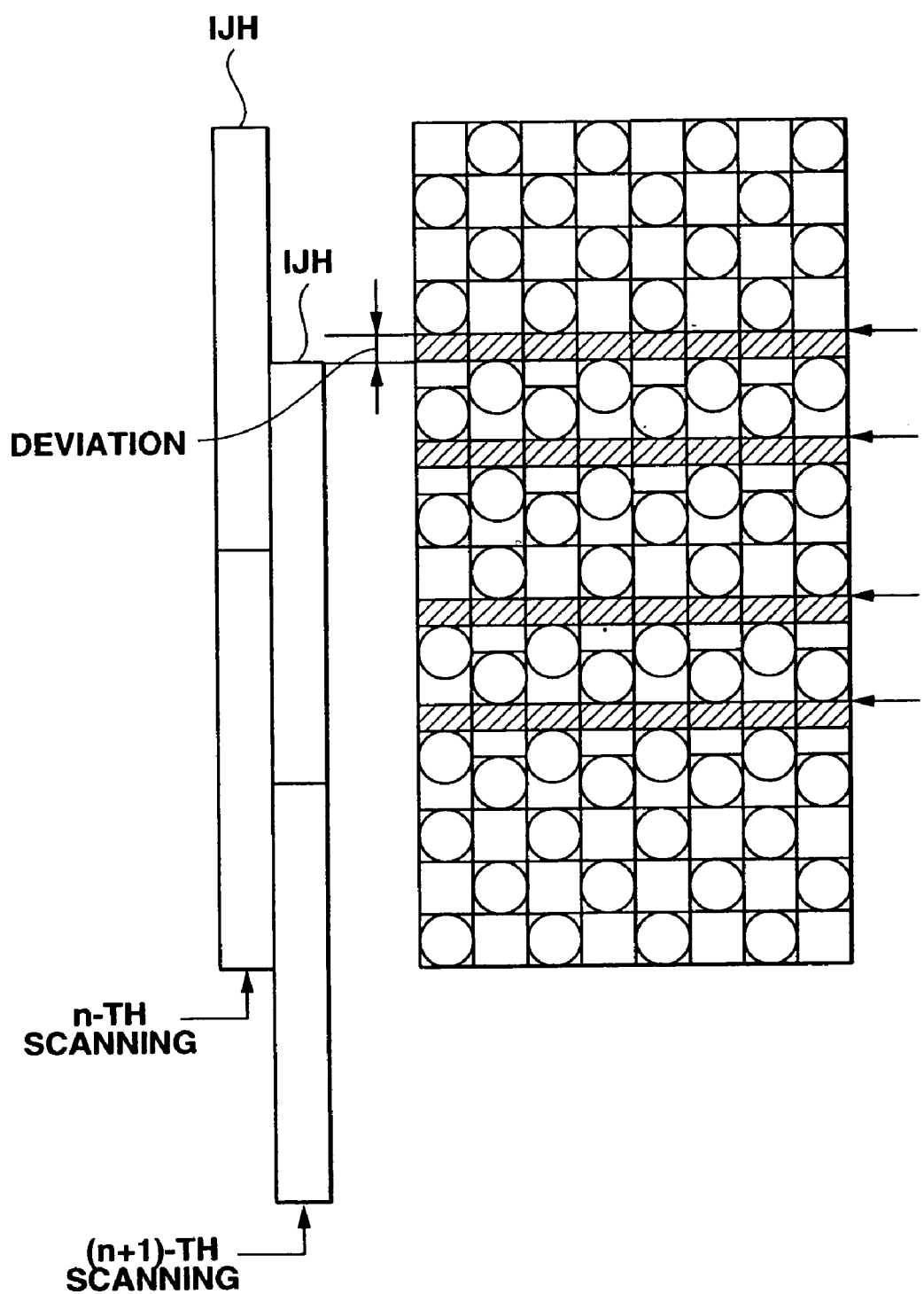
FIG. 15 is a diagram illustrating how stripes are generated at borders of paths in multi-path recording.

For example, consider a case in which, when recording dots with a duty ratio of 50% as shown in FIG. 14A, the first path is recorded by the upper half portion of the recording head and the second path is recorded by the lower half portion of the recording head using a dot-pattern table as shown in FIG. 14B. In this case, as shown in FIG. 15, if the relative position of the recording head IJH with respect to the recording medium when performing recording at the second path is greatly shifted from an initial conveyance position, dots are not recorded at portions indicated by arrows and hatching in FIG. 15. These portions are recognized by human eyes as stripes.

Figure 16:
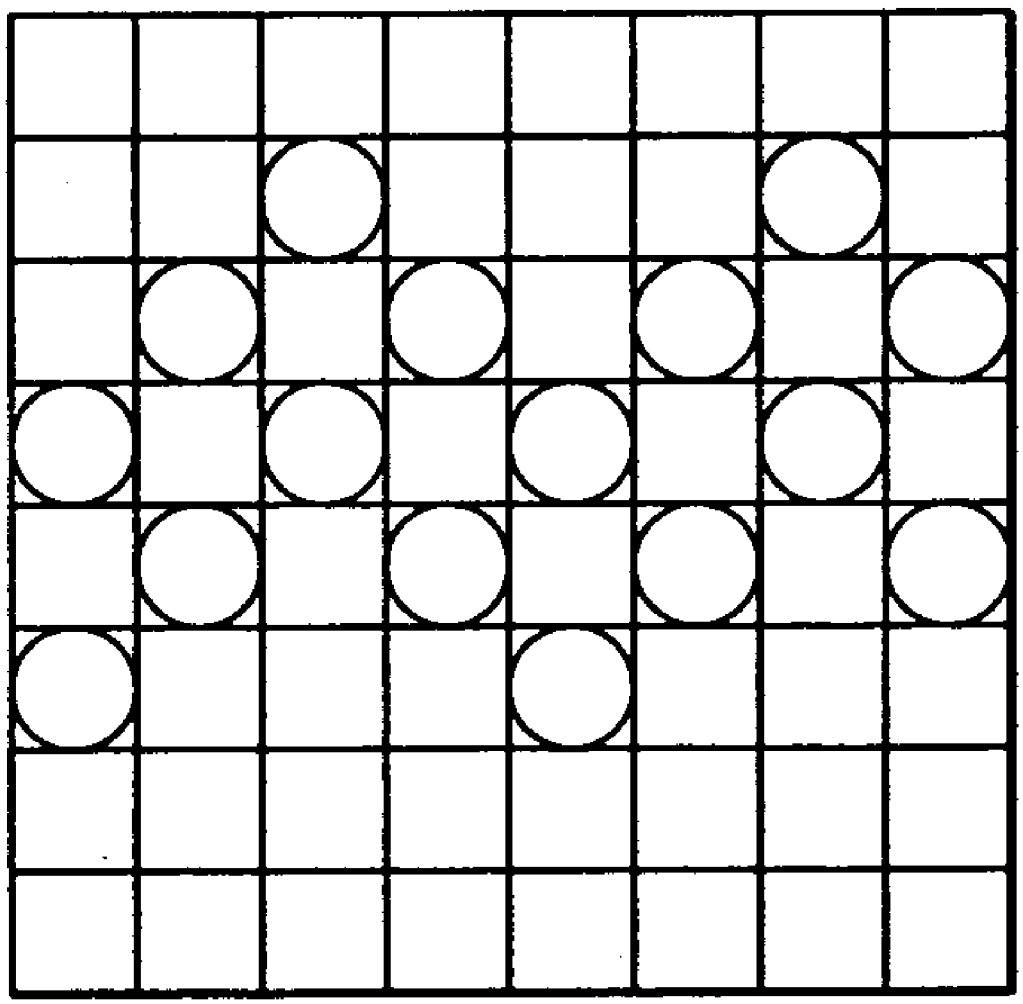
FIG. 16 is a diagram illustrating a dot-pattern table according to a second embodiment of the present invention.
Figure 17:
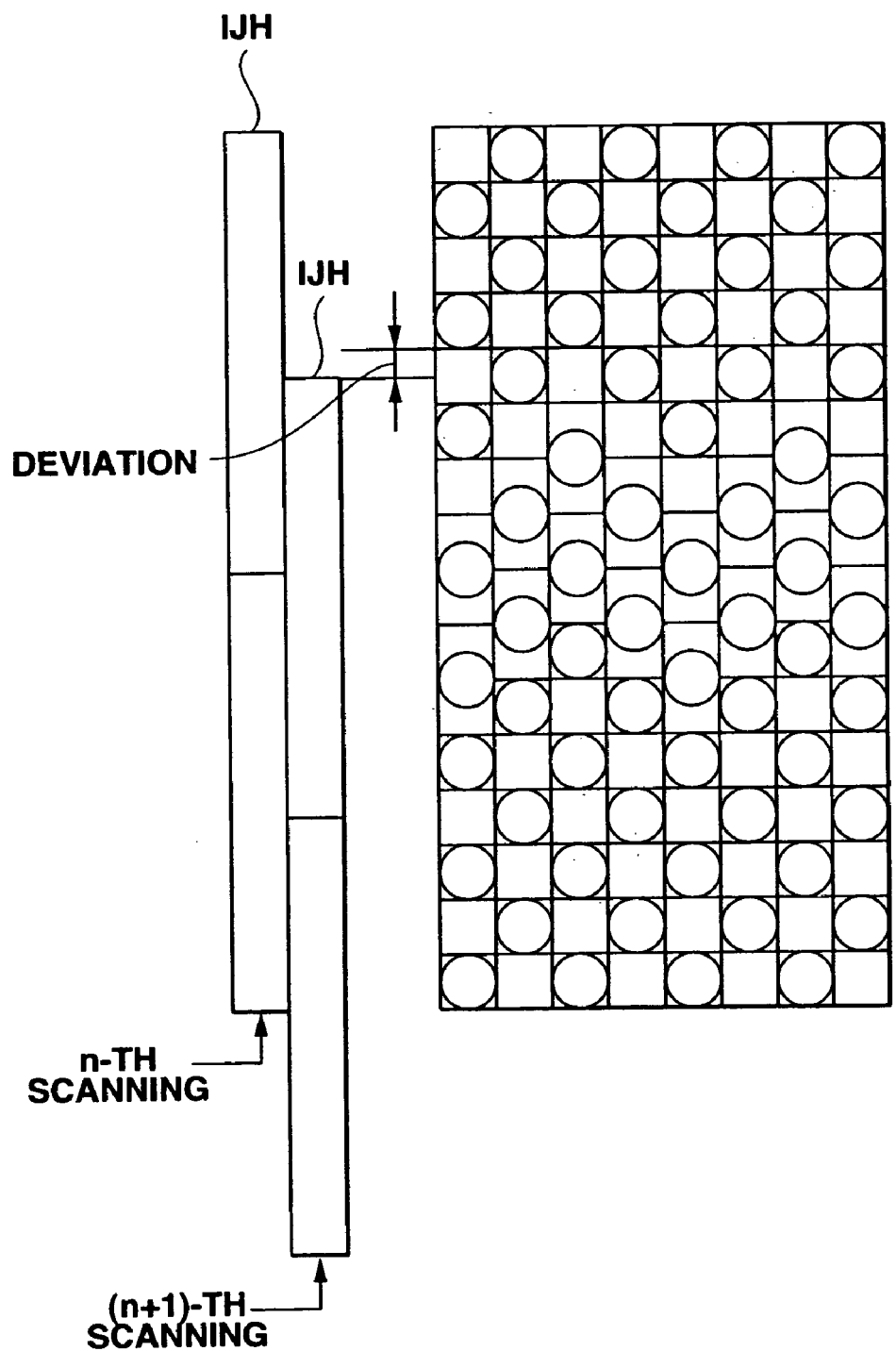
FIG. 17 is a diagram illustrating a result of recording using the dot-pattern table shown in FIG. 16.

Accordingly, in the second embodiment, even when recording dots shown in FIG. 14A, a dot-pattern table as shown in FIG. 16 is used. When performing two-path recording by selecting dot patterns using this dot-pattern table, a result of recording as shown in FIG. 17 is obtained. As is apparent by comparing FIG. 17 with FIG. 15, even if a conveyance error is generated at the same position shown in FIG. 15, regions where dots are not recorded as shown in FIG. 15 are not generated in FIG. 17. Accordingly, unevenness due to stripes is hardly recognized by human eyes.

According to the above-described second embodiment, it is possible to set in advance dot patterns which hardly generate stripes, in consideration of border portions between paths in multi-path recording, as dot patterns to be stored in the dot-pattern table. Hence, it is possible to perform optimum recording than in the conventional case of masking dot patterns by a mask pattern in multi-path recording after determining in advance the dot patterns.

Third Embodiment

A third embodiment of the present invention will now be described.

Figure 23:
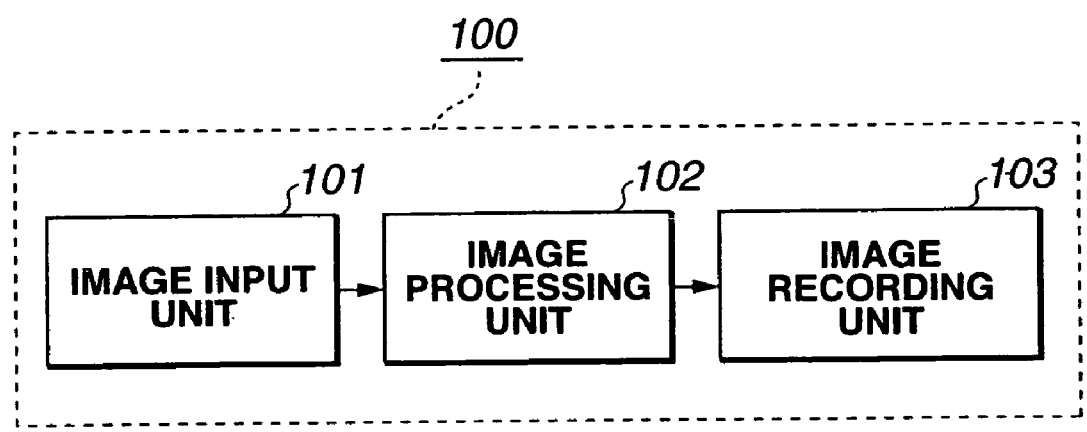
FIG. 23 is a block diagram illustrating the configuration of an image recording apparatus according to a third embodiment of the present invention.

FIG. 23 is a block diagram illustrating the configuration of an image recording apparatus according to the third embodiment.

In FIG. 23, reference numeral 100 represents the entire image recording apparatus. An image input unit 101 inputs multi-valued image data from an image input apparatus, such as a scanner, a digital camera, or the like, or multi-valued image data stored in each type of storage medium, such as a hard disk, or the like. An image processing unit 102 performs image processing (to be described later) for the multi-valued image data-input by the image input unit 101, to convert the multi-valued image data into a binary image data. An image recording unit 103 receives the binary image data from the image processing unit 102, and performs actual image formation. Although not illustrated in FIG. 23, the operations and linked operations with other units of the units constituting the image recording apparatus are controlled by a CPU. In addition to the CPU, the image recording apparatus includes a ROM storing control programs to be executed by the CPU, a RAM used as working areas for executing the control programs, and the like.

Figure 24:
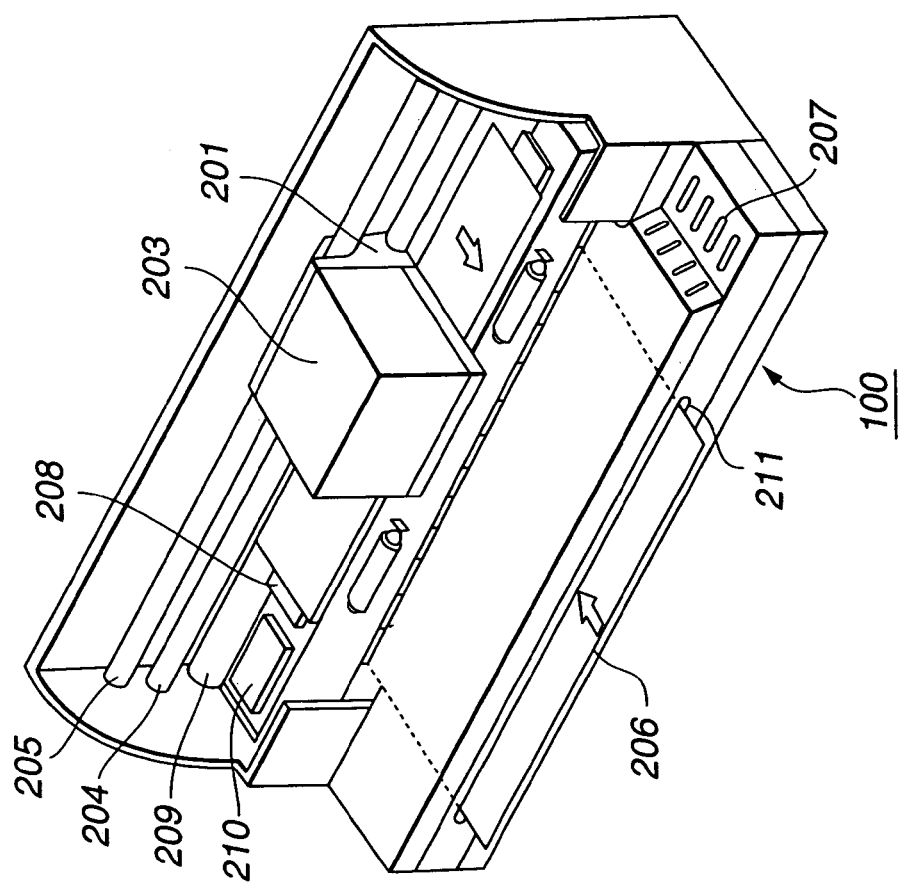
FIG. 24 is a schematic perspective view illustrating the image recording apparatus of the third embodiment.

FIG. 24 is a schematic perspective view illustrating the image recording apparatus of the third embodiment. A recording medium 206 inserted at a sheet feeding position 211 of an image recording apparatus 100 is conveyed to a recordable region of a recording head unit 203 by a feeding roller 209. A platen 208 is provided below the recording medium 206 in the recordable region. A carriage 201 is movable in directions determined by two guide shafts 204 and 205, in order to reciprocate the recordable region. A recording-head unit 203 including recording heads for discharging ink materials of a plurality of colors, and ink tanks for supplying the recording heads with corresponding ink materials is mounted on the carriage 201. The plurality of colors of the ink materials provided in this ink-jet recording apparatus are four colors, i.e., black (Bk), cyan (C), magenta (M) and yellow (Y).

A recovery-system unit 210 is provided at a lower portion of the left end of a region where the carriage 201 can move, and performs operations of capping the portion of discharging ports of the recording head, and the like. The left end is called a home position of the recording head.

Reference numeral 207 represents a switch unit and a display unit. The switch unit is used, for example, when turning on/off the power supply of the recording apparatus, or setting various recording modes. The display unit displays the state of the recording apparatus.

Figure 25:
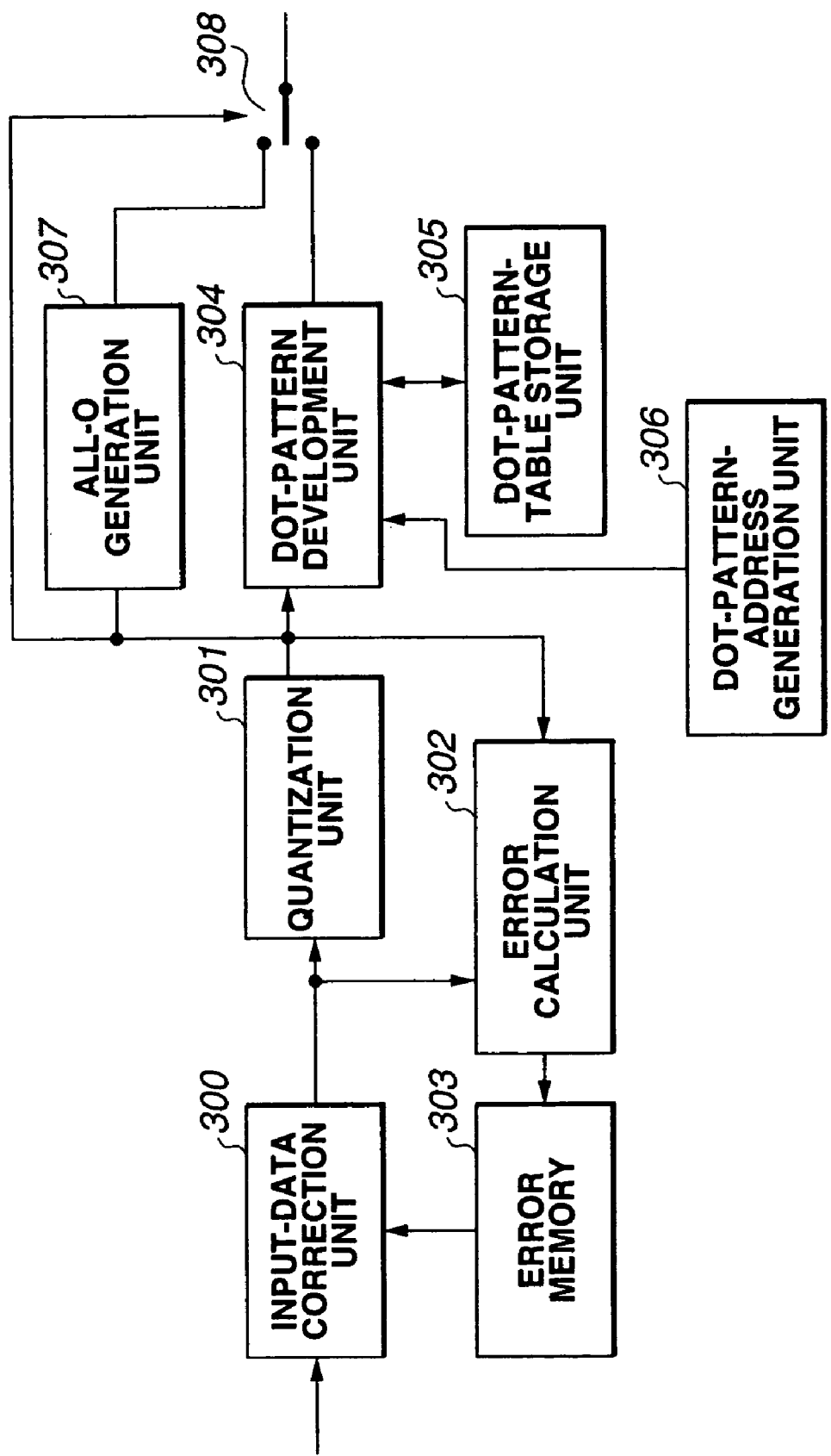
FIG. 25 is a block diagram illustrating the detailed configuration of an image processing unit shown in FIG. 23.

FIG. 25 is a block diagram illustrating the detailed configuration of the image processing unit 102 shown in FIG. 23. In FIG. 23, an input-data correction unit 300 corrects input image data by inputting multi-valued image data, represented, for example, by 8 bits per pixel (256 gradation levels) from the image input unit 101, and adding error data generated at a quantized pixel (to be described later) to image data of the current pixel. At that time, since 9-bit error data represented by a value within a range of −255–255 is added to a value within a range of 0–255 represented by input image data for one pixel (8 bits), image data for one pixel is 10-bit image data represented by a value within a range of −255–510. However, the input-data correction unit 300 limits the 10-bit image data within a range of 0–255, and outputs image data for one pixel as 8-bit data.

A quantization unit 301 quantizes the multi-valued image data corrected by the input-data correction unit 3000 into an N-value image data. The N value is determined by the relationship between input resolution and output resolution. That is, when the resolution of input image data (input resolution) is represented by A, and the resolution of output image data (output resolution) is represented by B (for the purpose of simplification, it is assumed that the same resolution is provided for the vertical and horizontal directions of the image), a dot used for representing gradation is formed by $(B/A)^2$ dots for one pixel of the input image data. That is, one pixel is formed by using $(B/A)^2$ dots as a block, and the number of gradation values which can be represented in one block is $(B/A)^2+1$.

For example, when the input resolution is 300 dpi and the output resolution is 600 dpi, the dot of output data is a block comprising $(600/300)^2=4$ dots for input image data comprising 8 bits per pixel, so that the number of gradation values which can be represented by the block is 5. Accordingly, quantized values of "0", "64", "128", "192" and "255" are output from the quantization unit 301.

In this specification, values indicating gradation levels are represented by gradation values. That is, when the number of gradation levels is 5, gradation value "n" is represented by one of "0", "1", "2", "3" and "4". The respective quantized values correspond to gradation values. For example, the quantized values "0", "64", "128", "192" and "255" correspond to the gradation values "0", "1", "2", "3" and "4", respectively.

A quantized value is output from a quantization unit 301 to a dot-pattern-table development unit 304 (to be described later). A gradation value corresponding to that quantized value may be output. In the following description, in order to facilitate understanding, it is assumed that gradation-value information is output from the quantization unit 301 to the dot-pattern-table development unit 304.

An error calculation unit 302 calculates an error between the quantized value obtained from the quantization unit 301 and multi-valued image data corrected by the input-data correction unit 300. In the above-described example, since the quantization unit 301 quantizes image data comprising 8 bits per pixel into five values, 8-bit data representing one of the values "0", "64", "128", "192" and "255" is input to the error calculation unit 302. Since image data comprising 8 bits per pixel represented by a value within a range of 0–255 is input from the input-data correction unit 300, the value of error data obtained as a result of the calculation is a value within a range of −255–255, i.e., data represented by 9 bits.

An error memory 303 stores data obtained by distributing the error generated by the error calculation unit 302 to unprocessed surrounding pixels with the ratios as shown in FIG. 4. In the image recording apparatus of the third embodiment, the error memory 303 comprises a DRAM or the like.

Figure 26:
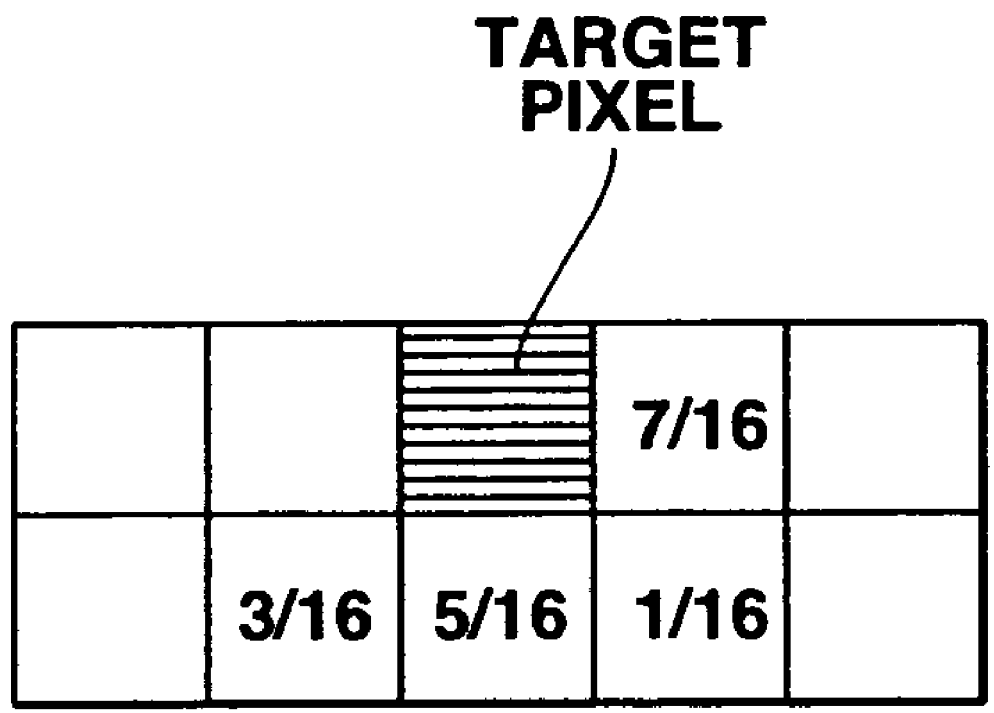
FIG. 26 is a diagram illustrating error distribution ratios for unprocessed pixels.

FIG. 26 is a diagram illustrating distribution ratios of the error to be distributed to unprocessed pixels. In FIG. 26, a hatched pixel represents a target pixel (the current pixel position), a pixel surrounded by a frame represents a pixel where the error is distributed, and a numerical value indicated in the frame is the distribution ratio to the pixel. Accordingly, when distributing the error with distribution ratios shown in FIG. 26, the error memory 303 must have a capacity for at least two lines.

The dot-pattern development unit 304 selects a dot-pattern table to be output from among a plurality of dot-pattern tables (each having a size of K×L dots) corresponding to respective gradation values, based on the gradation value output from the quantization unit 301, and acquires the desired dot-pattern table from a dot-pattern-table storage unit 305 (to be described later). At the same time, dot-pattern-address information corresponding to the current pixel position is provided from a dot-pattern-address generation unit 306. A dot pattern corresponding to the current pixel position is developed and output in accordance with an address indicated by the information.

Figure 31:
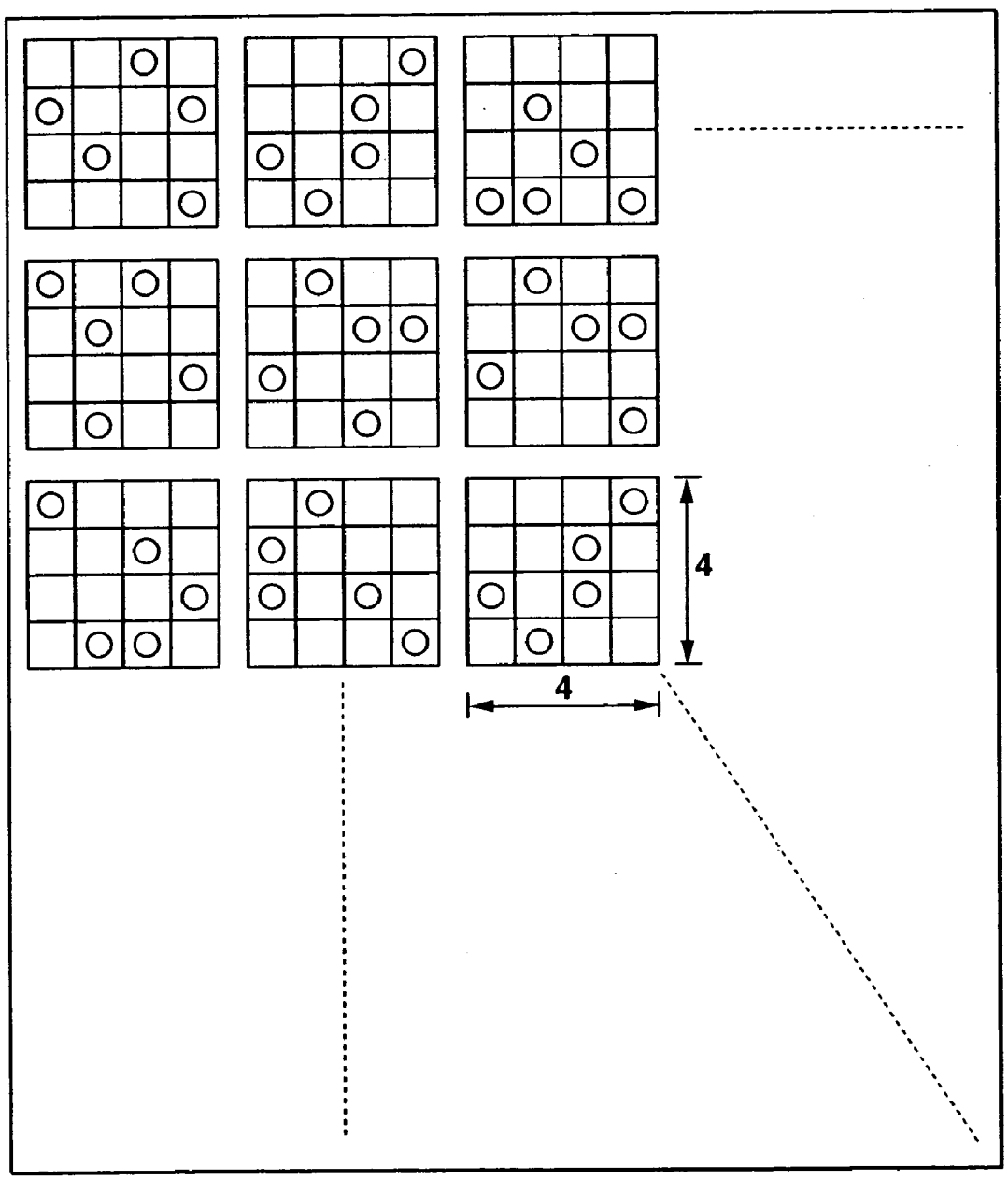
FIG. 31 is a diagram illustrating a dot-pattern table corresponding to gradation value "5"

The dot-pattern-table storage unit 305 stores a plurality of dot-pattern tables corresponding to respective gradation values. The dot-pattern-table storage unit 305 selects a desired dot-pattern table from among the plurality of dot-pattern tables, based on dot-pattern-table selection information supplied from the dot-pattern development unit 304, and outputs the selected dot-pattern table to the dot-pattern development unit 304. One dot-pattern table includes a plurality of different dot patterns corresponding to the gradation value. For example, from among dot-pattern tables, each including a plurality of 4×4 dot patterns (including 16 cells), a dot-pattern table for gradation value "5" includes a plurality of different dot patterns, each having 5 dots in 16 cells, as shown in FIG. 31. The dot-pattern-table storage unit 25 is provided in a semiconductor memory, such as an EEPROM, or the like. In the image recording apparatus of the present invention, in consideration of performing processing at a high speed, a high-speed memory such as an SRAM or the like, may be used.

The dot-pattern-address generation unit 306 generates address information indicating the position of the dot pattern (k×l dots) for the current pixel in a corresponding dot-pattern table having the size of K×L dots, and outputs the address information to the dot-pattern development unit 304.

The address information is determined by pixel-position information indicated by input image data, the size of the entire dot-pattern table (K×L dots), and the size of the dot pattern to be output (k×l dots). When the pixel-position information of the input image data indicates a two-dimensional coordinate value (x, y), the value of a remainder obtained when the value x is divided by K/k (=Dx) and the value of a remainder obtained when the value y is divided by L/l (=Dy) constitute the address information for the current pixel position within the dot-pattern table.

Figure 27A:
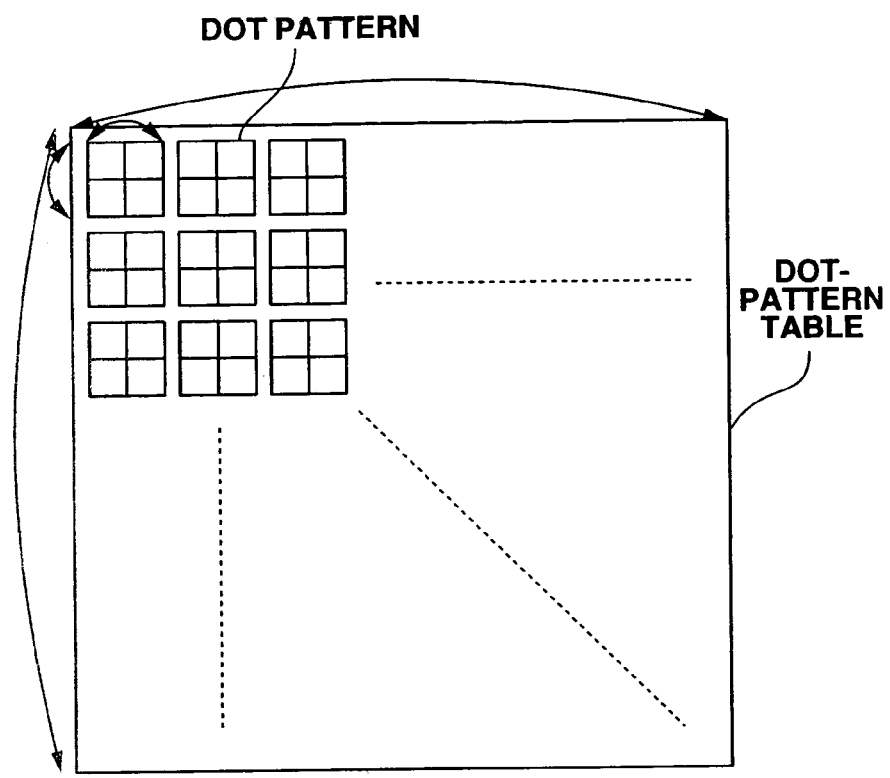
FIGS. 27A and 27B are diagrams illustrating the relationship between a dot-pattern table and dot patterns.
Figure 27B:
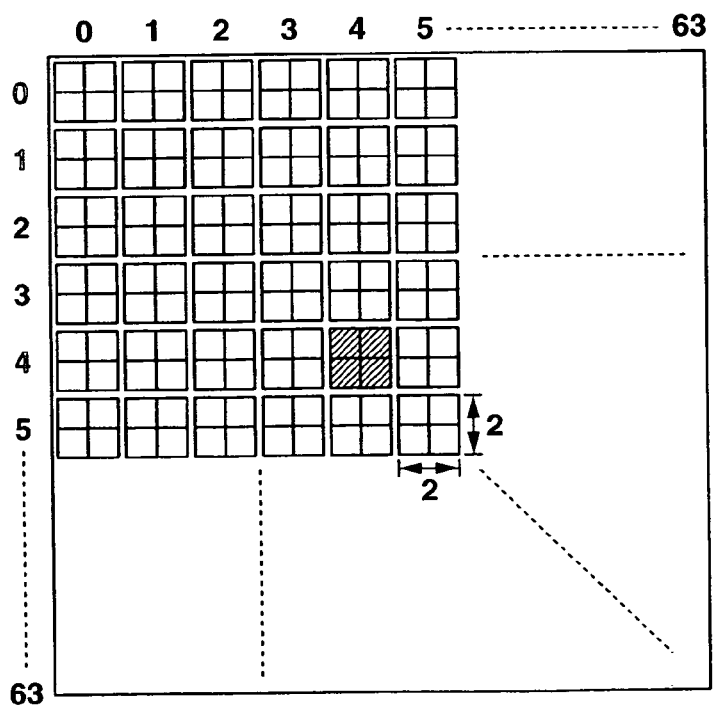

FIGS. 27A and 27B are diagrams illustrating the relationship between a dot-pattern table and dot patterns. FIG. 27A illustrates the relationship between the dot-pattern table and dot patterns having standard sizes. FIG. 27B illustrates the relationship between the dot-pattern table and the dot pattern when the dot-pattern table has a size of 64×64 dots, and the dot pattern corresponding to one pixel of input image data includes 2×2 dots.

Accordingly, in FIG. 27B, the dot-pattern table has dot patterns corresponding to 32 pixels×32 pixels of the input image data. In other words, an address indicating the same dot pattern is provided for input image data at every 32 pixels in each of the vertical and horizontal directions. For example, when the pixel-position information (x, y) of input image data is (100, 100), the value of remainder "4" obtained by dividing each of the x coordinate value and the y coordinate value by "32" becomes the address information of the dot pattern. Accordingly, as shown in FIG. 27B, the dot pattern for the current pixel position is the dot pattern at the hatched position in the dot-pattern table. In this specification, a k×l dot pattern includes k×l cells.

As described above, in the third embodiment, the configuration of selecting a dot pattern for the current pixel position from the dot-pattern table is used. The reason why this configuration is used will be described with reference to FIGS. 28 and 29.

Figure 28:
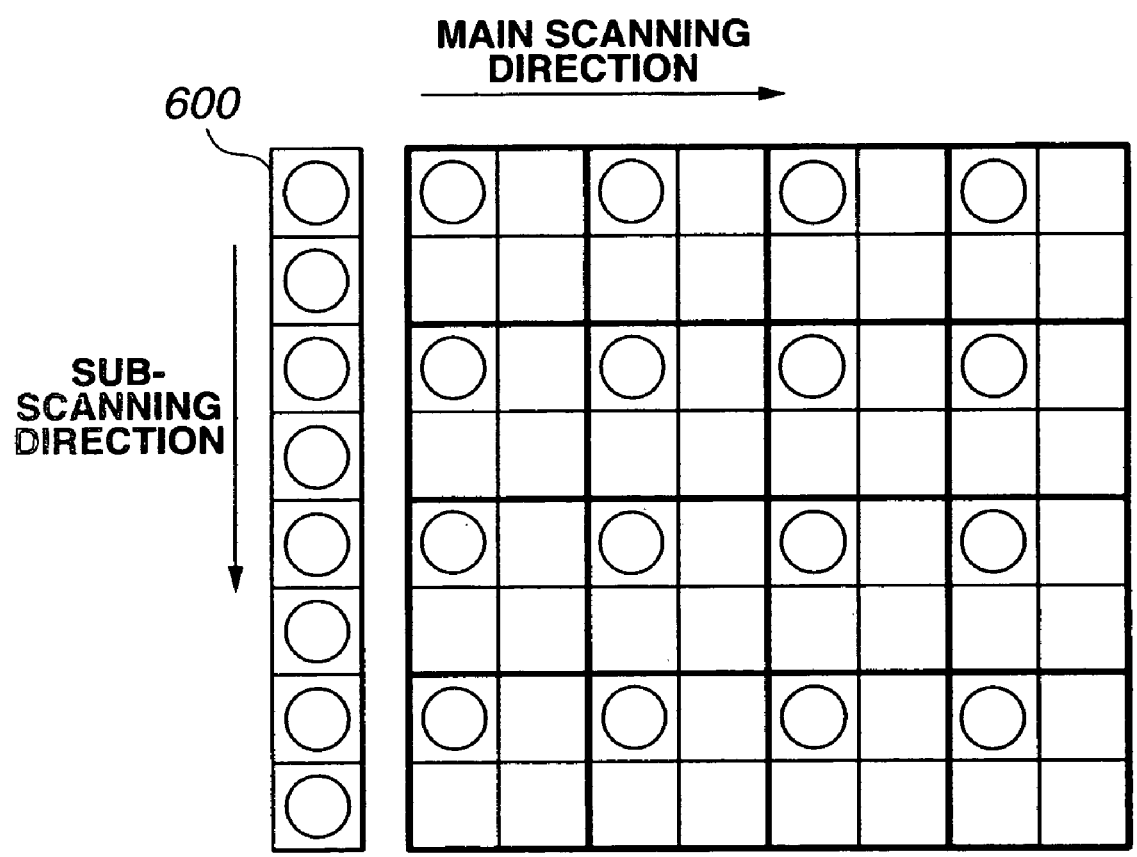
FIG. 28 is a diagram illustrating the relationship between nozzles of a recording head 600 and the arrangement of dots recorded by discharging ink from the nozzles.

FIG. 28 is a diagram illustrating the relationship between the nozzles of a recording head 600 and the arrangement of actually recorded dots by discharging ink from the nozzles. In FIG. 28, in order to simplify description, the size of each dot pattern is made to be 2×2 dots. However, the size of the dot pattern which can be used in the present invention is, of course, not limited to such a size.

If a dot pattern in which a dot is arranged at the same position for each pixel is always used as a dot pattern having only one dot in the size of 2×2 dots, i.e., a dot pattern indicating gradation value "1" in the case of quantization having 5 values, as shown in FIG. 28, the frequency of ink discharge from a specific nozzle of the recording head 600 becomes high. That is, the frequency of use of the nozzle becomes uneven. The amount and the direction of ink discharge differ depending on the nozzle, because each nozzle has its characteristics. If the frequency of use of the nozzle differs as described above, the characteristics of the nozzle having a high frequency of use are strongly reflected on the recorded image. As a result, unevenness in the density and unevenness due to stripes tend to occur in the recorded image. Accordingly, it is not desirable to fixedly use a dot pattern having the same dot arrangement.

Figure 29:
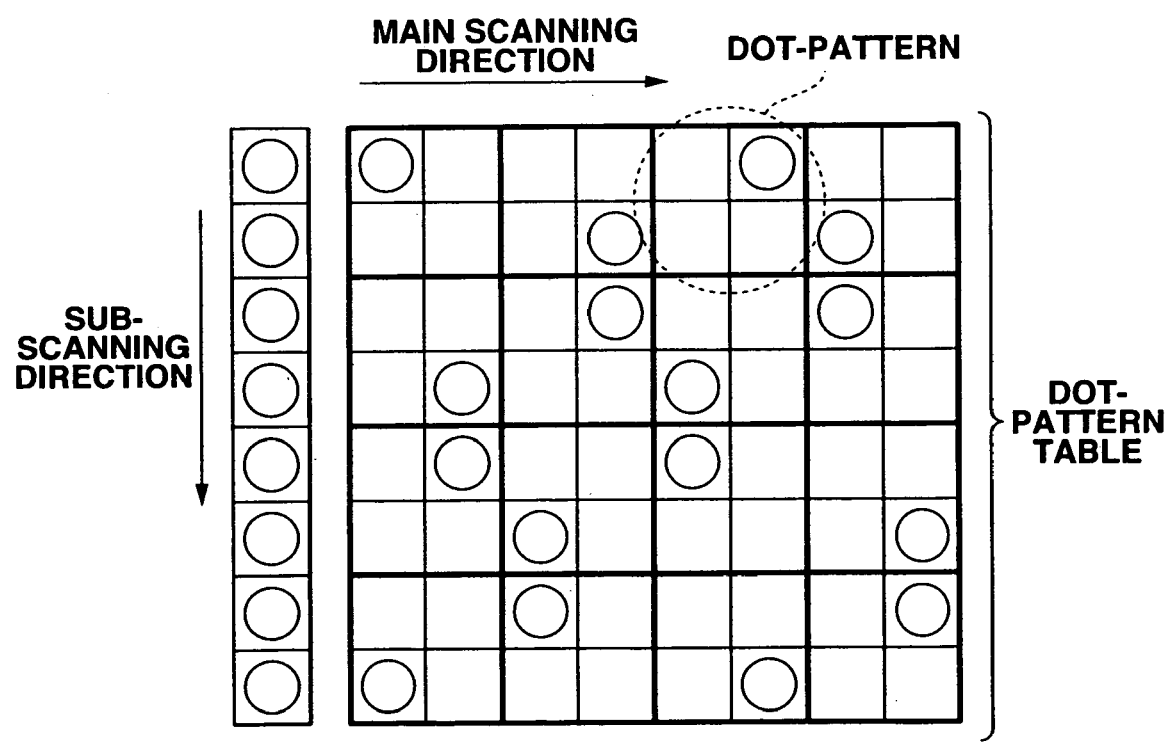
FIG. 29 is a diagram illustrating a dot-pattern table configured by a plurality of dot patterns having different dot arrangements.

In order to suppress the occurrence of unevenness in the density and unevenness due to stripes, in the third embodiment, the frequency of use of the nozzle is made even by using a plurality of dot patterns having different dot arrangements as shown in FIG. 29 for gradation value "1".

As described above, in the third embodiment, a dot-pattern table is used in order to realize dot arrangements as shown in FIG. 29.

The characteristics of the dot-pattern table used in the third embodiment will now be described. In the dot-pattern table of the third embodiment, the number of cells of the dot pattern table in the sub-scanning direction equals the number of nozzles of the recording head. In other words, the number of cells equal to the number of nozzles of the recording head is adopted as the size of the dot-pattern table in the sub-scanning direction. As for the size in the main scanning direction, the number of cells may be sufficient enough to absorb the influence of variations in the characteristics of nozzles. Accordingly, in the case of FIG. 29, since the number of nozzles of the recording head is "8", the size of the dot-pattern table in the sub-scanning direction is "8", and the size in the main scanning direction is made equal to the size in the sub-scanning direction in order to suppress the influence of variations due to the characteristics of the nozzles on the recorded image.

As described above, by using a dot-pattern table in which the number of cells equal to the number of nozzles of the recording head is adopted as the size in the sub-scanning direction, it is possible to provide a dot-pattern table in which a plurality of dot patterns having different dot arrangements are arranged in a desired manner, and, as a result, to effectively suppress the occurrence of unevenness in the density and unevenness due to stripes.

Figure 30:
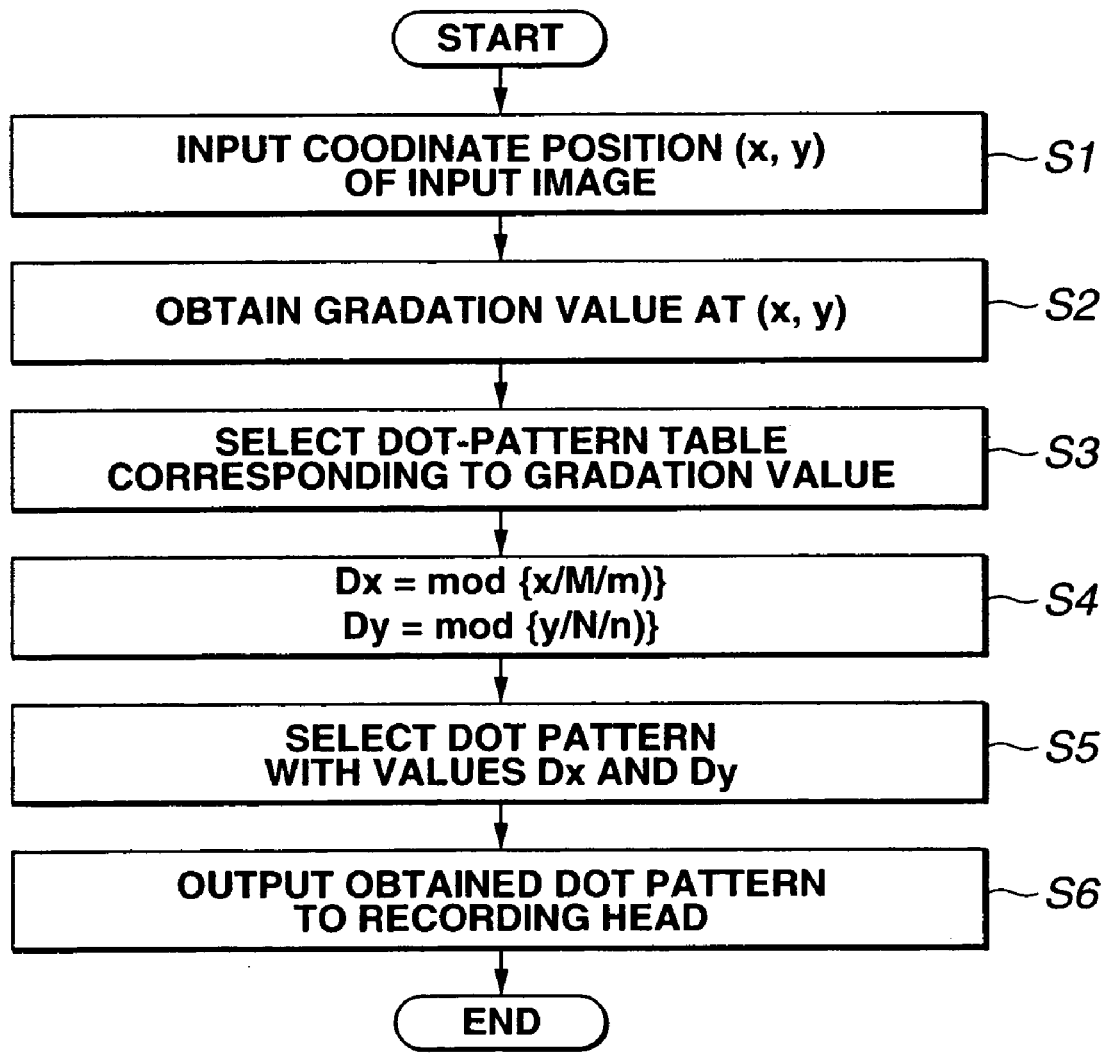
FIG. 30 is a flowchart illustrating a procedure of processing for selecting a dot pattern to be output, from a dot-pattern table.

A method for selecting a dot pattern to be output from the dot-pattern table will now be described with reference to FIG. 30. FIG. 30 is a flowchart illustrating a procedure of processing for selecting a dot pattern to be output, from the dot-pattern table.

First, in step S1, pixel-position information (x, y) of input image data is input. In step S2, the gradation value corresponding to the pixel-position information (x, y) is obtained. Then, in step S3, a dot-pattern table corresponding to the gradation value obtained in step S2 is selected. In step S4, address information (Dx, Dy) indicating the position of a dot pattern corresponding to the input pixel-position information (x, y) in the dot-pattern table selected in step S3 is calculated based on the pixel-position information, the size of the dot-pattern table, and the size of the dot pattern. In step S5, a dot pattern corresponding to the address information is selected. In step S6, the dot pattern selected in step S5 is developed in the memory. The developed dot pattern is output to the recording head, which performs recording by discharging ink based on the dot pattern.

As described above, in the third embodiment, a dot pattern corresponding to a gradation value is selected from a dot-pattern table. However, in the third embodiment, since the number of cells (the size) of the dot-pattern table in the sub-scanning direction equals the number of nozzles of the recording head, the capacity of the dot-pattern table is considerably large. Although in the case of FIG. 29, the number of nozzles is 8, the capacity of the dot-pattern table increases as the number of nozzles increases, such as 128, 257 and 512. That is, a large-capacity memory is required as a memory (ROM) for storing the dot-pattern table. The large-capacity memory is expensive. Hence, in the third embodiment, in order to reduce the cost of the memory, the capacity of the dot-pattern table is reduced. A method for reducing the capacity of the dot-pattern table will now be described.

In the third embodiment, in order to reduce the capacity of the dot-pattern table, a dot pattern for a gradation value in which no dot is formed (gradation value "0") from among gradation values "n" of the N value is not provided in the dot-pattern table, and a dot pattern for gradation value "0" is generated in a separate circuit. This approach utilizes the fact that, when usually performing N-value quantization, one gradation value from among gradation values corresponds to a pattern where not dot is provided (such a gradation value necessarily exists in an ordinary image output apparatus because an entirely white image cannot be represented if such a gradation value is absent).

Gradation value "n" after performing N-value quantization by the quantization unit 301 is input to an all-0 generation unit 307. For example, it is assumed that, when gradation values "0", "1", "2", "3" and "4" corresponding to quantized values "0", "64", "128", "192" and "255" obtained as a result of 5-value quantization by the quantization unit 301 are output, gradation value "0" indicates case in which not dot is formed by the image recording unit, i.e., an entirely white image. When gradation value "0" is transmitted to the all-0 generation unit 307, a pattern in which no dot is formed, i.e., an all-0 dot pattern is output for a dot pattern to be output, for example, a 2×2 dot pattern. Gradation value "n" is input to a switch 308. When the gradation value is "0", the dot pattern output from the all-0 generation unit 307 is selected. When the gradation value is a value other than "0", the dot pattern output from the dot-pattern-table development unit is selected, and data is transferred to the image recording unit.

When the number of gradation values is N, the capacity for N dot-pattern tables is originally required. However, according to the third embodiment in which a dot-pattern table corresponding to gradation value "0" is not provided, and the dot pattern for gradation value "0" is generated by a separate circuit (a dot-pattern generation circuit), since only the capacity for (N−1) dot-pattern tables is required, the capacity of the entire dot-pattern tables can be reduced. For example, when the size of the dot-pattern table is 512×512, and the number of gradation values is 5, if dot-pattern tables for all of the gradation values are provided, the capacity of data is 512×512×5÷8=163,840 bytes. On the other hand, if the dot-pattern table for an entirely white image (gradation value "0") is not provided as in the third embodiment, the capacity of data can be reduced to 512×512×4÷8=131,072 bytes.

Although in the third embodiment, the case in which the number of gradation values is 5 has been illustrated, the present invention may, of course, be applied to a case of the number of gradation values other than 5. Furthermore, although the case of all 0 in which no dot is formed, i.e., the case of not providing a dot-pattern table for an entirely white image, has been illustrated, since most image recording apparatuses usually output a dot pattern for entirely black (all-1) image, an all-1 generation unit may be provided instead of the all-0 generation unit, and an all-1 dot pattern may be output when data indicating a gradation value for all 1 has been input. The gradation value indicating all 1 is a gradation value in which a dot is always formed. More specifically, when the number of gradation values is 5, and the gradation values are represented by "0", "1", "2", "3" and "4", the gradation value indicating all 1 corresponds to gradation value "4".

Although in the foregoing description; the case of separately providing the all-0 generation unit and the all-1 generation unit has been illustrated, both of the all-0 generation unit and the all-1 generation unit may be provided. In this case, since both of a dot-pattern table for an entirely white image and a dot-pattern table for an entirely black image are not provided, when the size of the dot-pattern table is 512×512 as in the above-described case, it is possible to reduce the capacity of data of the dot-pattern tables to 512×512×3÷8=98,304 bytes.

Figure 32:
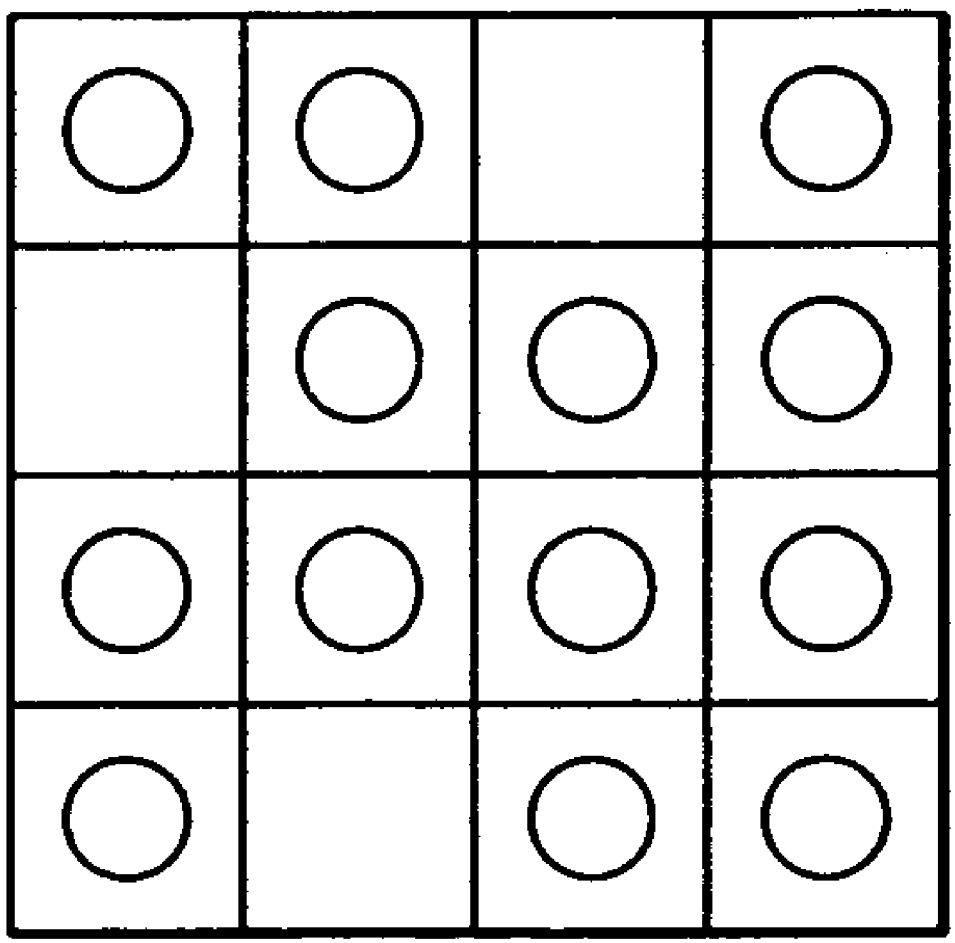
FIG. 32 is a diagram illustrating a dot pattern corresponding to gradation value "13"

When the dot pattern corresponding to a predetermined gradation value other than for an entirely white (all 0) image and an entirely black (all 1) image has a regular dot arrangement, the dot pattern may not be provided in the dot-pattern table, and the dot pattern may be generated by a separate circuit (a dot-pattern generation circuit). For example, when the number of gradation values is 17, if it is determined that the dot pattern corresponding to gradation value "13" has always a dot arrangement as shown in FIG. 32, it is possible to generate this dot pattern by a dot-pattern generation circuit. Although a dot pattern having a regular dot arrangement can be easily generated by a dot-pattern generation circuit, the generation of a plurality of dot patterns having different dot arrangements is not preferable because the configuration of the circuit becomes complicated. If a dot pattern corresponding to a predetermined gradation value other than for an entirely white image and an entirely black image is generated by a dot-pattern generation circuit, the dot pattern for the same gradation value has always the same dot arrangement, thereby generating unevenness in the density and unevenness due to stripes. Accordingly, it is necessary to appropriately determine a dot pattern corresponding to a certain gradation value to be generated by a dot-pattern generation circuit, in consideration of unevenness in the density and unevenness due to stripes. For example, since it is empirically known that the influence of variations in the characteristics of the nozzle on unevenness in the density and unevenness due to stripes is most pronounced at a duty ratio (the ratio of the number of dots of discharged ink within a matrix of k×l dots) within a range of 25%–50%, in order to suppress the occurrence of unevenness in the density and unevenness due to stripes, dot patterns for gradation values corresponding to duty ratios within this range (gradation values 4–8 when the number of gradation values is 17) may be provided in the form of dot-pattern tables, and a dot pattern for a gradation value close to a gradation value indicating an entirely white image or an entirely black image in which the influence on unevenness in the density and unevenness due to stripes is small may be generated by the circuit.

As described above, according to the third embodiment, by generating a dot pattern corresponding to a predetermined gradation value by a dot-pattern generation circuit, it is possible to reduce the capacity of data of dot-pattern tables. By thus reducing the capacity of data, the capacity of a ROM for storing the dot-pattern tables can be reduced. Hence, the cost of the image recording apparatus can be reduced.

Fourth Embodiment

In a fourth embodiment of the present invention, when the number of gradation-values is N, X dot-pattern tables whose number is smaller than the number of gradation values are provided, and dot patterns corresponding to respective ones of all of necessary gradation values are formed from the X dot-pattern tables. More specifically, dot-pattern tables for every other gradation value of N gradation values are provided, and a dot pattern corresponding to a necessary gradation value is formed from two adjacent dot-pattern tables corresponding to adjacent (immediately preceding and immediately succeeding) gradation values. The number of cells (the size) of the dot-pattern table in the sub-scanning direction in the fourth embodiment is the same as the number of nozzles of the recording head.

Figure 33:
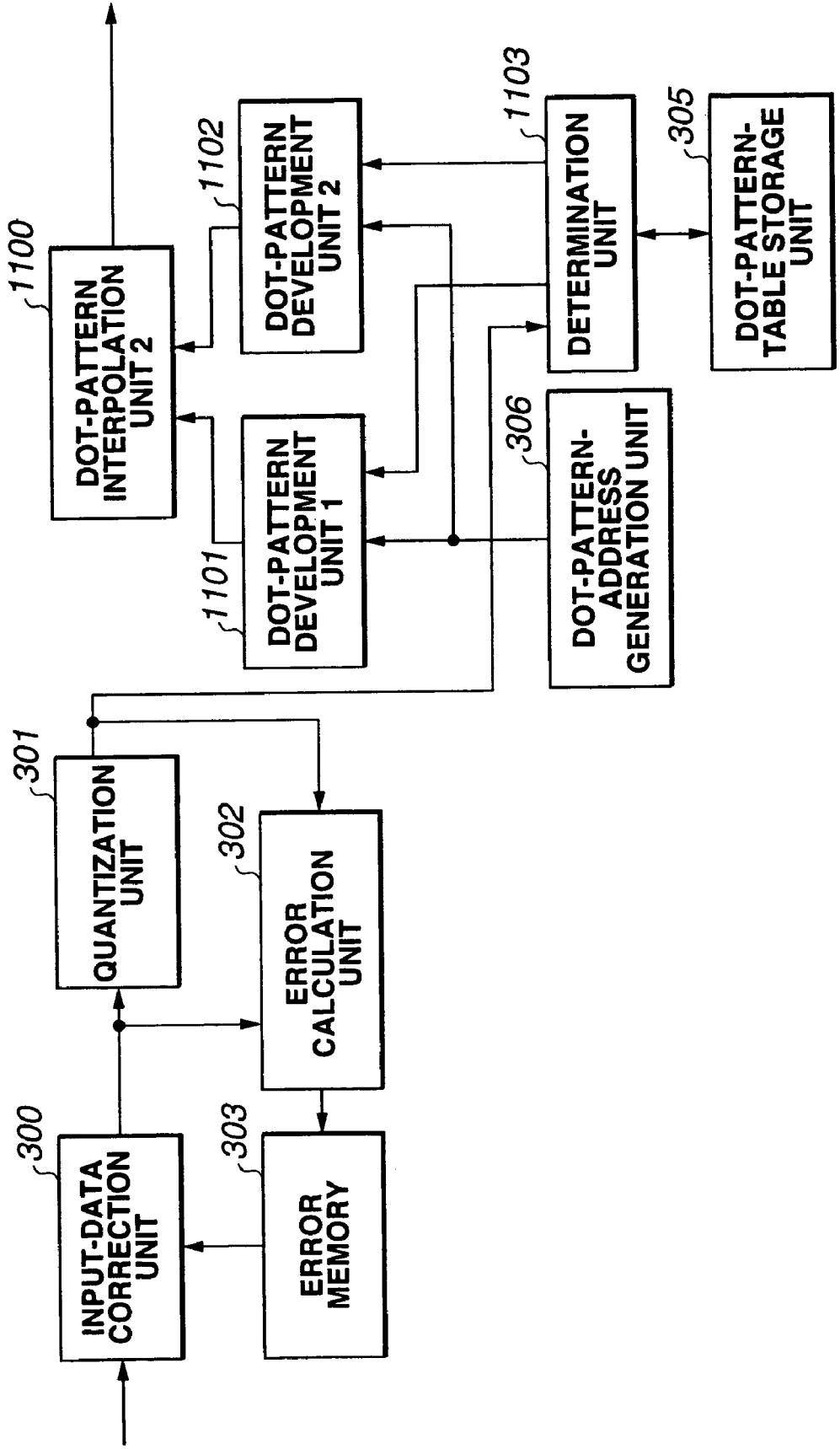
FIG. 33 is a block diagram illustrating the detailed configuration of an image processing unit according to a fourth embodiment of the present invention.

The fourth embodiment will now be described with reference to FIG. 33. FIG. 33 is a block diagram illustrating the detailed configuration of the image processing unit 102, shown in FIG. 23, in the fourth embodiment.

In FIG. 33, reference numeral 1100 represents a dot-pattern interpolation unit. Reference numeral 1101 represents a dot-pattern development unit 1. Reference numeral 1102 represents a dot-pattern development unit 2. Reference numeral 1103 represents a determination unit. Components having the same configurations as the components shown in FIG. 25 used for describing the third embodiment are indicated by the same reference numerals, and further description thereof will be omitted. Gradation value "n" quantized in one of N values is output from the quantization unit 301, and is input to the determination unit 1103. The determination unit 1103 determines if a dot-pattern table corresponding to the gradation value "n" is present, based on the result of quantization.

Figure 34:
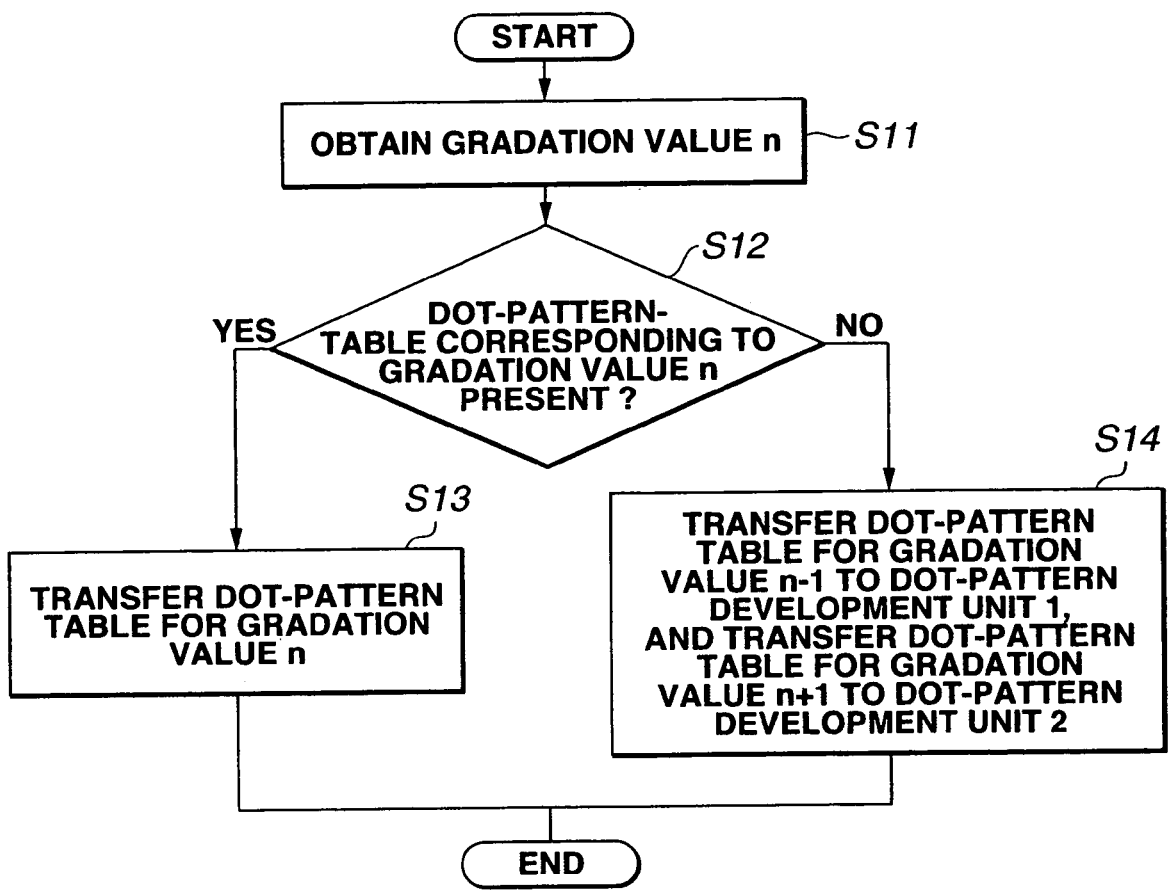
FIG. 34 is a flowchart illustrating a processing method at a determination unit 1103 shown in FIG. 33.
Figure 35A:
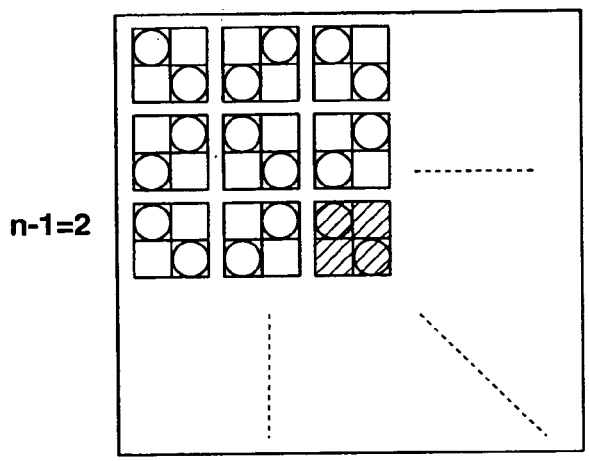
FIG. 35 is a diagram illustrating dot-pattern tables input to dot-pattern development units 1 and 2, and a result of development, when the determination unit 1103 has determined that a dot pattern corresponding to gradation value "3" does not exist.
Figure 35D:
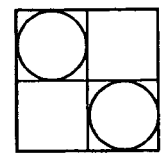
Figure 35B:
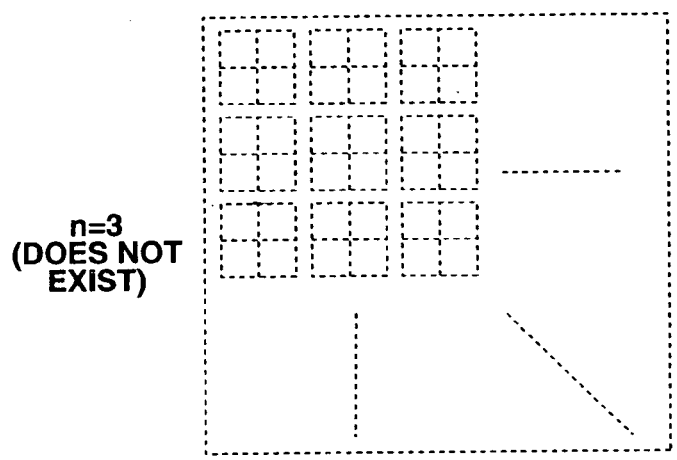
Figure 35F:
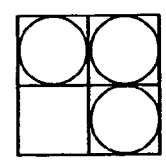
Figure 35C:
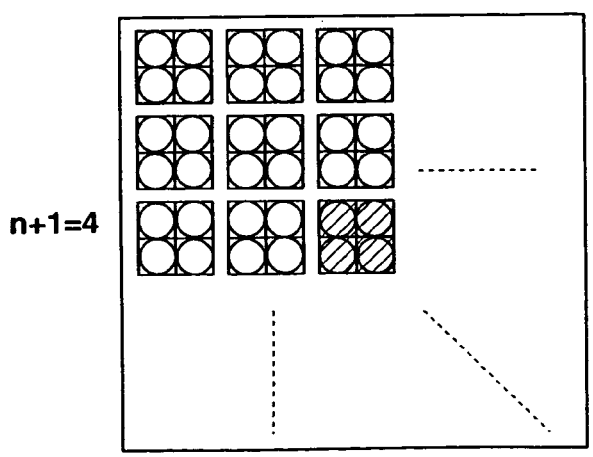
Figure 35E:
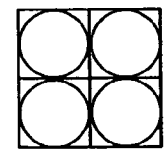

FIG. 34 is a flowchart illustrating the method of processing by the determination unit 1103 shown in FIG. 33. The method of processing by the determination unit 1103 will now be described with reference to FIG. 34. First, in step S11, gradation value "n" is obtained from the quantization unit 301 shown in FIG. 33. In step S12, it is determined if a dot-pattern table corresponding to this gradation value "n" is present. If the result of the determination in step S12 is affirmative, the process proceeds to step S13, where the dot-pattern table corresponding to gradation value "n" is loaded from the dot-pattern-table storage unit 305 shown in FIG. 25, and is transferred to the dot-pattern-table development units 1101 and 1102. If the result of the determination in step S12 is negative, the process proceeds to step S14, where dot-pattern tables for gradation values "n−1" and "n+1" for which dot-pattern tables are present are loaded from the dot-pattern-table storage unit 305, and are transferred to the dot-pattern-table development units 1101 and 1102, respectively. The determination unit 1103 shown in FIG. 33 performs the above-described processing shown in FIG. 34.

After performing the above-described processing by the determination unit 1103, the dot-pattern development units 1101 and 1102 develop respective dot patterns corresponding to the current pixel position for the image recording unit, based on the transferred dot-pattern tables and the dot-pattern address output from the dot-pattern-address generation unit 306. When the determination unit 1103 has determined that a dot pattern corresponding to gradation value "n" is present, since the same dot-pattern table is input to the dot-pattern development units 1101 and 1102, the same dot pattern is developed for the current pixel position. When the determination unit 1103 has determined that a dot pattern corresponding to the current pixel position is absent, a dot-pattern table for gradation value "n−1" is input to the dot-pattern development unit 1101, and a dot-pattern table for gradation value "n+1" is input to the dot-pattern development unit 1102. Hence, dot patterns for different gradation values are developed. For example, when the determination unit 1103 has determined that a dot pattern corresponding to gradation value "n" is absent, dot pattern tables input to the dot-pattern development units 1101 and 1102, and the results of development are as shown in FIG. 35. When the gradation value for the current pixel is "3", and a dot-pattern table corresponding to the gradation value "3" is absent, a dot-pattern table for n=2 adjacent to gradation value n=3 is input to the dot-pattern development unit 1101, a dot-pattern table for n=4 is input to the dot-pattern development unit 1102, and hatched dot patterns shown in FIG. 35 are developed as dot patterns for the current pixel position.

Since gradation value "n" corresponds to the number of dots in a dot pattern, the number of dots within a dot pattern is 2 when n=2, and the number of dots within a dot pattern is 4 when n=4.

Next, the dot-pattern interpolation unit 1100 will be described. When a dot-pattern table corresponding to gradation value "n" is absent as shown in FIG. 35, the dot-pattern interpolation unit 1100 generates a dot pattern corresponding to gradation value "n" for the current pixel from two different dot patterns developed from two dot-pattern tables for adjacent (immediately preceding and immediately succeeding) gradation values "n−1" and "n+1".

Figure 37:
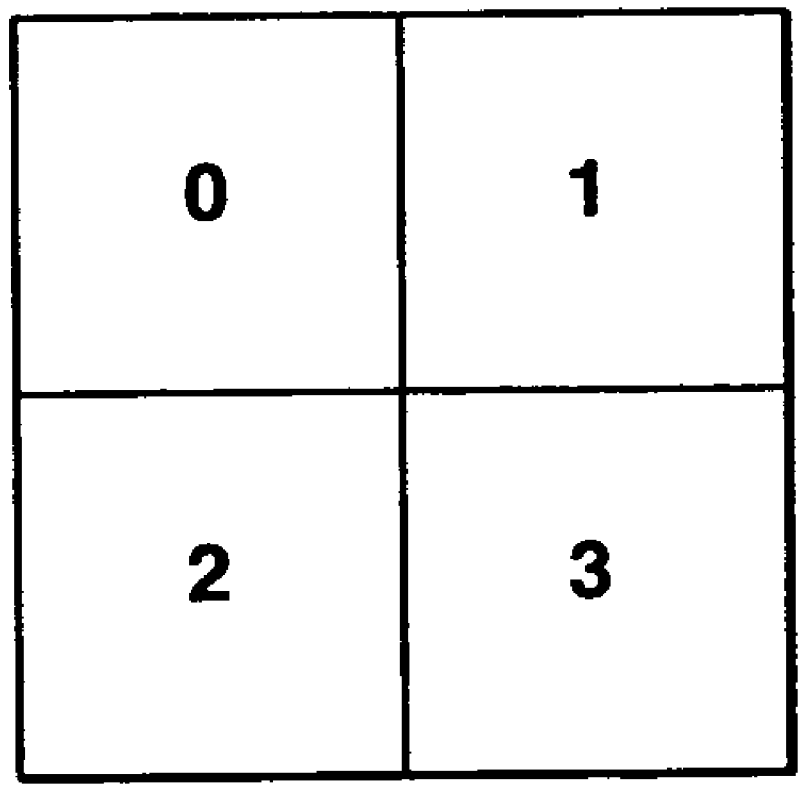
FIG. 37 is a diagram illustrating addresses within a dot pattern.

FIG. 36 is a flowchart illustrating a method of interpolation processing by the dot-pattern interpolation unit 1100. In step S21, initialization of parameters to be processed is performed. The parameters are the address within the dot pattern and the count value of dots within the dot pattern. As shown in FIG. 37, the address within the dot pattern indicates the order of reference within the dot pattern. The dot pattern is referred in the ascending order of addresses shown in FIG. 37. The count number of dots within the dot pattern is a parameter indicating the number of dots within the dot pattern to be currently interpolated. Adjacent gradation value "n−1" is made an initial value for the count value of dots within the dot pattern. In step S22, it is determined if a dot is present at the current dot position of the dot pattern for gradation value "n−1", i.e., a dot position indicated by the address within the dot pattern. When the address within the dot pattern is at position "0" shown in FIG. 37, it indicates that a dot is present in the case of the dot pattern for gradation value "n−1" shown in (a) of FIG. 35. Hence, the process proceeds to step S23 shown in FIG. 36. In step S23, the dot at the current dot position in the dot pattern corresponding to the current gradation value "n" is made in an on-state. If the result of the determination in step S22 is negative, the process proceeds to step 24. In step S24, it is determined if the count number of dots within the dot pattern is smaller than gradation value "n". If the result of the determination in step S24 is affirmative, the process proceeds to step S25. If the result of the determination in step S24 is negative, the process proceeds to step S27. In step S25, the dot at the current dot position in the dot pattern for the current gradation value "n" is made in an on-state. The process then proceeds to step S26, where the count number of dots within the dot pattern is incremented by one. The process proceeds from step S23 or step S26 to step S27, where the address within the dot pattern is incremented by one, to update the position to be referred to within the dot pattern. In step S28, it is determined if the address within the dot pattern exceeds the final address. If the result of the determination in step S28 is negative, the process returns to step S22. If the result of the determination in step S28 is affirmative, the process proceeds to step S29, where the series of interpolation processing is terminated. The final address is "3" in the case of FIG. 37. More specifically, when a dot pattern for gradation value "3" is formed from (d) and (e) of FIG. 35 using the above-described method of dot-pattern interpolation processing, a dot pattern having dot arrangement as shown in (f) of FIG. 35 is obtained. That is, when forming a dot pattern for gradation value "3", dots are always arranged at positions where dots are formed in a dot pattern for gradation value "2", and the third dot is arranged at the smallest address from among addresses where no dot is provided within the dot pattern.

As described above, according to the fourth embodiment, by not providing dot-pattern tables for all of gradation values and interpolating an intermediate dot pattern, it is possible to form dot patterns for all necessary gradation values. That is, the fourth embodiment can further reduce the capacity of the memory and, as a result, reduce the cost of the apparatus than in the third embodiment.

Fifth Embodiment

In the above-described third and fourth embodiments, in order to suppress unevenness in the density and unevenness due to stripes, the number of cells (the size) of the dot-pattern table in the sub-scanning direction is the same as the number of nozzles of the recording head. However, the present invention is not limited to such an approach. The size of the dot-pattern table may be such a size that the occurrence of unevenness in the density and unevenness due to stripes can be suppressed. Accordingly, when the number of cells of the dot-pattern table in the sub-scanning direction is represented by L (L is a natural number), and the number of nozzles of the recording head is represented by A (A is a natural number), a condition of L>A may be adopted, provided that the effect of suppressing the occurrence of unevenness in the density and unevenness due to stripes can be provided.

However, a condition of L=α×A (α is a natural number) is preferable because a greater effect of suppressing the occurrence of unevenness in the density and unevenness due to stripes is provided.

Sixth Embodiment

Next, a sixth embodiment of the present invention will be described in detail. In the sixth embodiment, the ink-jet printer shown in FIG. 2, the configuration of control shown in FIG. 21, and the ink cartridge shown in FIG. 22 can be applied. However, further description thereof will be omitted.

Image processing in the ink-jet printer in the sixth embodiment will now be described. In the sixth embodiment, a description will be provided of image processing when recording a color image using a recording head having 64 nozzles for each of four colors, i.e., black, cyan, magenta and yellow, with ink liquids of the four colors.

Figure 42:
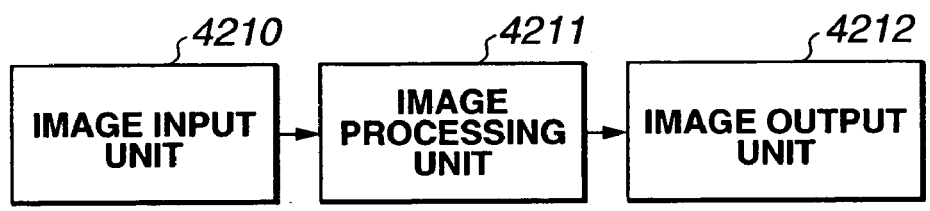
FIG. 42 is a block diagram illustrating the configuration of a portion for executing image processing in a recording apparatus according to a sixth embodiment of the present invention.

FIG. 42 is a block diagram illustrating the configuration of a portion for executing image processing of the ink-jet printer of the sixth embodiment. As shown in FIG. 42, the portion for executing image processing includes an image input unit 4210, an image processing unit 4211 and an image output unit 4212.

The image input unit 4210 quantizes image data input from an image input apparatus, such as a digital camera, a scanner or the like, or each type of recording medium, or via a communication network or the like, and outputs quantized multi-valued data.

The image processing unit 4211 actually performs image processing, and converts the multi-valued (having M values) input from the image input unit 4210 into data having gradation values (N values) capable of being represented by the ink-jet printer.

The image output unit 4212 outputs a dot pattern based on the N-valued data subjected to image processing at the image processing unit 4211.

Figure 43:
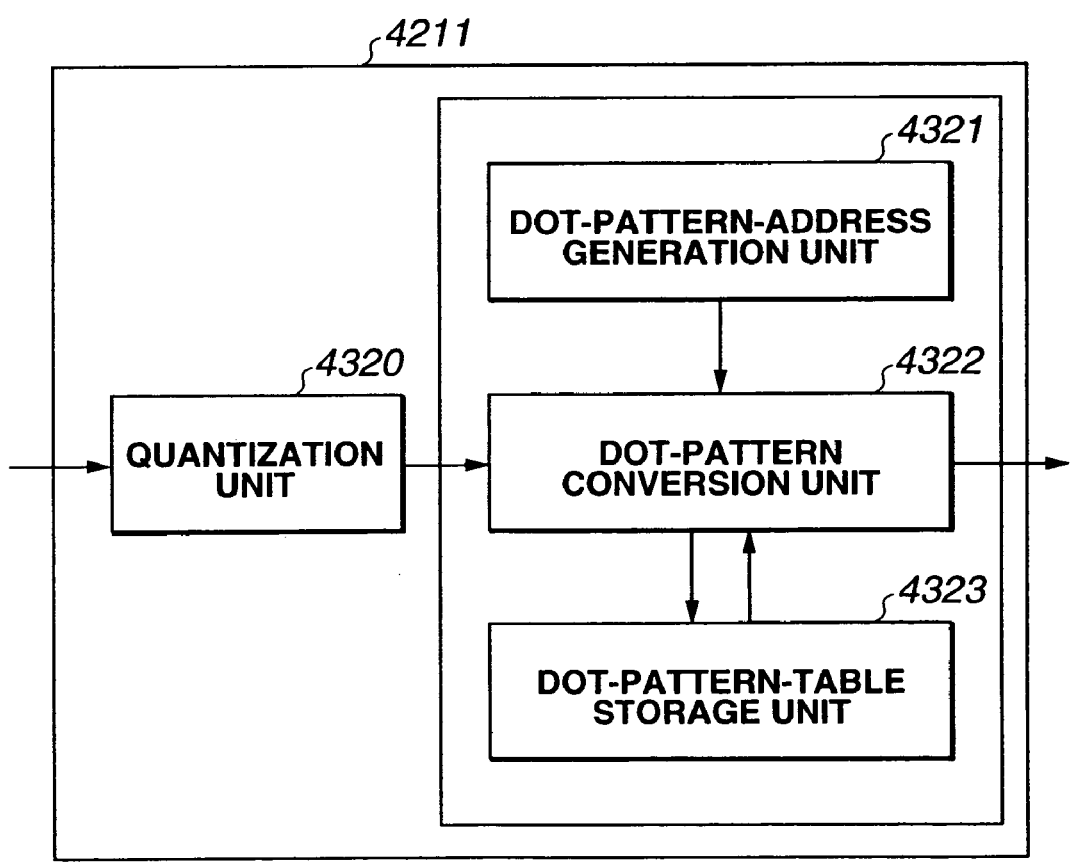
FIG. 43 is a block diagram illustrating the detailed configuration of an image processing unit shown in FIG. 42.

FIG. 43 is a block diagram illustrating the detailed configuration of the image processing unit 4211 shown in FIG. 42. As shown in FIG. 43, the image processing unit 4211 includes a quantization unit 4320, a dot-pattern-address generation unit 4321, a dot-pattern conversion unit 4322, and a dot-pattern-table storage unit 4323.

The quantization unit 4320 quantizes the multi-valued image data input from the image input unit 4310 into N-valued gradation data. In the sixth embodiment, the data is quantized into 16 values using a sub-matrix (dot pattern) comprising 4×4 dots.

The dot-pattern-address generation unit 4321 generates address information indicating the position of the dot pattern (having a size of k×l dots) for the current pixel in a dot-pattern table having a size of K×l dots, and outputs the generated address information to the dot-pattern conversion unit 4322. The address information is determined by the position information for each pixel data in the input image data, the size of the entire dot-pattern table, and the size of the dot pattern to be output. The relationship between the dot-pattern table and the dot pattern is as described with reference to FIG. 5 in the first embodiment.

The dot-pattern conversion unit 4322 selects one dot-pattern table to be output, from among a plurality of dot-pattern tables, based on gradation-value information and color information relating to the data quantized by the quantization unit 4320. Then, the selected dot-pattern table is acquired from the dot-pattern-table storage unit 4323. Then, one dot pattern is selected from the acquired dot-pattern table, based on the address information for the current pixel acquired from the dot-pattern-address generation unit 4321.

The dot-pattern-table storage unit 4323 holds dot-pattern tables for gradation values provided by quantization by the quantization unit 4320, selects one dot-pattern table from among a plurality of dot-pattern tables based on gradation-value information and color information for each pixel, and outputs the selected dot-pattern table to the dot-pattern-table conversion unit 4322. In the sixth embodiment, dot-pattern tables for each color of recording materials are stored in the dot-pattern-table storage unit 4323. Accordingly, when outputting a dot pattern from the dot-pattern-table storage unit 4323, it is necessary to consider not only position information and gradation-value information for each pixel data, but also color information.

Figure 44:
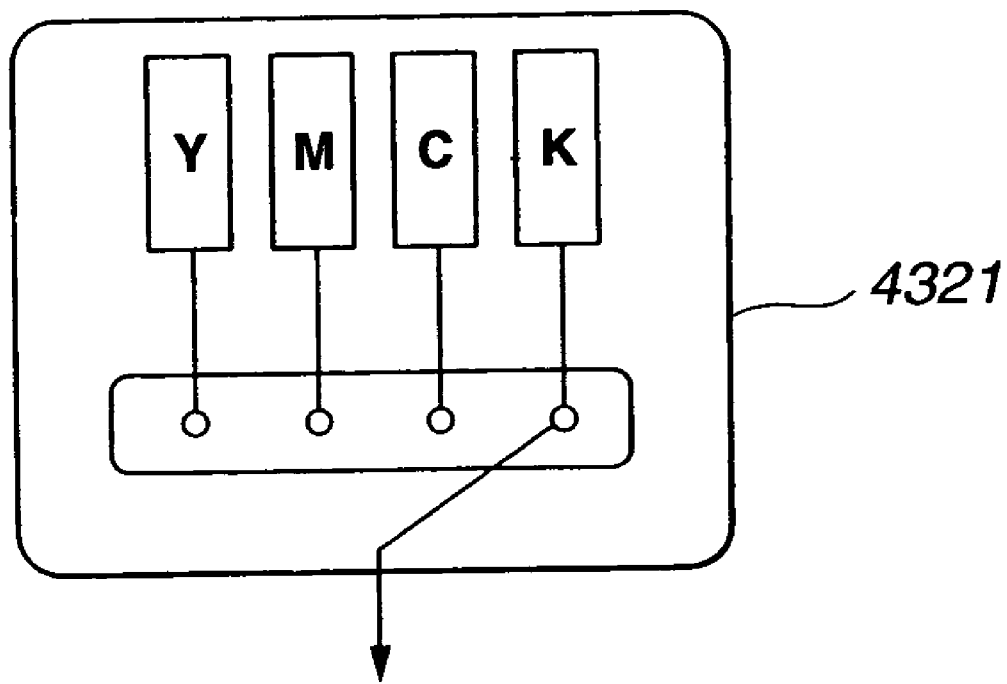
FIG. 44 is a diagram illustrating the detailed configuration of a dot-pattern-address generation unit shown in FIG. 43.

The dot-pattern-address generation unit 4321 will now be described in detail with reference to FIG. 44. The dot-pattern-address generation unit 4321 sets an address in the assigned dot-pattern table so as to be able to assign each color of black (K), cyan (C), magenta (M) and yellow (Y) by sequentially performing switching using a switch or the like, from the dot-pattern-table storage unit 4323, which will be described in detail below with reference to FIG. 45, and transfers address data to the dot-pattern conversion unit 4322.

Figure 45:
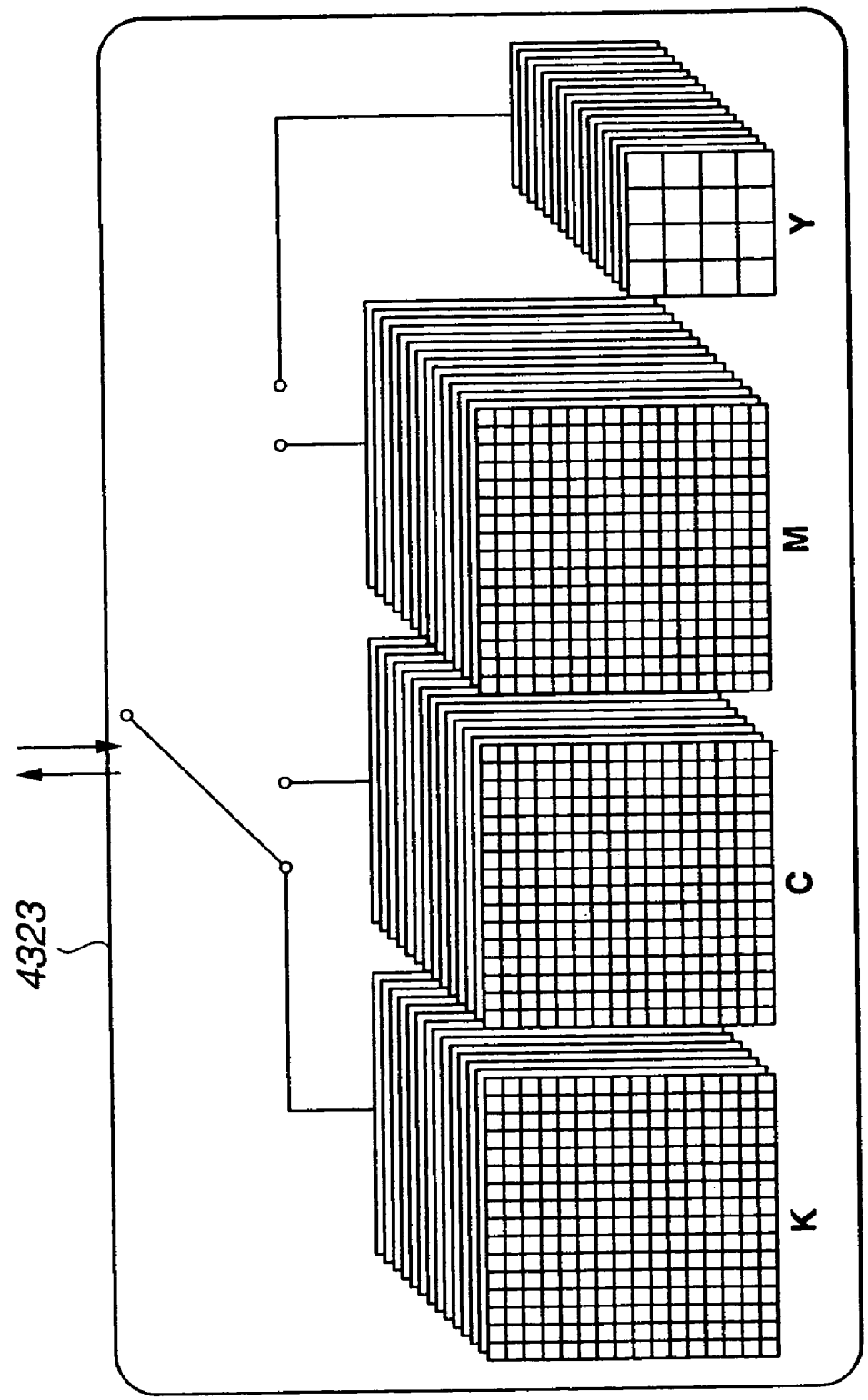
FIG. 45 is a diagram illustrating the detailed configuration of a dot-pattern-table storage unit shown in FIG. 43 when ink materials of four colors are used.

FIG. 45 is a diagram illustrating the configuration of the dot-pattern-table storage unit 4323, which stores dot-pattern tables for each of colors, black (K), cyan (C), magenta (M) and yellow (Y).

In the sixth embodiment, the fact in the human visual characteristics that it is difficult to recognize the difference between gradation levels, and therefore to recognize unevenness in the density and unevenness due to stripes in a color having relatively higher lightness is utilized. More specifically, the size of the dot-pattern table corresponding to each color is increased for colors in which stripes tend to be easily observed (cyan, magenta and black), and is reduced for a specific color in which stripes are not easily observed (yellow).

That is, by using a large-size matrix for a color for which stripes and unevenness in the density tend to be easily observed, it is possible to reduce stripes and unevenness in the density which tend to be generated with a fixed pattern.

On the other hand, in a specific color in which stripes and unevenness in the density are not easily observed, it is intended to prevent degradation of the image quality while reducing the capacity of tables stored in the ROM by using a fixed-index pattern.

This approach will now be more specifically described. In the sixth embodiment, the size of the dot pattern table for cyan, magenta and black is made to be 64×64 dots, and the size of the dot-pattern table for yellow is made to be 4×4 dots.

To what degree the capacity of the dot-pattern table can be reduced according to the sixth embodiment will now be studied.

The capacity of the dot-pattern table when the number of gradation values is 16 in an ordinary 4-color mode is as follows when the size of the dot-pattern table is 64×64 dots for all of four colors:

64×64×16×4/8=32,768 B (bytes).

On the other hand, the capacity of the dot-pattern table when the size of the dot-pattern table for yellow in which stripes and unevenness in the density is not easily observed is 4×4 dots, and the size of the dot-pattern table for cyan and magenta in which stripes and unevenness in the density tend to be easily observed is 64×64 is as follows:

(64×64×16×3/8)+(4×4×16/8)=24,608 B (bytes).

Accordingly, by reducing the size of the dot-pattern table for yellow, it is possible to reduce the capacity of the entire dot-pattern tables by 8,160 B (bytes).

Next, a description will be provided of dot-pattern tables when at least five types of ink materials are used. More specifically, a description will be provided illustrating a case of adding ink materials of two colors, i.e., light cyan and light magenta, to the above-described ordinary four colors.

Figure 46:
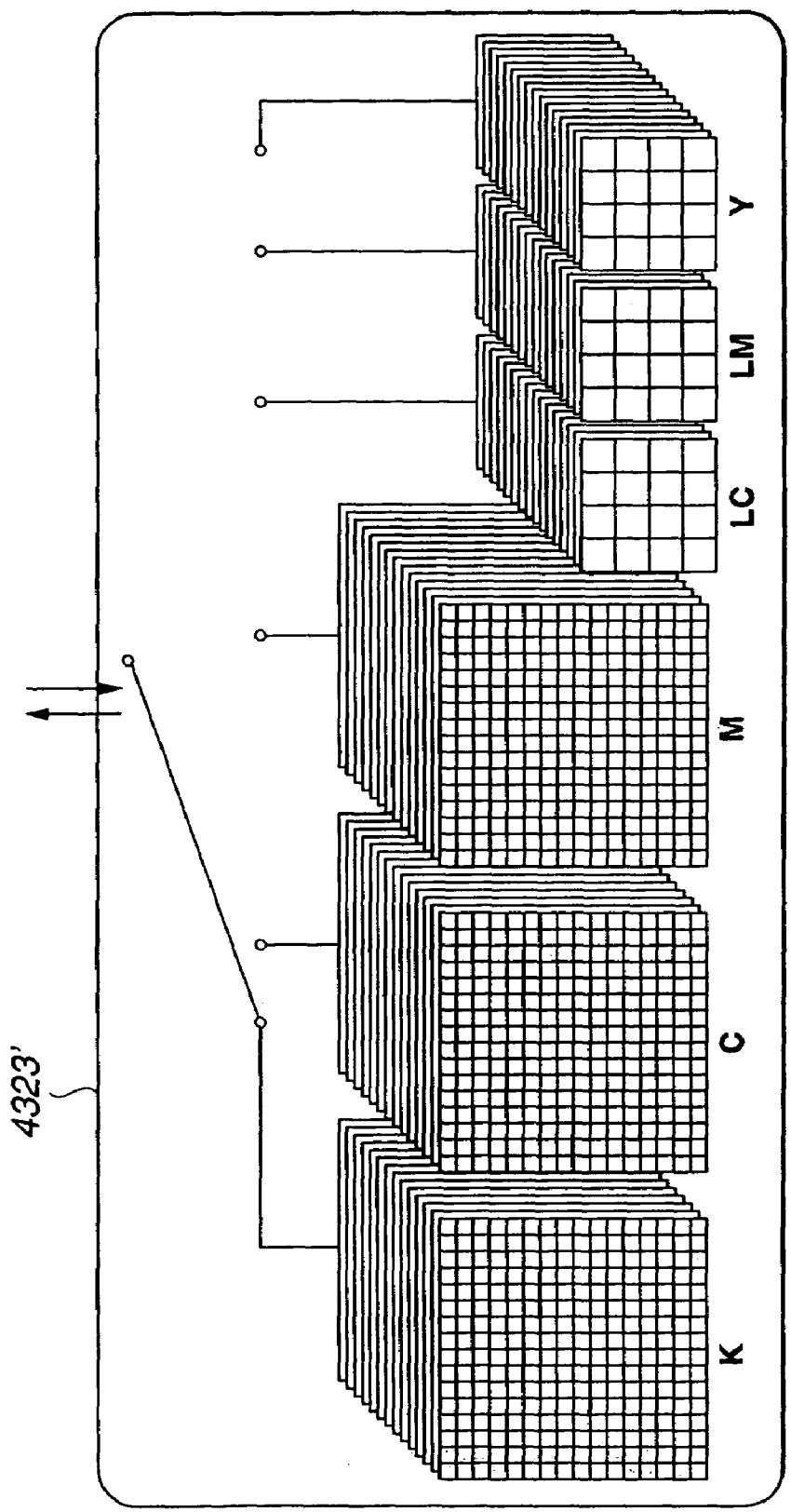
FIG. 46 is a diagram illustrating the detailed configuration of the dot-pattern-table storage unit when ink materials of six colors are used.

FIG. 46 illustrates a dot-pattern-table storage unit 4323', which stores dot-pattern tables corresponding to the six colors, i.e., black (K), light cyan (LC), cyan (C), light magenta (LM), magenta (M) and yellow (Y).

In this case, stripes and unevenness in the density which tend to be generated with fixed patterns are reduced by using a larger-size matrix for dot-pattern tables for colors in which stripes and unevenness in the density tend to be easily observed (black, cyan and magenta). On the other hand, for colors having high lightness in which stripes and unevenness in the density are not easily observed (light cyan, light magenta, and yellow), it is intended to prevent degradation of the image quality while reducing the capacity of tables stored in the ROM by using a fixed-index pattern.

To what degree the capacity of the dot-pattern table can be reduced according to the sixth embodiment will now be studied.

As in the above-described case, it is assumed that recording is performed using recording heads having 64 nozzles for each of the six colors (black, cyan, light cyan, magenta, light magenta, and yellow).

The capacity of the dot-pattern tables when the number of gradation values is 16 in an ordinary six-color mode is as follows when the size of the dot-pattern table is 64×64 dots for all of the six colors:

64×64×16×6/8=49,152 B (bytes).

On the other hand, the capacity of the dot-pattern table when the size of the dot-pattern table for light cyan, light magenta, and yellow in which stripes and unevenness in the density is not easily observed is 4×4 dots, and the size of the dot-pattern table for black, cyan and magenta in which stripes and unevenness in the density tend to be easily observed is 64×64 is as follows:

(64×64×16×3/8)+(4×4×16×3/8)=24,672 B (bytes).

Accordingly, by reducing the size of the dot-pattern table for light cyan, light magenta, and yellow, it is possible to reduce the capacity of the entire dot-pattern tables by 24,480 B (bytes).

Figure 47:
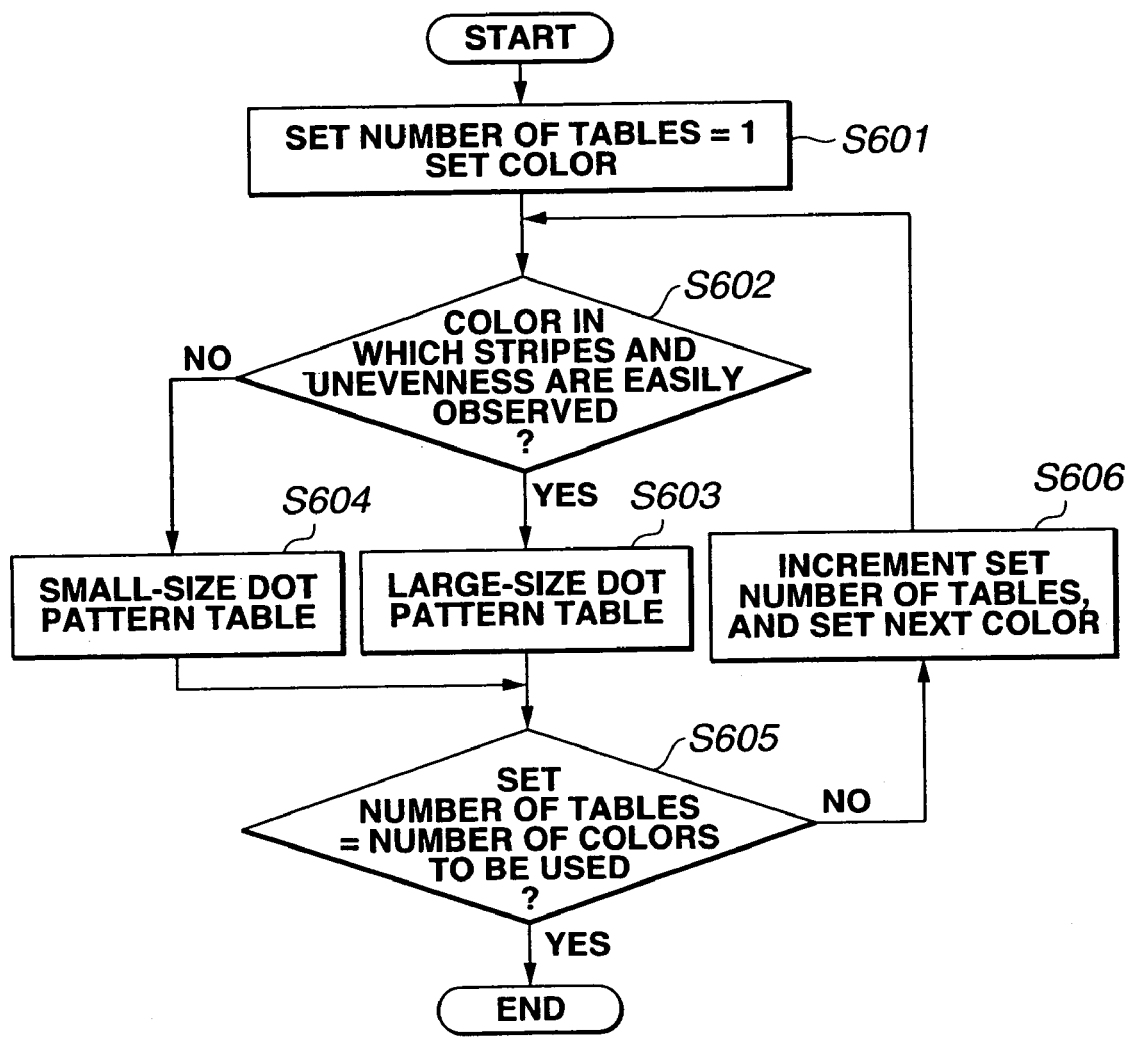
FIG. 47 is a flowchart illustrating a method for determining the size of a dot-pattern table.

The method for determining the size of the dot-pattern table in the sixth embodiment will now be described with reference to the flowchart shown in FIG. 47.

First, in step S601, the set number of tables is set to 1, and a color corresponding to the table is set. The process then proceeds to step S602, where it is determined if the color of ink is a color in which stripes and unevenness in the density are easily observed. This determination is performed based on a human visual characteristic, such as lightness or the like.

If the result of the determination in step S602 is affirmative, the process proceeds to step S603, where it is set to use a large-size dot-pattern table. If the result of the determination in step S602 is negative, the process proceeds to step S604, where it is set to use a small-size dot-pattern table.

The process then proceeds to step S605, where it is determined if the set number of tables is equal to the number of colors to be used (the types of ink materials). If the result of the determination in step S605 is affirmative, since it indicates that the setting of table sizes for all colors to be used have been completed, the processing is terminated.

If the result of the determination in step S605 is negative, the process proceeds to step S606, where the set number of tables is incremented by one, and the next color is set. The process then returns to step S602.

As described above, reduction of the capacity of dot-pattern tables according to the six embodiment is more effective as the size of the dot-pattern table used for one color is larger. As the number of ink materials having high lightness is larger, the effect of reducing the capacity of the ROM and the cost of the entire apparatus is greater.

Although in the above-described sixth embodiment, ink materials are classified into two types, i.e., a type in which stripes and unevenness in the density are easily observed, and a type in which stripes and unevenness in the density are not easily observed, and two types of pattern tables are provided, at least three types of pattern tables may be provided, or the size of the pattern table may be changed for each color to be used based on the visual characteristics.

Furthermore, ink materials of colors other than complementary colors, i.e., Y, M and C, may be used as recording materials. The present invention may, of course, be applied to a case of performing recording on a recording material, using recording materials other than ink.

By adopting the dot arrangement within the dot-pattern table described in the above-described first or second embodiment, it is possible to further reduce stripes and unevenness in the density. It is thereby possible to realize reduction of the capacity of the memory, and further reduction of stripes and unevenness in the density.

Although in the above-described first through six embodiments, liquid droplets discharged from the recording head are ink droplets, and the liquid accommodated in the ink tank is ink, the recording material is not limited to ink. For example, a processing liquid to be discharged onto the recording medium in order to improve the fixability and the water resisting property of the recorded image and the quality of the image may be accommodated in the ink tank.

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may, of course, also be achieved by supplying a system or an apparatus with a storage medium storing program codes of software for realizing the functions of the above-described embodiments, and reading and executing the program codes stored in the storage medium by means of a computer (or a CPU or an MPU) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD (compact disc)-ROM, a CD-R (recordable), a magnetic tape, a nonvolatile memory card, a ROM, or the like, may be used as the storage medium for supplying the program codes.

The present invention may, of course, be applied not only to a case in which the functions of the above-described embodiments are realized by executing program codes read by a computer, but also to a case in which an OS (operating system) or the like, operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like, provided in the function expanding board or the function expanding unit performs a part or the entirety of actual processing, and the functions of the above-described embodiments are realized by the processing.

An ink-jet recording head is preferable as recording means of the image recording apparatus in the above-described embodiments. The present invention may be applied to various ink-jet recording methods. For example, in the case of a continuous type in which ink droplets are pulverized by being continuously discharged, a charge control method, divergence control method or the like may be used. In the case of an on-demand type in which ink droplets are discharged whenever necessary, a pressure control method in which ink droplets are discharged from orifices by mechanical vibration of piezoelectric transducers, a thermal control method in which heating resistors are used, or the like may be used.

Particularly, the present invention has excellent effects in recording apparatuses using recording heads of an ink-jet method in which recording is performed by forming flying liquid droplets utilizing thermal energy, from among ink-jet recording methods.

Typical configuration and principle of such an ink-jet recording method are disclosed, for example, in U.S. Pat. Nos. 4,723;129 and 4,740,796. The disclosed method can be applied to both of so-called on-demand type and continuous type. Particularly, the on-demand type is effective because by applying at least one driving signal for causing a rapid temperature rise exceeding nucleate boiling to an electrothermal transducer disposed so as to face a sheet holding a liquid (ink), or a liquid channel in accordance with recording information, thermal energy is generated in the electrothermal transducer to cause film boiling on the heat operating surface of the recording head and to form a bubble within the liquid (ink) corresponding to the driving signal. By discharging the liquid (ink) from the discharging opening due to the growth and contraction of the bubble, at least one droplet is formed. It is preferable to provide the driving signal in the form of a pulse because the bubble can be instantaneously and appropriately grown and contracted and the discharging of the liquid (ink) with a high response speed can be achieved. A pulse-shaped driving signal such as ones described in U.S. Pat. Nos. 4,463,359 and 4,345,262 is suitable. By adopting conditions described in U.S. Pat. No. 4,313,124 relating to the rate of temperature rise of the heat operating surface, more excellent recording can be performed.

In addition to the configuration of combining discharging ports, a liquid channel and electrothermal transducers (a linear liquid channel or an orthogonal liquid channel) as disclosed in the above-described applications, configurations described in U.S. Pat. Nos. 4,558,333 and 4,459,600 in which a heat operating unit is disposed at a bending region may also be adopted for the recording head of the present invention. In addition, the present invention is also effective for a configuration disclosed in Japanese Patent Application Laid-Open No. 59-123670 (1984) in which a common slit is used as a discharging port for a plurality of electrothermal transducers, and to a configuration disclosed in Japanese Patent Application Laid-Open No. 59-138461 (1984) in which an aperture for absorbing the pressure wave of thermal energy is used as a discharging port. That is, according to the present invention, recording can be assuredly and efficiently performed irrespective of the form of the recording head.

Furthermore, the present invention is also effective for serial-type heads as described above, for example, a recording head fixed to the main body of the apparatus, an exchangeable chip-type recording head capable of electric connection to the main body of the apparatus and ink supply from the main body of the apparatus by being mounted on the main body of the apparatus, and a cartridge-type recording head having an ink tank provided as one body therewith.

The addition of means for recovering a discharging operation of the recording head, preliminary auxiliary means and the like is preferable because the effects of the present invention can be more stabilized. More specifically, these means include capping means, cleaning means, and pressing or suctioning means for the recording head, preliminary heating means for performing heating using an electrothermal transducer, a heating element other than the electrothermal transducer, or a combination of these elements, and preliminary discharging means for performing discharging other than recording.

As for the kind or the number of recording heads to be mounted, for example, a single head for monochromatic ink, or a plurality of heads for a plurality of ink liquids having different colors and density values may be used. That is, the present invention is very effective for a recording mode using a single color, such as black or the like, an integrally formed recording head, a combination of a plurality of recording heads, and a recording apparatus which has at least one of a recording mode using a plurality of different colors and a recording mode of obtaining a full-color image by mixing colors.

Although in the foregoing embodiments, a description has been provided illustrating ink in the form of a liquid, ink which is solidified at a temperature equal to or lower than the room temperature and is softened or liquidized at the room temperature may also be used. In the inkjet method, ink itself is generally subjected to temperature control within a range of 30° C.–70° C. so that the viscosity of the ink is within a range of stable discharge. Hence, ink which is liquidized when providing a recording signal may also be used. Furthermore, in order to prevent temperature rise due to thermal energy by using the energy for liquidizing ink from a solidified state or to prevent evaporation of ink, ink which is usually solid and is liquidized by being heated may also be used. Anyway, the present invention can also be applied to a case in which ink is liquidized by providing thermal energy corresponding to a recording signal and the liquidized ink is discharged, and to a case of using ink which is liquidized by providing thermal energy and starts to be solidified when it reaches a recording medium. As disclosed in Japanese Patents Application Laid-Open Nos. 54-56847 (1979) and 60-71260 (1985), such ink may be provided so as to face an electrothermal transducer while being held in recesses or threaded holes of a porous sheet in a liquid or solid state. In the present invention, the above-described film boiling method is most effective for the above-described ink.

The present invention may be applied to an image output terminal of an information processing apparatus, such as a computer or the like, a copier combined with a reader and the like, a facsimile apparatus having a transmission/reception function, and the like.

Figure 38:
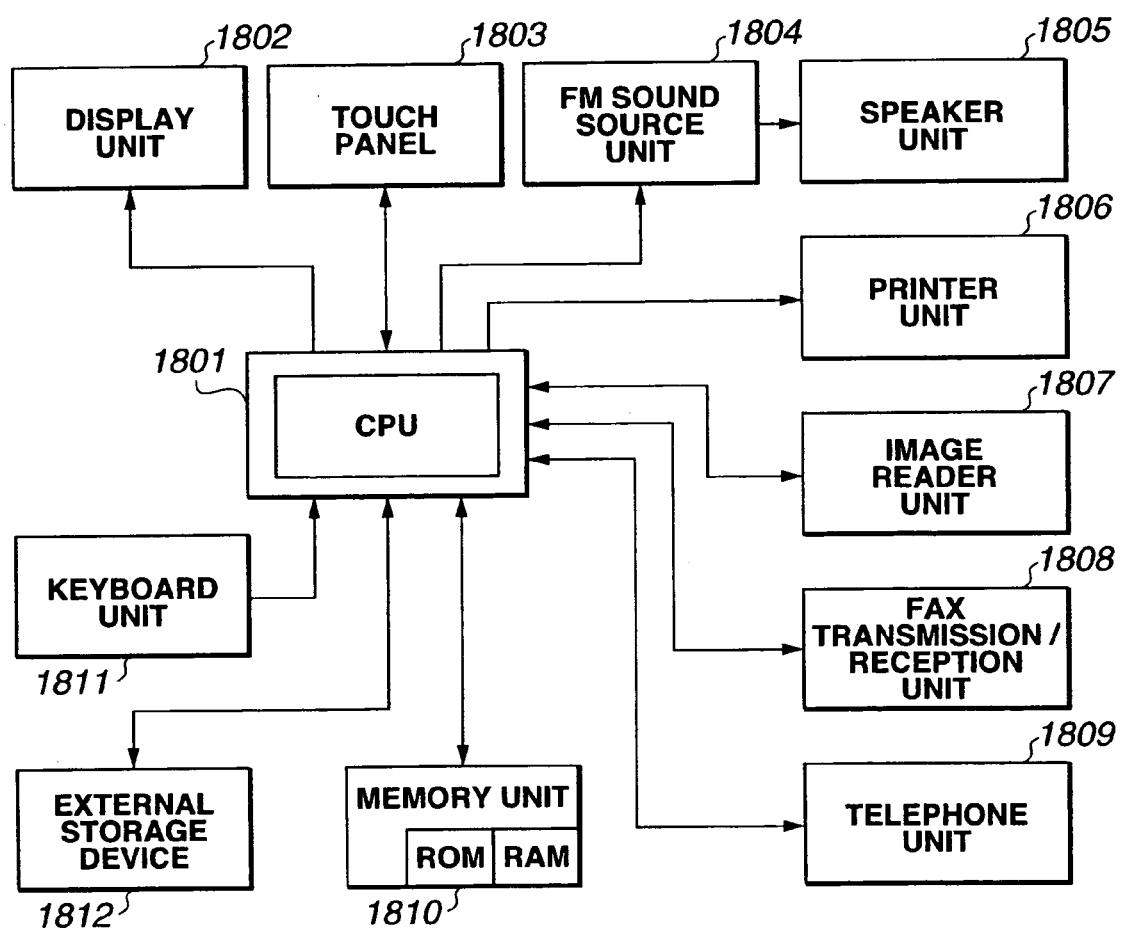
FIG. 38 is a schematic block diagram illustrating a configuration when the image recording apparatus of the present invention is applied to an information processing apparatus operating as a word processor, a personal computer, a facsimile apparatus and a copier.

FIG. 38 is a schematic block diagram when the image recording apparatus of the present invention is applied to an information processing apparatus operating as a word processor, a personal computer, a facsimile apparatus or a copier.

In FIG. 38, reference numeral 1810 represents a control unit for controlling the entire apparatus. The control unit 1810 includes a CPU, such as a microprocessor or the like, and various I/O ports, and performs control by outputting control signals, data signals and the like to respective units, and inputting control signals and data signals from the respective units. Reference numeral 1802 represents a display unit. Various menus, document information, image data read by an image reader 1807, and the like are displayed on the display picture surface of the display unit 1802. Reference numeral 1803 represents a transparent pressure-sensitive touch panel provided on the display unit 1802. By pressing the surface of the touch panel 1803 by a finger or the like, items, coordinate positions and the like can be input on the display unit 1802.

An FM (frequency modulation) sound source unit 1804 stores music information formed by a music editor or the like in a memory unit 1810 or an external storage device 1012 as digital data, and performs FM modulation by reading data from the unit storing the data. An electrical signal from the FM sound source unit 1804 is converted into audible sound by a speaker unit 1805. A printer unit 1806 operates as an output terminal for the word processor, the personal computer, the facsimile apparatus or the copier, to which the image recording apparatus of the present invention is applied.

The image reader unit 1807 photoelectrically reads data of an original and inputs the read data. The image reader 1807 is provided in the midst of a conveying path for the original, and reads each type of original, such as a facsimile original, a copy original or the like. A facsimile (FAX) transmission/reception unit 1808 performs facsimile transmission of the data of the original read by the image reader unit 1807, and receives and decodes a transmitted facsimile signal. The FAX transmission/reception unit 1808 has an interface function with the outside. A telephone unit 1809 has various functions, such as an ordinary telephone function, a function of receiving and storing a message during absence, and the like.

A memory unit 1810 includes, for example, a ROM for storing system programs, manager programs, other application programs, character fonts, dictionaries and the like, and a RAM for storing application programs, document information, video information and the like loaded from the external storage unit 1812.

Reference numeral 1811 represents a keyboard unit for inputting document information, various commands and the like.

The external storage device 1812 uses a floppy disk, a hard disk or the like as a storage medium, which stores document information, music or sound information, user's application programs, and the like.

Figure 39:
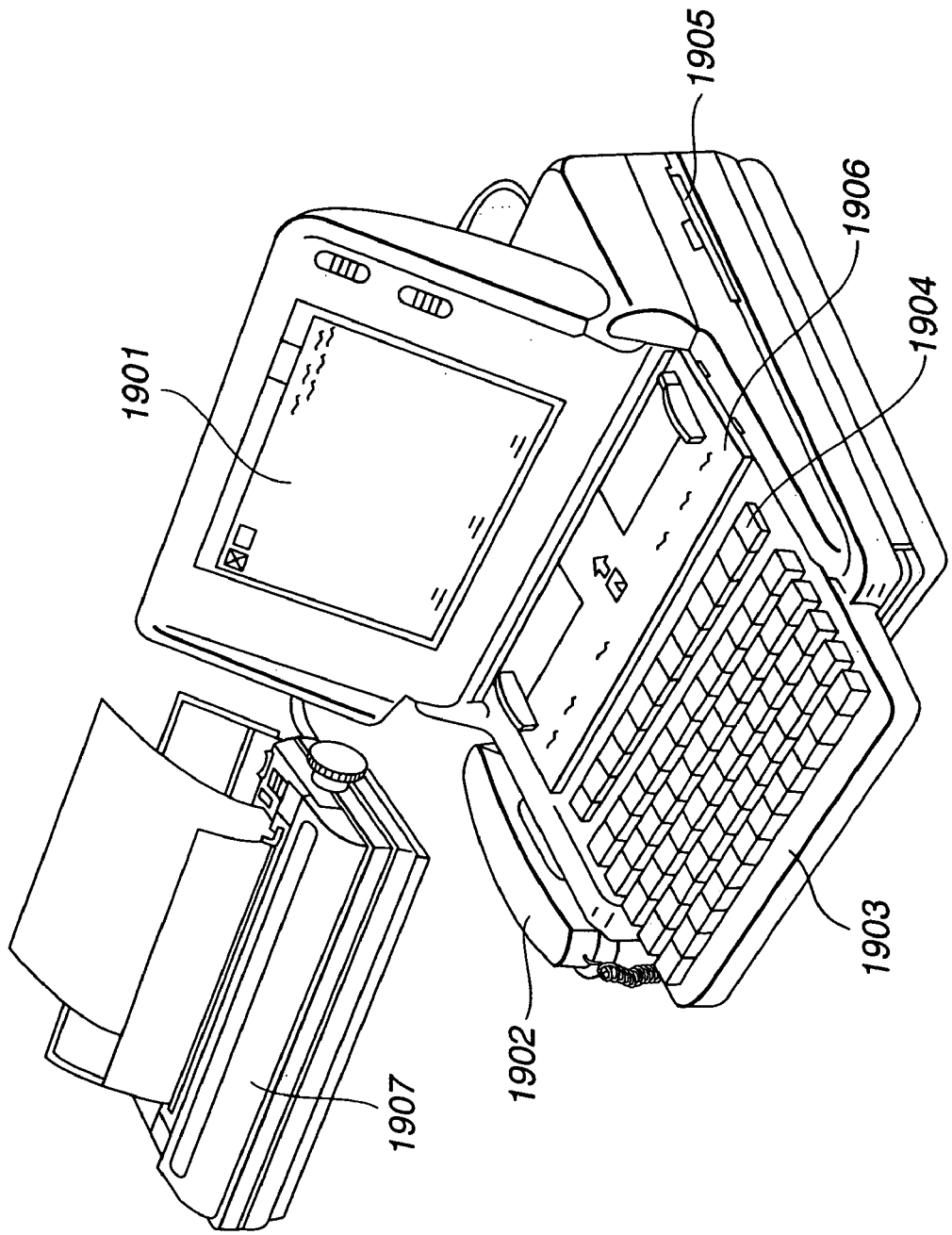
FIG. 39 is a schematic view illustrating an external appearance of the information processing apparatus shown in FIG. 38.

FIG. 39 is a schematic perspective view illustrating an external appearance of the information processing apparatus shown in FIG. 38.

In FIG. 39, reference numeral 1901 represents a flat-panel display utilizing a liquid crystal or the like. The flat-panel display 1901 displays various menus, drawing information, document information or the like. By pressing the surface of the touch panel 1803 by a finger or the like, it is possible to input coordinates, and assignment of an item on the flat-panel display 1901. A handset 1902 is used when the apparatus operates as a telephone set. A keyboard 1903 is detachably connected to the main body of the apparatus via a cord. It is possible to input various types of document information and various data through the keyboard 1903. Various function keys 1904 and the like are provided on the keyboard 1903. Reference numeral 1905 represents an insertion port for inserting a floppy disk into the external storage device 1812.

Reference numeral 1906 represents a sheet mounting unit for mounting an original to be read by the image reading unit 1807. The read original is discharged from a rear portion of the apparatus. When, for example, performing facsimile reception, recording is performed by an ink-jet printer 1907.

Although a CRT (cathode-ray tube) may be used as the display unit 1802, it is desirable to use a flat panel, such as a liquid-crystal display utilizing a ferroelectric liquid crystal, or the like, as the display unit 1802, because it is possible to reduce the weight in addition to the size and the thickness.

When using the above-described information processing apparatus as a personal computer or a word processor, each type of information input from the keyboard unit 1811 is processed in accordance with a predetermined program by the control unit 1801, and is output to the printer unit 1806 as the received image.

When using the information processing apparatus as the receiving unit of a facsimile apparatus, facsimile information input from the FAX transmission/reception unit 1808 via a communication network is subjected to reception processing in accordance with a predetermined program by the control unit 1801, and is then output to the printer unit 1806 as the received image.

When using the information processing apparatus as a copier, an original is read by the image reader unit 1807, and data of the read image is output to the printer unit 1806 via the control unit 1801 as a copied image. When using the information processing apparatus as the transmission unit of a facsimile apparatus, data of an original read by the image reader unit 1807 is subjected to transmission processing in accordance with a predetermined program by the control unit 1801, and is then transmitted to the communication network via the FAX transmission/reception unit 1808.

Figure 40:
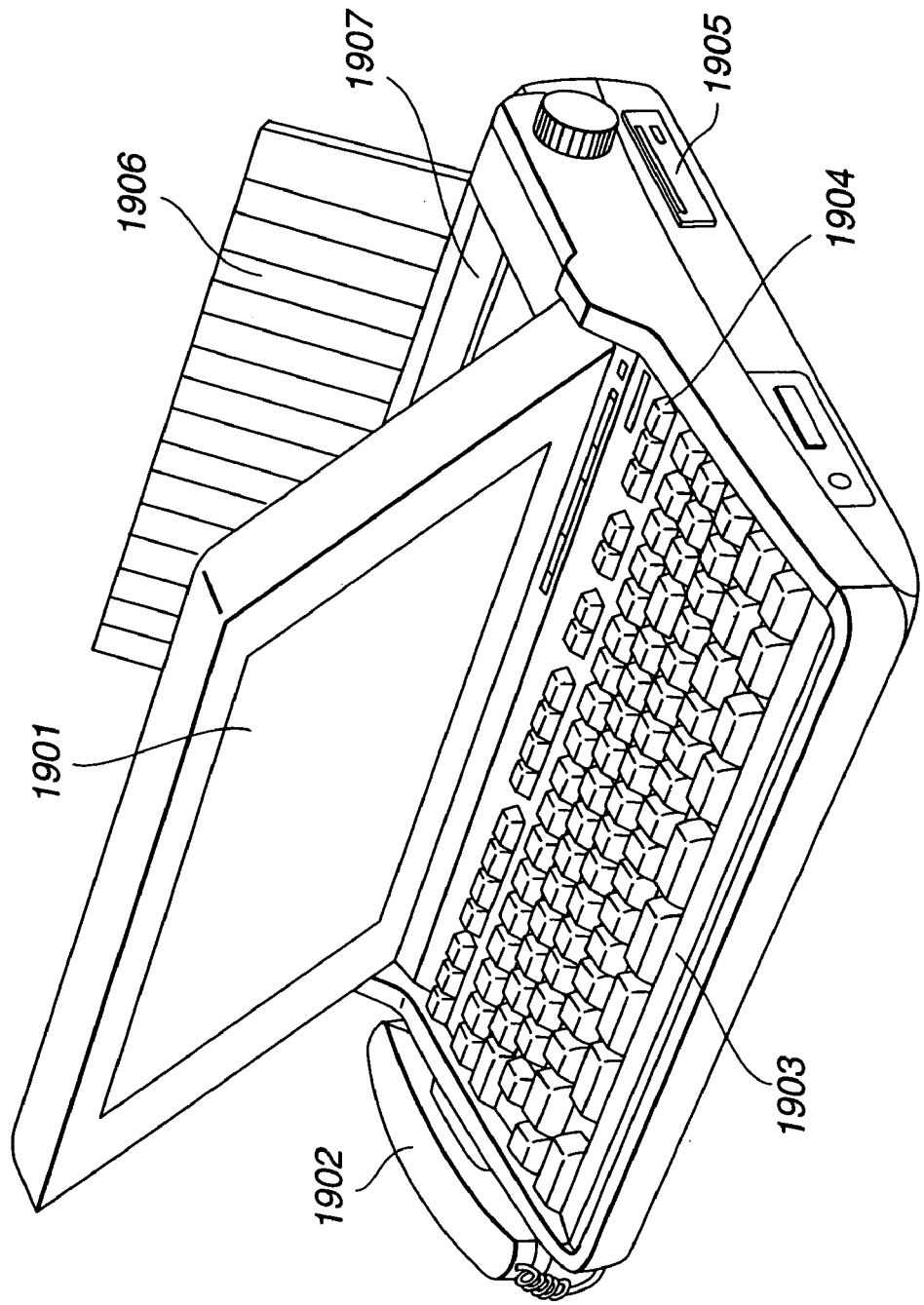
FIG. 40 is a schematic view-illustrating an external appearance when the image recording apparatus of the present invention is applied to the information processing apparatus.
Figure 41:
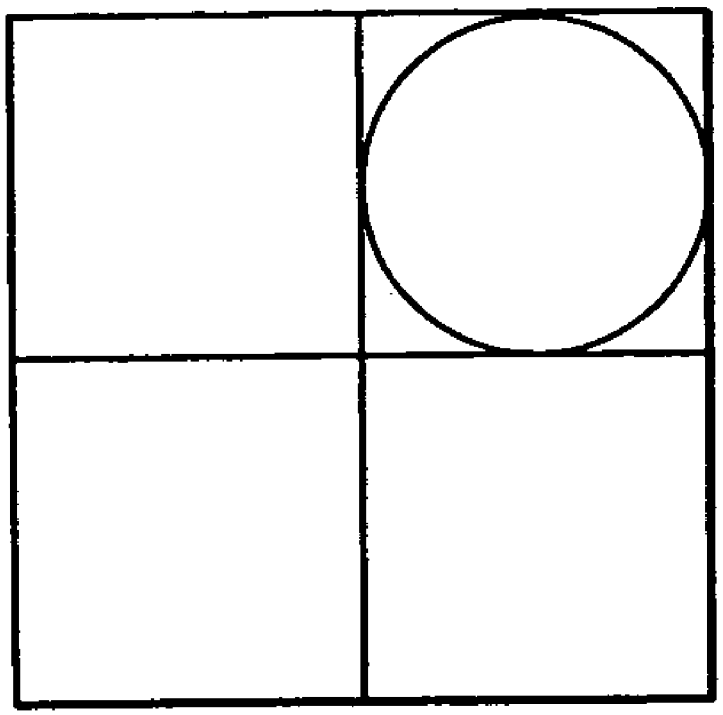
FIG. 41 is a diagram illustrating a dot pattern for gradation value "1"

The above-described information processing apparatus may be an integrated apparatus incorporating an ink-jet printer as shown in FIG. 40. In this case, it is possible to further improve portability. In FIG. 40, components having the same functions as the components shown in FIG. 39 are indicated by the same reference numerals.

By applying the image recording apparatus of the present invention to the above-described multifunctional information processing apparatus, it is possible to obtain a high-quality recorded image at a high speed and with low noise. As a result, the functions of the above-described information processing apparatus can be further improved.

As described above, according to the present invention, dot pattern tables, each having a plurality of different dot patterns, are provided so as to correspond to N gradation values, a dot pattern necessary for recording is selected based on position information and gradation-value information of each pixel, and recording is performed using the selected dot pattern. Hence, a plurality of different dot patterns are used even if a specific gradation value is consecutively recorded.

Accordingly, even when consecutively recording patterns having a specific gradation value as described above, the frequency of use of the nozzle used for recording is dispersed. As a result, the occurrence of concentrated use of a specific nozzle is prevented, and it is possible to obtain a recorded image which is less influenced by the characteristics of a specific nozzle.

It is thereby possible to suppress degradation in the picture quality, such as unevenness in the density, or the like, caused, for example, by variations in the characteristics of a specific nozzle.

By providing dot patterns for each gradation value, it is possible to achieve recording of a higher-quality image using an optimum pattern for each gradation value.

Furthermore, it is possible to reduce the capacity of data of dot-pattern tables while suppressing the occurrence of unevenness in the density and unevenness due to stripes. By reducing the capacity of a memory for storing dot-pattern tables, the cost of the entire apparatus can be reduced.

It is also possible to reduce the capacity of dot-pattern tables and to reduce the cost of the apparatus, while maintaining the same recording quality as when using large-size dot patterns for all colors.

The individual components shown in outline or designated by blocks in the drawings are all well known in the image recording apparatus/method and image processing method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus for performing recording using a dot pattern corresponding to each gradation value, based on image data representing each pixel by one of N gradation values, said apparatus comprising:
   selection means for selecting one dot pattern based on gradation-value information of the pixel of the image data and position information of the pixel, from a dot-pattern-table storage unit for storing X (N>X, X is a natural number) dot pattern tables, each having a plurality of different dot patterns, corresponding to respective ones of X gradation values; and
   dot-pattern generation means for generating dot patterns corresponding to (N−X) predetermined gradation values,
   wherein, when a dot-pattern table corresponding to the gradation-value information is stored in the dot-pattern-table storage unit, the dot pattern selected by said selection means is recorded by a recording head, and
   wherein, when a dot-pattern table corresponding to the gradation-value information is not stored in the dot-pattern-table storage unit, dot patterns corresponding to the predetermined gradation values generated by said dot-pattern generation means are recorded by the recording head.

2. An image recording apparatus according to claim 1, wherein the dot pattern generated by said dot-pattern generation means is a dot pattern having a fixed dot arrangement.

3. An image recording apparatus according to claim 2, wherein the dot pattern generated by said dot-pattern generation means is a dot pattern in which no dot is recorded on all dot positions.

4. An image recording apparatus according to claim 2, wherein the dot pattern generated by said dot-pattern generation means is a dot pattern in which dots are recorded on all dot positions.

5. An image recording apparatus for performing recording using a dot pattern corresponding to each gradation value, based on image data representing each pixel by one of N gradation values, said apparatus comprising:
   a dot-pattern-table storage unit for storing X (N>X, X is a natural number) dot-pattern tables, each having a plurality of different dot patterns, corresponding to respective ones of X gradation values;
   first selection means for selecting one dot pattern from said dot-pattern-table storage unit, based on gradation-value information of the pixel of the image data and position information of the pixel;
   a second selection means for selecting one dot pattern from the dot-pattern table selected by said first selection means, based on position information of the pixel; and
   dot-pattern generation means for generating dot patterns corresponding to (N−X) predetermined gradation values,
   wherein the dot-pattern table is a two-dimensional table expanding in a first direction corresponding to a direction of arrangement of nozzles of the recording head and in a second direction different from the first direction,
   wherein a number of cells L within the dot-pattern table in the first direction and a number of nozzles A of the recording head have a relationship of L=∝×A (∝ is a natural number),
   wherein, when a dot-pattern table corresponding to the gradation-value information is stored in said dot-pattern-table storage unit, the dot pattern selected by said second selection means is recorded by a recording head, and
   wherein, when a dot-pattern table corresponding to the gradation-value information is not stored in said dot-pattern-table storage unit, the dot patterns corresponding to the predetermined gradation values generated by said dot-pattern generation means are recorded by the recording head.

6. An image recording apparatus for performing recording using a dot pattern corresponding to each gradation value, based on image data representing each pixel with one of N (N is an integer equal to or larger than 3) gradation values, said apparatus comprising:

a dot-pattern-table storage unit for storing X (N>X, X is a natural number) dot-pattern tables, each having a plurality of different dot patterns, corresponding to X gradation values provided at intervals of every other gradation level;

first selection means for selecting one dot-pattern table from said dot-pattern-table storage unit, based on gradation-value information of the pixel of the image data and position information of the pixel;

second selection means for selecting one dot pattern based on position information of the pixel, from the dot-pattern table selected by said first selection means; and dot-pattern interpolation means for generating dot patterns corresponding to (N−X) predetermined gradation values, based on a dot pattern within the dot-pattern table corresponding to a gradation value larger than a corresponding one of the predetermined gradation values by one, and a dot pattern within the dot-pattern table corresponding to a gradation value smaller than the corresponding one of the predetermined gradation values by one, wherein the dot-pattern table is a two-dimensional table expanding in a first direction corresponding to a direction of arrangement of nozzles of the recording head and in a second direction different from the first direction, wherein a number of cells L within the dot-pattern table in the first direction and a number of nozzles A of the recording head have a relationship of $L=\alpha \times A$ ($\neq$ is a natural number), wherein, when a dot-pattern table corresponding to the gradation-value information is stored in said dot-pattern-table storage unit, the dot pattern selected by said second selection means is recorded by a recording head, and wherein, when a dot-pattern table corresponding to the gradation-value information is not stored in said dot-pattern-table storage unit, the dot patterns corresponding to the predetermined gradation values generated by said dot-pattern interpolation means are recorded by the recording head.

7. An image recording method for performing recording using a dot pattern corresponding to each gradation value, based on image data representing each pixel by one of N gradation values, said method comprising the steps of:

a selection step for selecting one dot pattern based on gradation-value information of the pixel of the image data and position information of the pixel, from a dot-pattern-table storage unit for storing X (N>X, X is a natural number) dot-pattern tables, each having a plurality of different dot patterns, corresponding to respective ones of X gradation values, and a dot-pattern generation step for generating dot patterns corresponding to (N−X) predetermined gradation values, wherein, when a dot-pattern table corresponding to the gradation-value information is stored in the dot-pattern-table storage unit, the dot pattern selected in said selection step is recorded by a recording head, and wherein, when a dot-pattern table corresponding to the gradation-value information is not stored in the dot-pattern-table storage unit, the dot patterns corresponding to the predetermined gradation values generated in said dot-pattern generation step are recorded by the recording head.

8. An image recording method for performing recording using a dot pattern corresponding to each gradation value, based on image data representing each pixel by one of N gradation values, said method comprising the steps of:

a first selection step for selecting one dot pattern based on gradation-value information of the pixel of the image data and position information of the pixel, from a dot-pattern-table storage unit for storing X (N>X, X is a natural number) dot pattern tables, each having a plurality of different dot patterns, corresponding to respective ones of X gradation value;

a second selection step for selecting one dot pattern from the dot-pattern table selected in said first selection step, based on position information of the pixel; and a dot-pattern generation step for generating dot patterns corresponding to (N−X) predetermined gradation values, wherein the dot-pattern table is a two-dimensional table expanding in a first direction corresponding to a direction of arrangement of nozzles of the recording head and in a second direction different from the first direction, wherein a number of cells L within the dot-pattern table in the first direction and a number of nozzles A of the recording head have a relationship of $L=\alpha \times A$ ($\alpha$ is a natural number), wherein, when a dot-pattern table corresponding to the gradation-value information is stored in the dot-pattern-table storage unit, the dot pattern selected in said second selection step is recorded by a recording head, and wherein, when a dot-pattern table corresponding to the gradation-value information is not stored in the dot-pattern-table storage unit, the dot patterns corresponding to the predetermined gradation values generated in said dot-pattern generation step are recorded by the recording head.

9. An image recording method for performing recording using a dot pattern corresponding to each gradation value, based on image data representing each pixel with one of N (N is an integer equal to or larger than 3) gradation values, said method comprising the steps of:

a first selection step for selecting one dot-pattern table based on gradation-value information of the pixel of the image data and position information of the pixel, from a dot-pattern-table storage unit for storing X (N>X, X is a natural number) dot-pattern tables, each having a plurality of different dot patterns, corresponding to X gradation values provided at intervals of every other gradation level;

a second selection step for selecting one dot pattern based on position information of the pixel, from the dot-pattern table selected in said first selection step; and a dot-pattern interpolation step for generating dot patterns corresponding to (N−X) predetermined gradation values, based on a dot pattern within a dot-pattern table corresponding to a gradation value larger than a corresponding one of the predetermined gradation values by one, and a dot pattern within a dot-pattern table corresponding to a gradation value smaller than the corresponding one of the predetermined gradation values by one, wherein the dot-pattern table is a two-dimensional table expanding in a first direction corresponding to a direction of arrangement of nozzles of a recording head and in a second direction different from the first direction, wherein a number of cells L within the dot-pattern table in the first direction and a number of nozzles A of the recording head have a relationship of $L = \alpha \times A$ ($\alpha$ is a natural number), wherein, when a dot-pattern table corresponding to the gradation-value information is stored in the dot-pattern-table storage unit, the dot pattern selected in said second selection step is recorded by a recording head, and wherein, when a dot-pattern table corresponding to the gradation-value information is not stored in the dot-pattern-table storage unit, the dot patterns corresponding to the predetermined gradation values generated in said dot-pattern interpolation step are recorded by the recording head.

* * * * *

UNITED STATES PATENT AND TRADEMARK OFFICE
CERTIFICATE OF CORRECTION

PATENT NO. : 7,130,083 B1
APPLICATION NO. : 09/586884
DATED : October 31, 2006
INVENTOR(S) : Yuji Konno et al.

It is certified that error appears in the above-identified patent and that said Letters Patent is hereby corrected as shown below:

In the drawings
SHEET 9:

FIG. 9, "COODINATE" should read --COORDINATE-- and "CORRESCPONDING" should read --CORRESPONDING--.

SHEET 12:

FIG. 12, "VALVE" should read --VALUE--.

SHEET 30:

FIG. 30, "COODINATE" should read --COORDINATE--.

SHEET 36:

FIG. 36, in S21 and S27, "ADDERESS" should read --ADDRESS-- and in S22 "URRENT" should read --CURRENT--.

COLUMN 6:

Line 20, "do" should read --dot--.

COLUMN 7:

Line 57, "do" should read --dot--.

COLUMN 22:

Line 43, "($\gamma$is" should read --($\gamma$ is--.

COLUMN 29:

Line 3, "not" should read --no--.
    Line 14, "not" should read --no--.

UNITED STATES PATENT AND TRADEMARK OFFICE
CERTIFICATE OF CORRECTION

PATENT NO. : 7,130,083 B1
APPLICATION NO. : 09/586884
DATED : October 21, 2006
INVENTOR(S) : Yuji Konno et al.

It is certified that error appears in the above-identified patent and that said Letters Patent is hereby corrected as shown below:

COLUMN 34:

Line 9, "K×l" should read --K×L--.

COLUMN 37:

Line 59, "Nos. 4,723;129" should read --Nos. 4,723,129--.

COLUMN 43:

Line 37, "($\neq$" should read --$\propto$--.
Line 60, "values," should read --values;--.

Signed and Sealed this

Seventeenth Day of June, 2008

JON W. DUDAS
*Director of the United States Patent and Trademark Office*